(12) United States Patent
Miyake

(10) Patent No.: US 10,545,602 B2
(45) Date of Patent: Jan. 28, 2020

(54) TOUCH PANEL AND DATA PROCESSOR

(71) Applicant: Semiconductor Energy Laboratory Co., Ltd., Atsugi-shi, Kanagawa-ken (JP)

(72) Inventor: Hiroyuki Miyake, Tochigi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 713 days.

(21) Appl. No.: 15/140,825

(22) Filed: Apr. 28, 2016

(65) Prior Publication Data

US 2016/0328080 A1 Nov. 10, 2016

(30) Foreign Application Priority Data

May 4, 2015 (JP) ................................. 2015-094488

(51) Int. Cl.
*G06F 3/041* (2006.01)
*G06F 3/044* (2006.01)
(Continued)

(52) U.S. Cl.
CPC ........ *G06F 3/0416* (2013.01); *G02F 1/13338* (2013.01); *G02F 1/133308* (2013.01);
(Continued)

(58) Field of Classification Search
CPC .. G06F 3/0416; G06F 3/0412; G02F 1/13338; G02F 1/134309; G09G 3/3648;
(Continued)

(56) References Cited

U.S. PATENT DOCUMENTS 5,731,856 A 3/1998 Kim et al.
5,744,864 A 4/1998 Cillessen et al.
(Continued)

FOREIGN PATENT DOCUMENTS

EP 1737044 A 12/2006
EP 2226847 A 9/2010
(Continued)

OTHER PUBLICATIONS

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

(Continued)

*Primary Examiner* — Xuemei Zheng
(74) *Attorney, Agent, or Firm* — Robinson Intellectual Property Law Office; Eric J. Robinson

(57) ABSTRACT

Provided is a novel touch panel that is highly convenience or reliable, a novel data processor that is highly convenient or reliable, a novel touch panel, a novel data processor, or a novel semiconductor device. The touch panel includes a sensor element and a display element. The sensor element includes a first conductive film and a second conductive film. The display element includes a layer containing a liquid crystal material and a third conductive film which is provided so that an electric field controlling the alignment of the liquid crystal material contained in the layer can be applied between the first conductive film and the third conductive film.

18 Claims, 24 Drawing Sheets

(51) Int. Cl.
*G02F 1/1333* (2006.01)
*G02F 1/1343* (2006.01)
*G09G 3/36* (2006.01)

(52) U.S. Cl.
CPC ......... *G06F 3/0412* (2013.01); *G09G 3/3607* (2013.01); *G09G 2320/066* (2013.01); *G09G 2320/0626* (2013.01)

(58) Field of Classification Search
CPC ............. G09G 3/3607; G09G 2354/00; G09G 2320/066; G09G 2320/0626
See application file for complete search history.

(56) References Cited

U.S. PATENT DOCUMENTS

| | | | |
|---|---|---|---|
| 6,002,161 A * | 12/1999 | Yamazaki | H01L 23/645 257/531 |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al. | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 7,859,521 B2 | 12/2010 | Hotelling et al. | |
| 7,995,041 B2 | 8/2011 | Chang | |
| 8,217,913 B2 | 7/2012 | Hotelling et al. | |
| 8,243,027 B2 | 8/2012 | Hotelling et al. | |
| 8,363,027 B2 | 1/2013 | Hotelling et al. | |
| 8,502,799 B2 | 8/2013 | Hotelling et al. | |
| 8,786,557 B2 | 7/2014 | Noguchi et al. | |
| 8,804,056 B2 | 8/2014 | Chang et al. | |
| 8,994,669 B2 | 3/2015 | Chang | |
| 9,134,560 B2 | 9/2015 | Hotelling et al. | |
| 10,067,621 B2 | 9/2018 | Kimura et al. | |
| 10,095,362 B2 | 10/2018 | Hirakata et al. | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0110932 A1 * | 5/2005 | Chang | G02F 1/134363 349/141 |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2011/0032207 A1 | 2/2011 | Huang et al. | |
| 2012/0228687 A1 * | 9/2012 | Noda | H01L 27/1156 257/296 |
| 2013/0285910 A1 * | 10/2013 | Adachi | G06F 3/016 345/159 |
| 2014/0055406 A1 * | 2/2014 | Hong | G06F 3/0414 345/174 |
| 2014/0063386 A1 * | 3/2014 | Yang | G02F 1/134309 349/33 |
| 2014/0285732 A1 | 9/2014 | Tanabe et al. | |
| 2014/0340363 A1 | 11/2014 | Ikeda et al. | |
| 2015/0029431 A1 | 1/2015 | Fukals et al. | |
| 2015/0144920 A1 | 5/2015 | Yamazaki et al. | |
| 2015/0185910 A1 * | 7/2015 | Zhang | G06F 3/044 345/174 |
| 2015/0255518 A1 | 9/2015 | Watanabe et al. | |
| 2015/0310793 A1 | 10/2015 | Kawashima et al. | |
| 2015/0332632 A1 * | 11/2015 | Nakata | G09G 3/2092 345/690 |
| 2015/0349041 A1 | 12/2015 | Miyake | |
| 2015/0363032 A1 | 12/2015 | Hotelling et al. | |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |

(56) References Cited

FOREIGN PATENT DOCUMENTS

| | | |
|---|---|---|
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2009-244958 | 10/2009 |
| JP | 2011-197685 | 10/2011 |
| JP | 2015-005280 | 1/2015 |
| WO | WO-2004/114391 | 12/2004 |

OTHER PUBLICATIONS

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Chern.H et al., "An Analytical Model for the Above-Threshold Characteristics of Polysilicon Thin-Film Transistors". IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"". Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A). May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTs) for AMLCDs", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833, Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using CG-Silicon Technology", SID Digest '04 : SID International Symposium Digest of Technical Papers. 2004. vol. 35, pp. 860-863.

Janotti.A et al., "Native Point Defects in ZnO", Phys. Rev. B (Physical Review. B), Oct. 4, 2007, vol. 76, No, 16, pp. 165202-1-165202-22.

Janotti.A et al., "Oxygen Vacancies in ZnO", Appl. Phys. Lett. (Applied Physics Letters) , 2005, vol. 87, pp. 122102-1-122102-3.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MoO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application". SID Digest '07 : SID International Symposium Digest of Technical Papers, 2007, vol. 38. pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel,YbFe2O4, and Yb2Fe3O7 Types of Structures for Compounds in the In2O3 and Sc2O3—A2O3—BO Systems [A: Fe, Ga, or Al; B: Mg, Mn, Fe, Ni, Cu,or Zn] at Temperatures Over 1000° C.", Journal of Solid State Chemistry, 1985, vol. 60, pp. 382-384.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits , 2008, vol. 43. No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED ", IDW '06 : Proceedings of the 13th International Display Workshops, Dec. 7, 2006, pp. 663-666.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Lee.M et al., "15.4:Excellent Performance of Indium-Oxide-Based Thin-Film Transistors by DC Sputtering". SID Digest '09 : SID International Symposium Digest of Technical Papers, May 31, 2009, pp. 191-193.

(56) References Cited

OTHER PUBLICATIONS

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "SUFTLA Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters), Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem OLEDs", SID Digest '09 : SID International Symposium Digest of Technical Papers. May 31, 2009. vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 In. QVGA AMOLED Display Using In—Ga—Zn-Oxide TFTs With a Novel Passivation Layer", SID Digest '09 : SID International Symposium Digest of Technical Papers, May 31, 2009, pp. 284-287.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m <4):a Zn4s conductor", Philosophical Magazine, 2001, vol. 81, No. 5, pp. 501-515.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn-Oxide TFT", SID Digest '09 : SID International Symposium Digest of Technical Papers, May 31, 2009, pp. 184-187.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor Upon Exposure to Water", Appl. Phys. Lett. (Applied Physics Letters), 2008, vol, 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.S et al., "Challenge to Future Displays: Transparent AM-OLED Driven by PEALD Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-682.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Sakata.J et al., "Development of 4.0-In. AMOLED Display With Driver Circuit Using Amorphous In—Ga—Zn-Oxide TFTs", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008. pp. 1637-1640.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

* cited by examiner

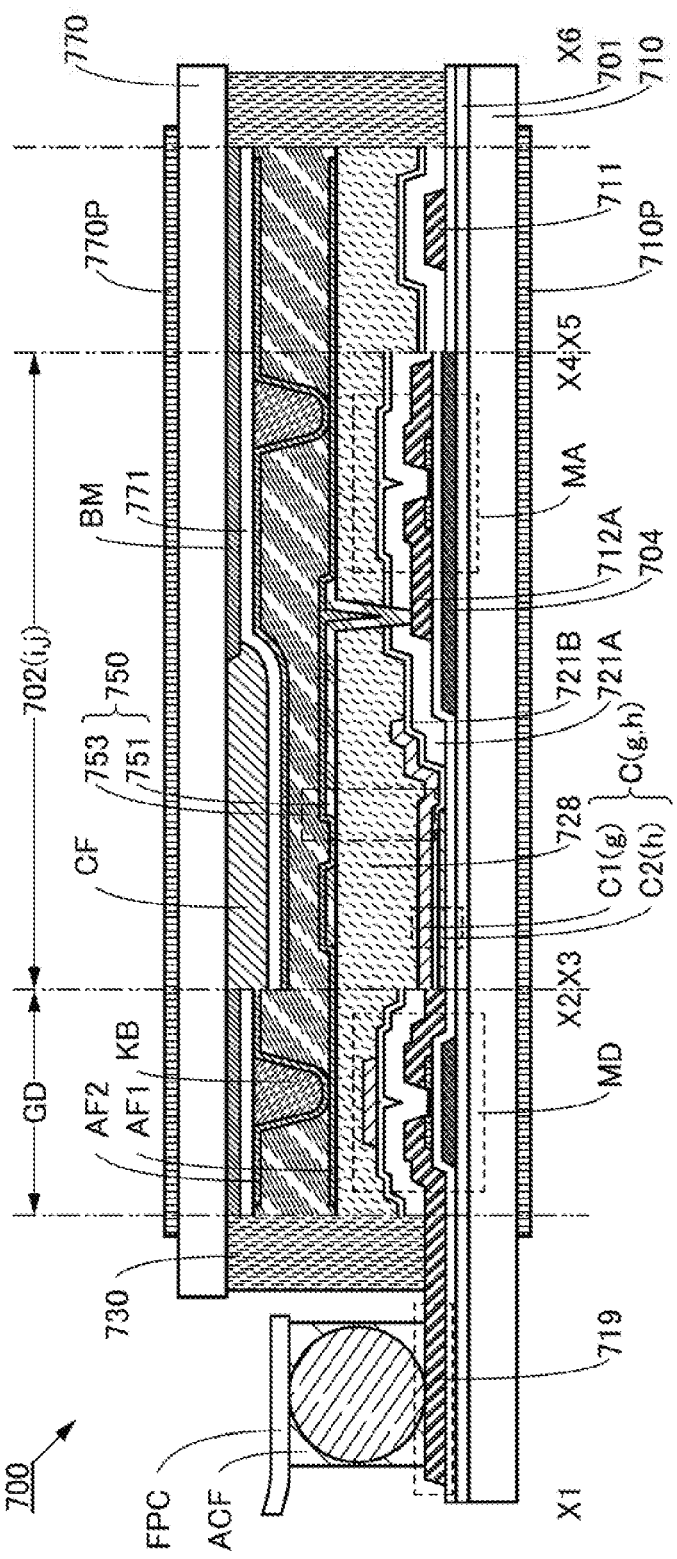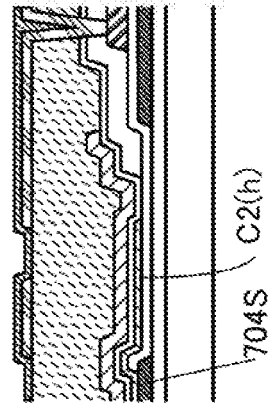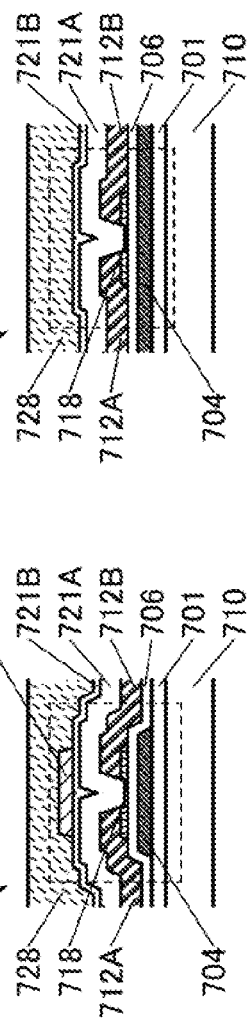

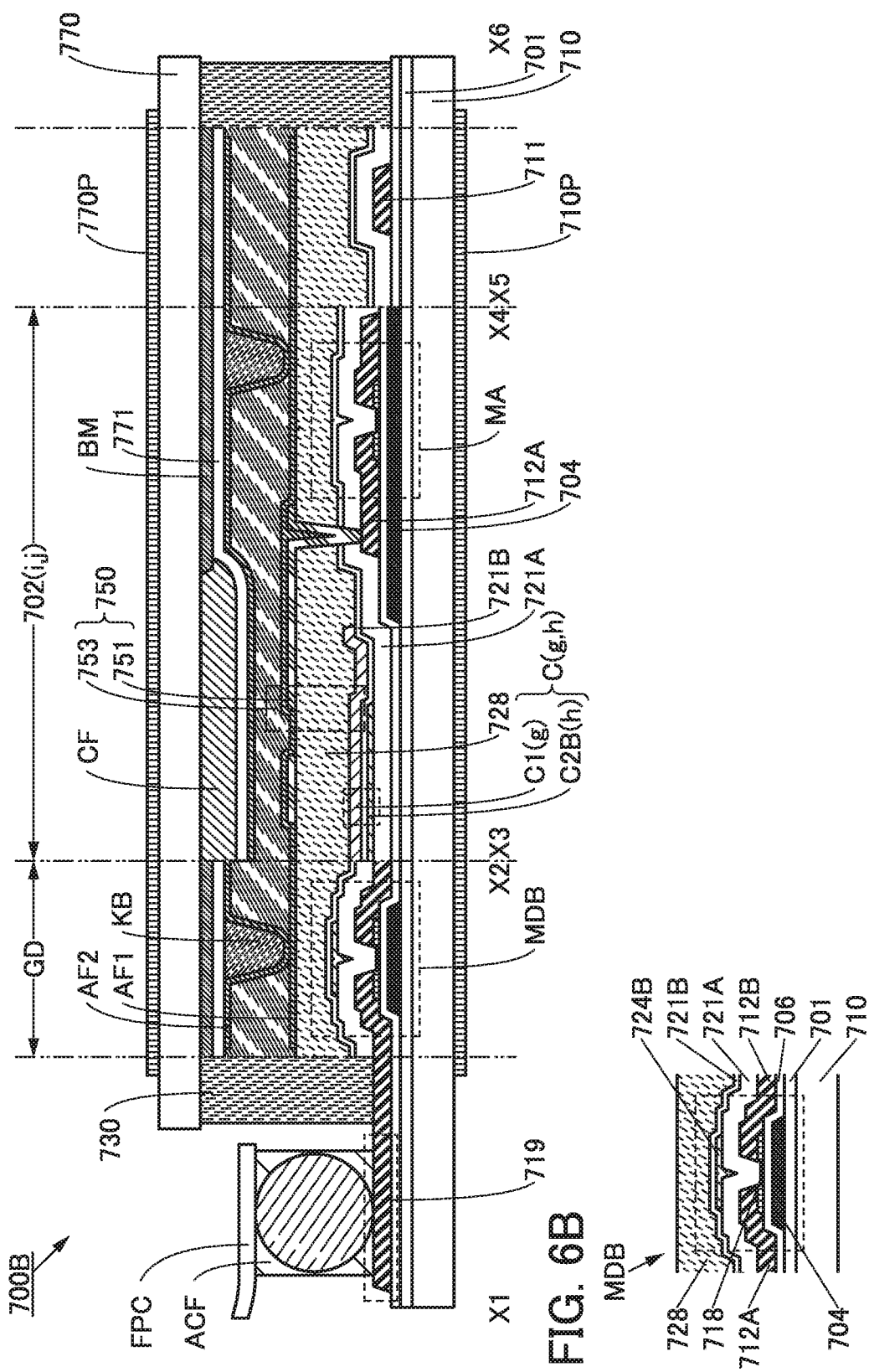

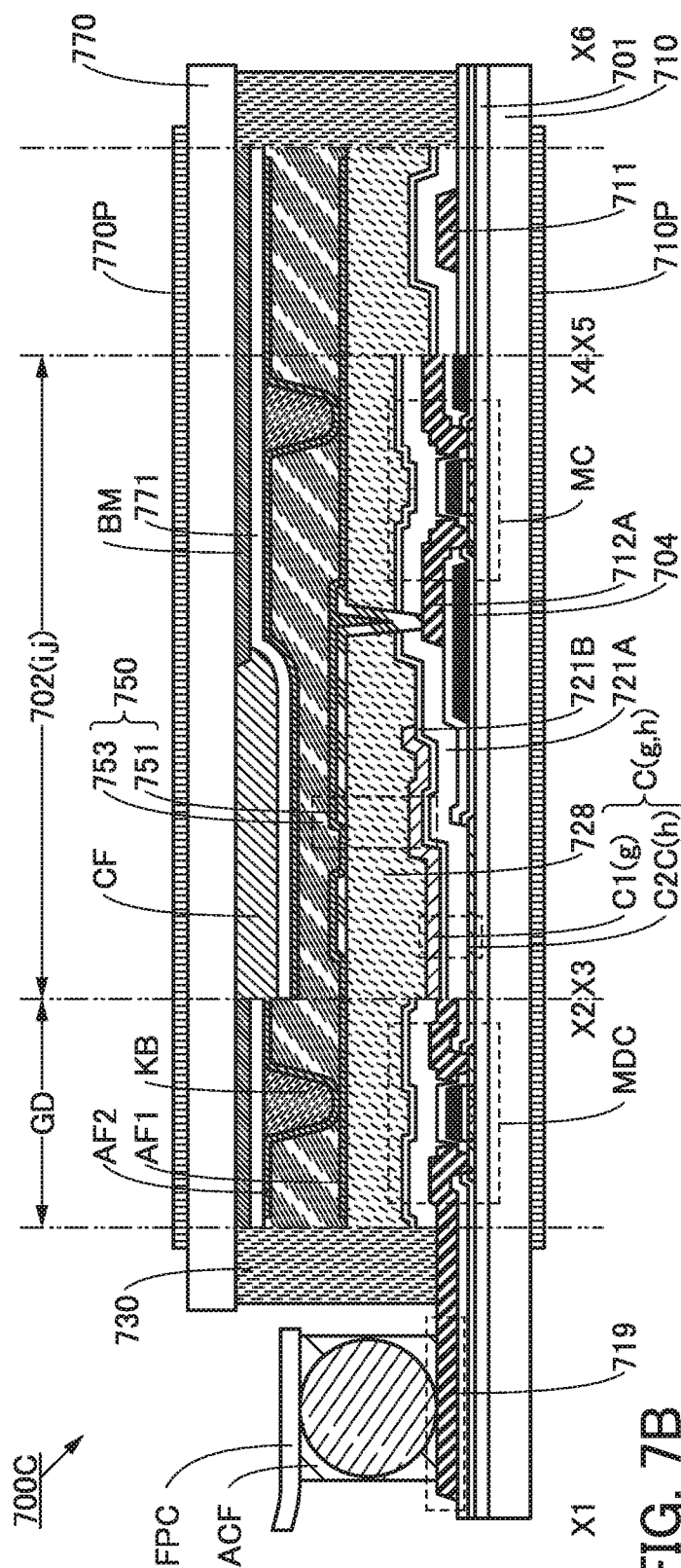
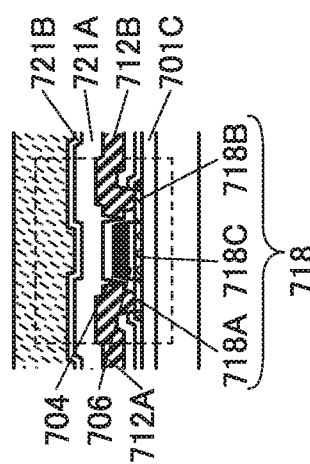
FIG. 7A
FIG. 7B

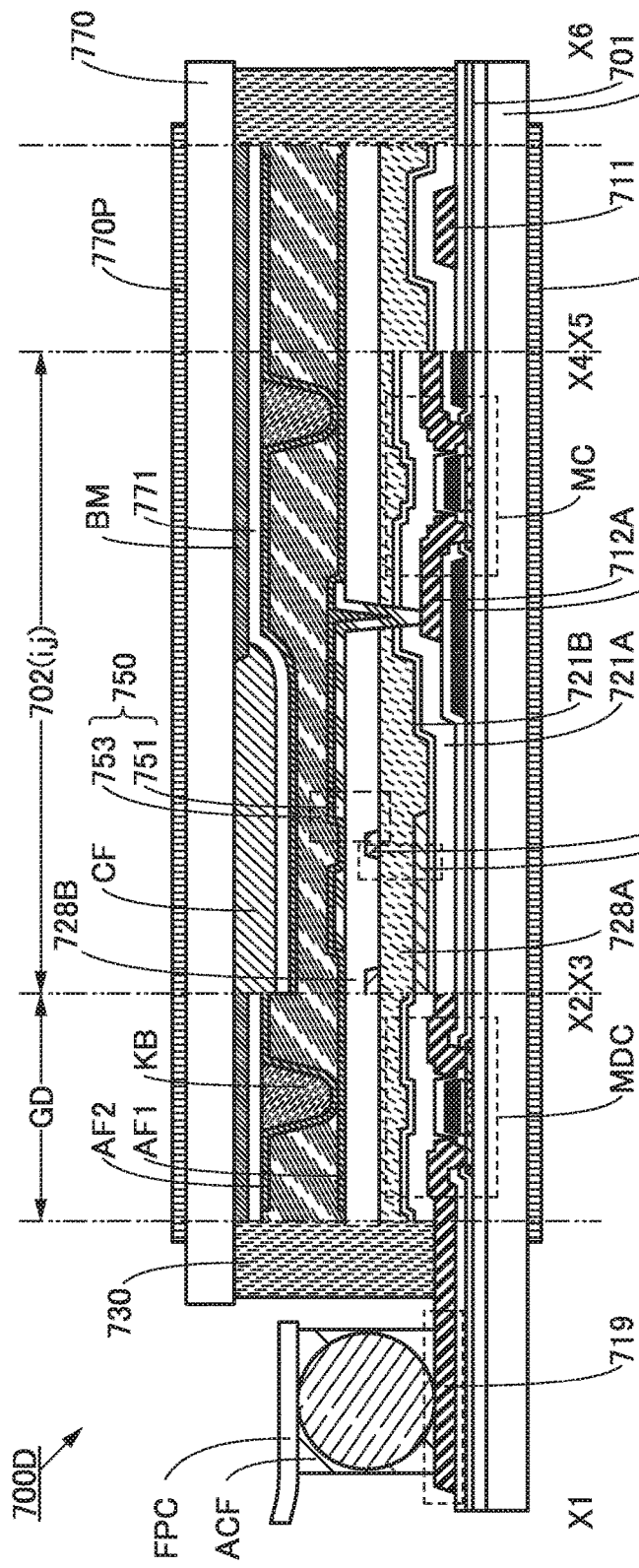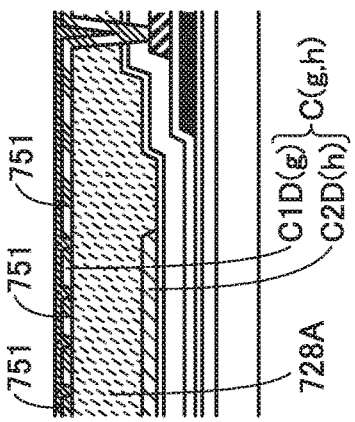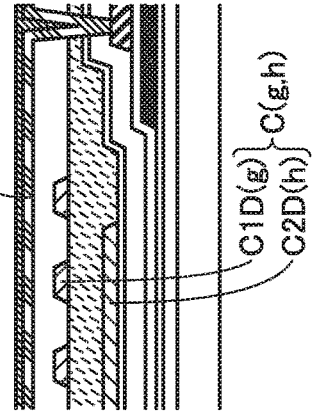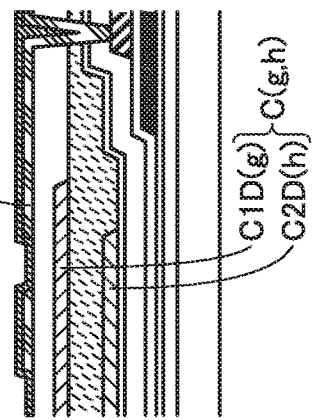

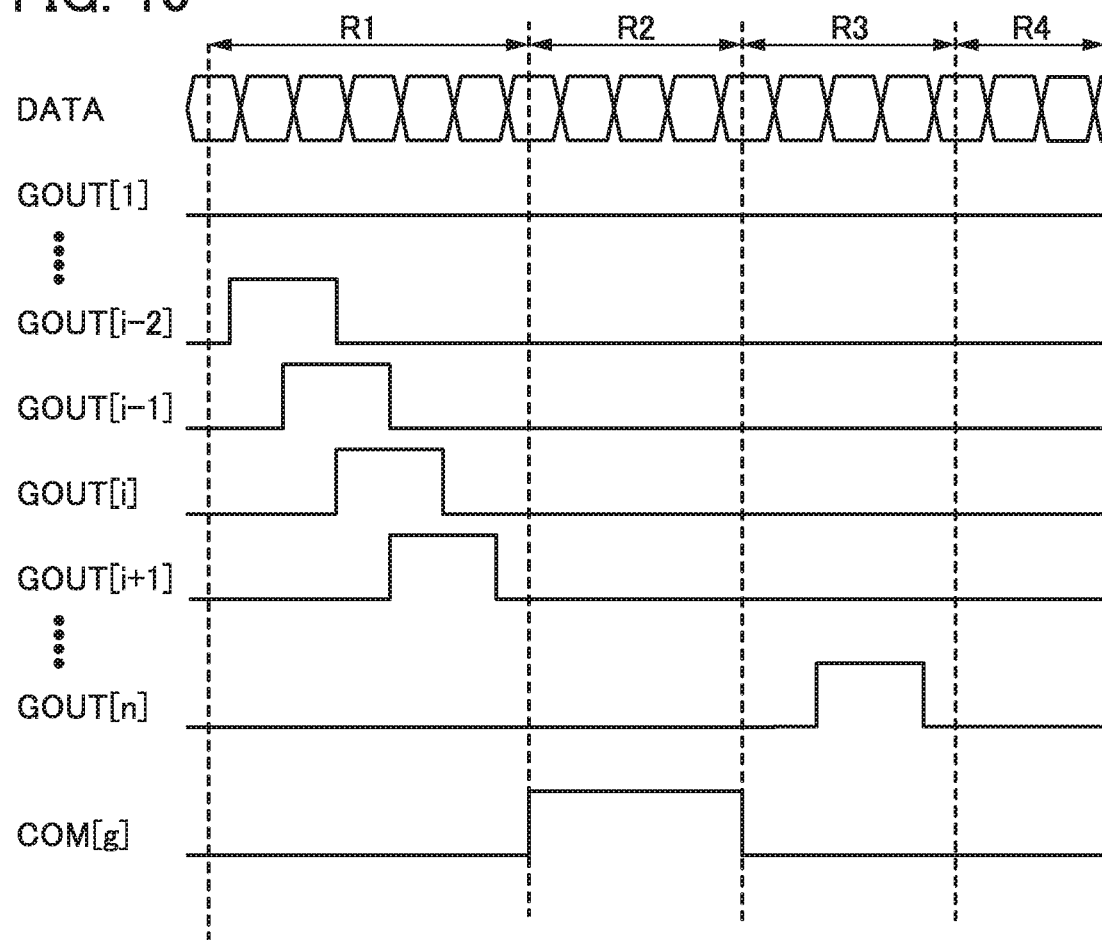

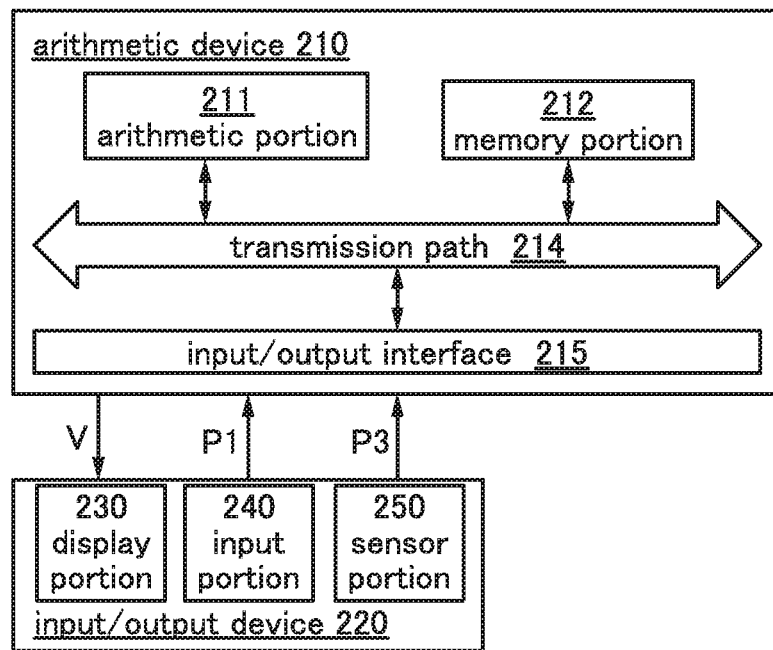
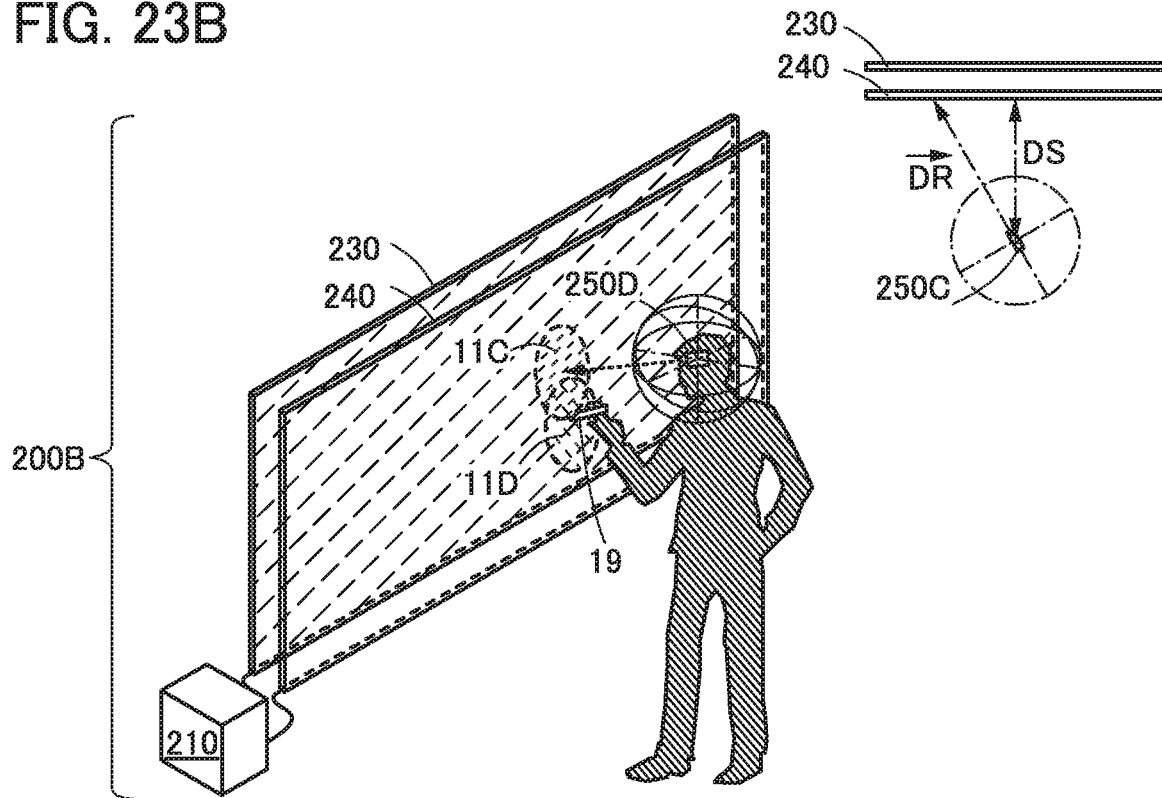

TOUCH PANEL AND DATA PROCESSOR

BACKGROUND OF THE INVENTION

1. Field of the Invention

One embodiment of the present invention relates to a touch panel, a data processor, or a semiconductor device.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

An imaging panel including a plurality of display pixels capable of displaying information and a photoelectric conversion element extending between the plurality of display pixels is known as an example of an optical touch panel (Patent Document 1).

In addition to the optical touch panel, a display device (or a display module) that is provided with a touch sensor as a position-input means has been put to practical use. A display device (or a display module) that is provided with a touch sensor can be called a touch panel, a touch screen, or the like (hereinafter, this type of display device may be simply referred to as a touch panel). Note that a device which does not include a display device and includes only a touch sensor is also called a touch panel in some cases. A display device that is provided with a touch sensor is also called a touch sensor equipped display device, a display device equipped touch panel, a display module, or the like in some cases. Furthermore, a display device in which a touch sensor is incorporated is called an in-cell touch sensor (or an in-cell touch sensor equipped display device), an on-cell touch sensor (or an on-cell touch sensor equipped display device), or the like in some cases. In the in-cell touch sensor, for example, an electrode used for a liquid crystal element is also used as an electrode for the touch sensor. In the on-cell touch sensor, for example, an electrode for the touch sensor is formed on the upper side (the side that is not provided with a display element) of a counter substrate. Examples of a portable information terminal provided with such a touch panel or the like include a smartphone and a tablet terminal (Patent Documents 2 and 3).

REFERENCE

Patent Document

[Patent Document 1] Japanese Published Patent Application No. 2015-5280
[Patent Document 2] Japanese Published Patent Application No. 2011-197685
[Patent Document 3] Japanese Published Patent Application No. 2009-244958

SUMMARY OF THE INVENTION

An object of one embodiment of the present invention is to provide a novel touch panel that is highly convenient or reliable. Another object of one embodiment of the present invention is to provide a novel data processing device that is highly convenient or reliable. Another object is to provide a novel touch panel, a novel data processor, a novel display device, a novel light-emitting element, or a novel semiconductor device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

(1) One embodiment of the present invention is a touch panel including a base, a display element, and a sensor element. The base has a light-transmitting property. The display element includes a region overlapping with the base. The sensor element lies between the display element and the base.

The display element is configured to display an image on the base side. The sensor element is configured to sense an object which approaches or touches the base side.

The sensor element includes a first conductive film, a second conductive film between the first conductive film and the base, and an insulating film between the first conductive film and the second conductive film.

(2) One embodiment of the present invention is the touch panel in which the display element includes a third conductive film and a layer containing a liquid crystal material. The third conductive film is provided so that an electric field for controlling the alignment of the liquid crystal material contained in the layer can be applied between the first conductive film and the third conductive film The touch panel of one embodiment of the present invention includes the sensor element and the display element. The sensor element includes the first conductive film and the second conductive film. The display element includes the liquid crystal layer and the third conductive film which is provided so that an electric field controlling the alignment of the liquid crystal material contained in the liquid crystal layer can be applied between the first conductive film and the third conductive film. Thus, the conductive film included in the sensor element can be used for the display element. As a result, a novel touch panel with high convenience or high reliability can be provided.

(3) One embodiment of the present invention is the touch panel which includes a transistor. The third conductive film is electrically connected to a source electrode or a drain electrode of the transistor.

(4) In the touch panel of one embodiment of the present invention, the transistor includes a semiconductor film and the insulating film includes a region between the layer containing the liquid crystal material and the semiconductor film.

(5) One embodiment of the present invention is the touch panel which includes a scan line and a signal line. The scan line is electrically connected to a gate electrode of the transistor. The signal line is electrically connected to the source electrode or the drain electrode of the transistor.

In addition, the touch panel includes a plurality of transistors electrically connected to the scan line and a plurality of transistors electrically connected to the signal line. The first conductive film comprises an opening overlapping with at least one of the scan line and the signal line, and the second conductive film includes an opening overlapping with at least one of the scan line and the signal line.

The touch panel according to one embodiment of the present invention includes the scan line electrically connected to transistors, the signal line electrically connected to transistors, and the first conductive film or the second conductive film which includes the opening overlapping with the scan line or the signal line. With the structure, the area of a region of the first conductive film or the second conductive film where the scan line or the signal line overlaps can be small and thus the parasitic capacitance of the scan line or the signal line can be small. As a result, a novel touch panel with high convenience or high reliability can be provided.

(6) In the touch panel of one embodiment of the present invention, the semiconductor film of the transistor contains indium, gallium, zinc, and oxygen.

(7) In the touch panel of one embodiment of the present invention, the second conductive film of the sensor element contains indium, gallium, zinc, and oxygen.

The touch panel according to one embodiment of the present invention includes the transistor including the semiconductor film which contains indium, gallium, zinc, and oxygen, and the sensor element including the second conductive film which contains indium, gallium, zinc, and oxygen. Thus, films containing indium, gallium, zinc, and oxygen that can be formed in one process can be used as the semiconductor film or the second conductive film. As a result, a novel touch panel with high convenience or high reliability can be provided.

(8) One embodiment of the present invention is a data processor including an arithmetic device and the above-described touch panel. The arithmetic device is configured to receive positional data and to supply image data and control data. The touch panel is configured to supply the positional data and receive the image data and the control data.

The touch panel includes a display portion that displays the image data and an input portion that supplies the positional data. The input portion is configured to sense the position of a pointer and supply positional data determined in accordance with the position.

The arithmetic device is configured to determine the moving speed of the pointer in accordance with the positional data. The arithmetic device is configured to determine the contrast or brightness of image data in accordance with the moving speed of the pointer.

The above-described data processor, which is one embodiment of the present invention, includes the touch panel that supplies positional data and receives image data and the arithmetic device that receives the positional data and supplies the image data.

With this structure, eyestrain on a user caused when the display position of image data is changed can be reduced, that is, eye-friendly display can be achieved. Thus, a novel data processor which is highly convenient or reliable can be provided.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. Further, in a p-channel transistor, a terminal to which a lower potential is applied is called a drain, and a terminal to which a higher potential is applied is called a source. In this specification, although connection relation of the transistor is described assuming that the source and the drain are fixed in some cases for convenience, actually, the names of the source and the drain interchange with each other depending on the relation of the potentials.

Note that in this specification, a "source" of a transistor means a source region that is part of a semiconductor film functioning as an active layer or a source electrode connected to the semiconductor film. Similarly, a "drain" of the transistor means a drain region that is part of the semiconductor film or a drain electrode connected to the semiconductor film. A "gate" means a gate electrode.

Note that in this specification, a state in which transistors are connected to each other in series means, for example, a state in which only one of a source and a drain of a first transistor is connected to only one of a source and a drain of a second transistor. In addition, a state in which transistors are connected parallel to each other means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, a connection state means not only a state of direct connection but also a state of indirect connection through a circuit element such as a wiring, a resistor, a diode, or a transistor that allows current, voltage, or a potential to be supplied or transmitted.

In this specification, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

In addition, in this specification, one of a first electrode and a second electrode of a transistor refers to a source electrode and the other refers to a drain electrode.

One embodiment of the present invention can provide a novel touch panel that is highly convenient or reliable, or a novel data processor that is highly convenient or reliable. One embodiment of the present invention can provide a novel touch panel, a novel data processor, or a novel semiconductor device.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 5A to 5D illustrate the structure of a touch panel of one embodiment.

FIGS. 6A and 6B illustrate the structure of a touch panel of one embodiment.

FIGS. 7A and 7B illustrate the structure of a touch panel of one embodiment.

FIGS. 8A to 8D illustrate the structure of a touch panel of one embodiment.

FIG. 10 is a timing chart showing a driving method of a touch panel of one embodiment.

FIGS. 23A to 23C illustrate the structure of a data processor of one embodiment.

DETAILED DESCRIPTION OF THE INVENTION

Figure 1A:
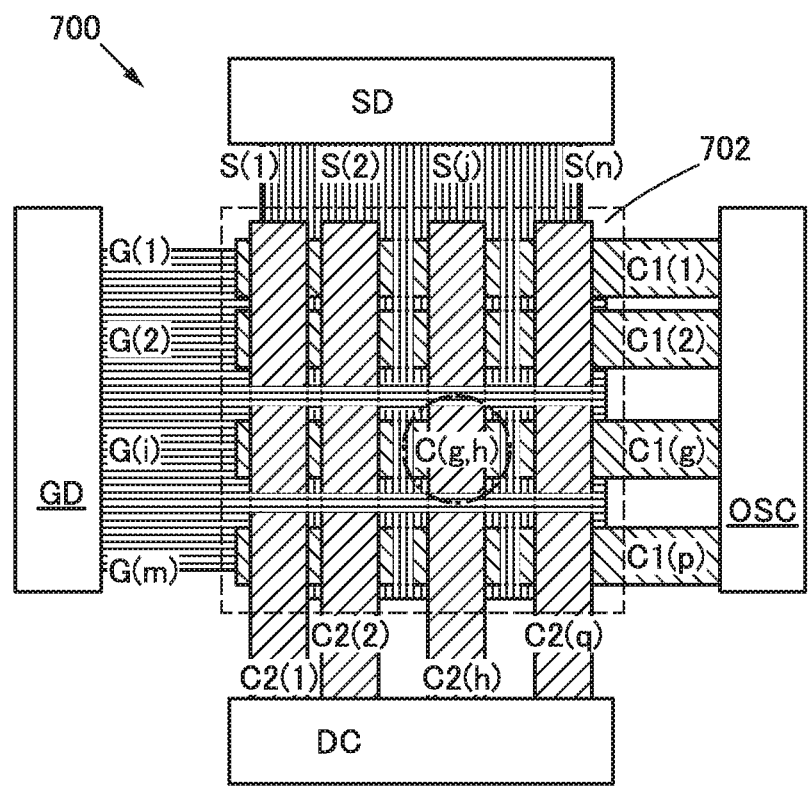
FIGS. 1A and 1B illustrate the structure of a touch panel of one embodiment.

The touch panel of one embodiment of the present invention includes the sensor element and the display element. The sensor element includes the first conductive film and the second conductive film. The display element includes the liquid crystal layer and the third conductive film which is provided so that an electric field controlling the alignment of the liquid crystal material contained in the liquid crystal layer can be applied between the first conductive film and the third conductive film.

Thus, the conductive film included in the sensor element can be used for the display element. As a result, a novel touch panel with high convenience or high reliability can be provided.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

Embodiment 1

In this embodiment, the structure of a touch panel of one embodiment of the present invention will be described with reference to FIGS. 1A and 1B to FIGS. 5A to 5D Note that in this specification, an integral variable of 1 or more may be used for reference numerals. For example, "(p)" where p is an integral variable of 1 or more may be used for part of a reference numeral that specifies any one of components (p components in maximum). For another example, "(m, n)" where m and n are each an integral variable of 1 or more may be used for part of a reference numeral that specifies any one of components (m×n components in maximum).

Figure 1B:
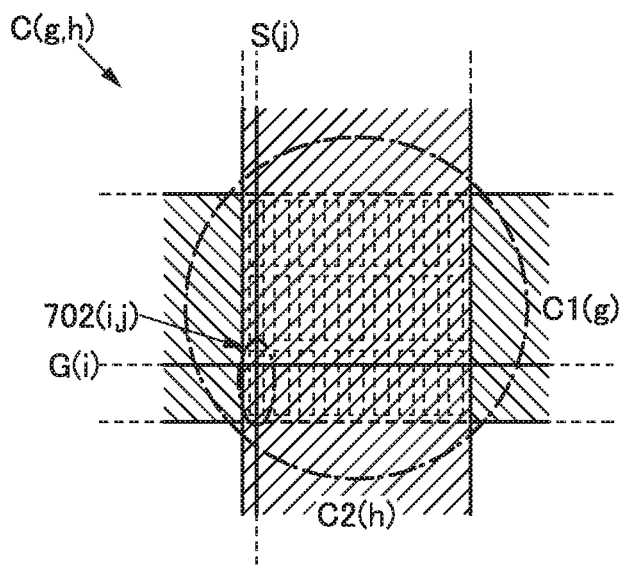

FIGS. 1A and 1B illustrate the structure of a touch panel 700 according to one embodiment of the present invention. FIG. 1A is a block diagram illustrating the components of the touch panel 700. FIG. 1B is a schematic view illustrating the arrangement of a sensor element C(g,h) and a pixel 702(i,j) overlapping with the sensor element C(g,h).

Figure 2A:
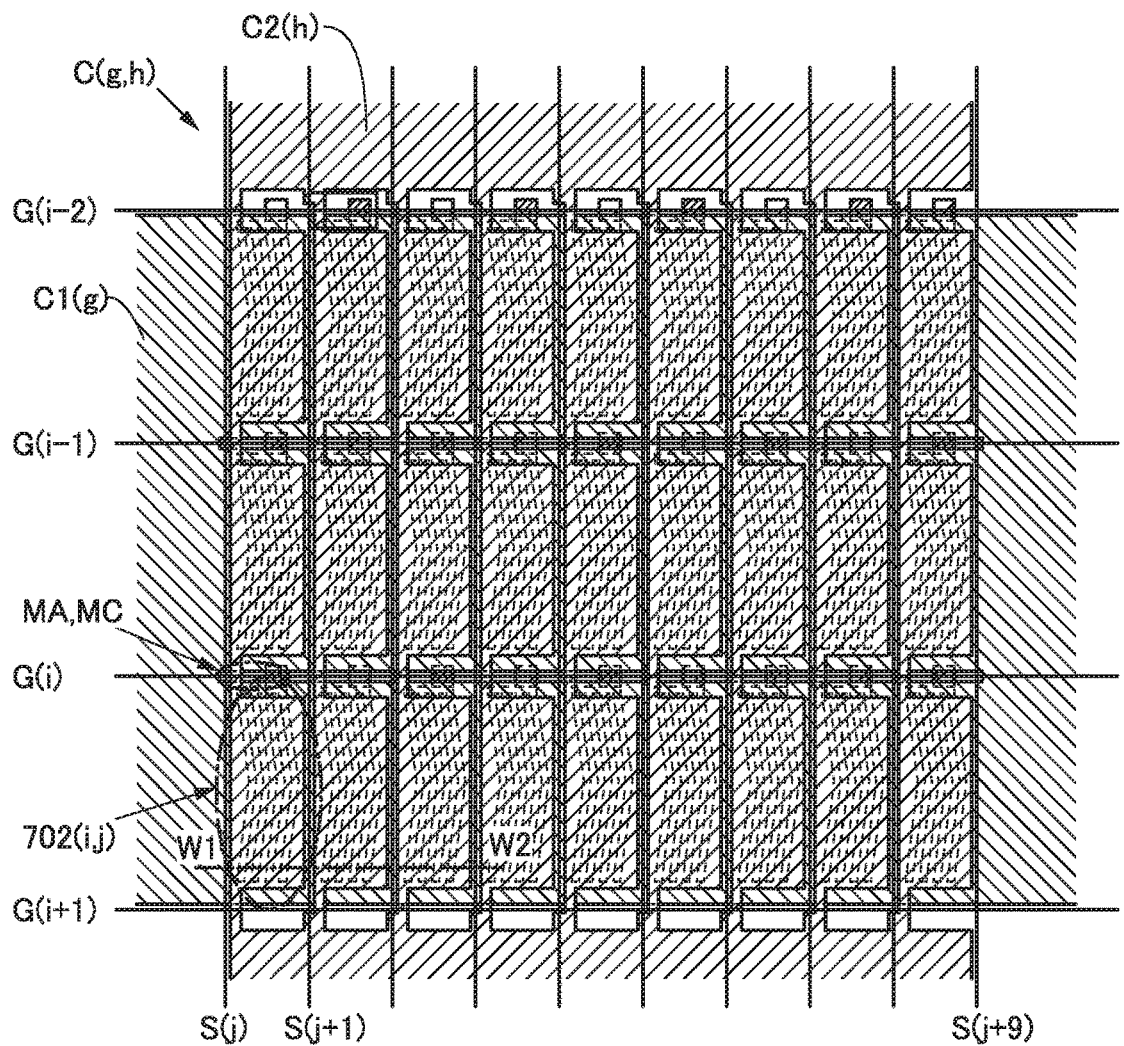
FIGS. 2A and 2B illustrate the structure of a sensor element of one embodiment.
Figure 2B:
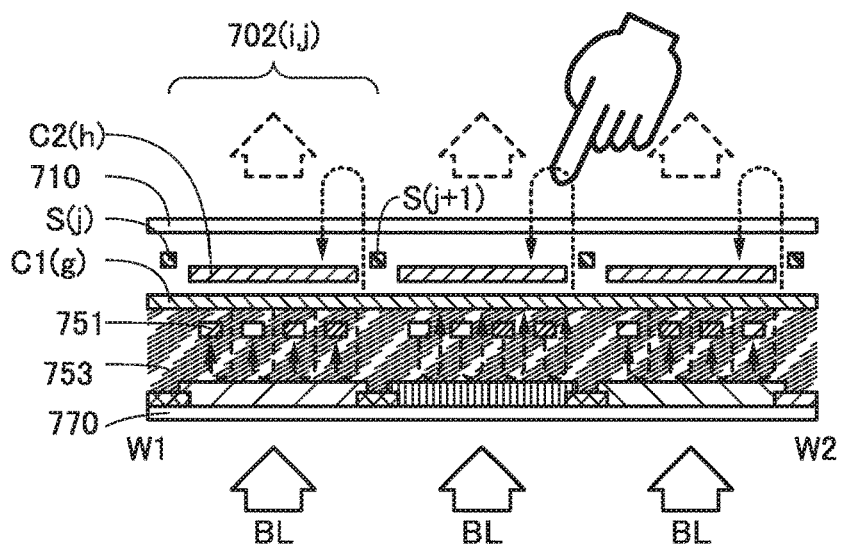

FIGS. 2A and 2B illustrate the structure of the sensor element C(g,h) of the touch panel 700 according to one embodiment of the present invention, which is illustrated in FIGS. 1A and 1B. FIG. 2A is a top view of the sensor element C(g,h), which is one embodiment of the present invention. FIG. 2B is a cross-sectional view of the sensor element C(g,h) and the pixel 702(i,j) taken along the section line W1-W2 in FIG. 2A.

Figure 3A:
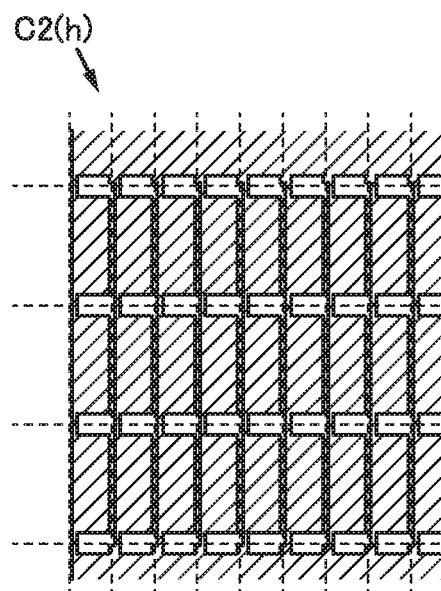
FIGS. 3A to 3C illustrate the structure of a sensor element of one embodiment.
Figure 3B:
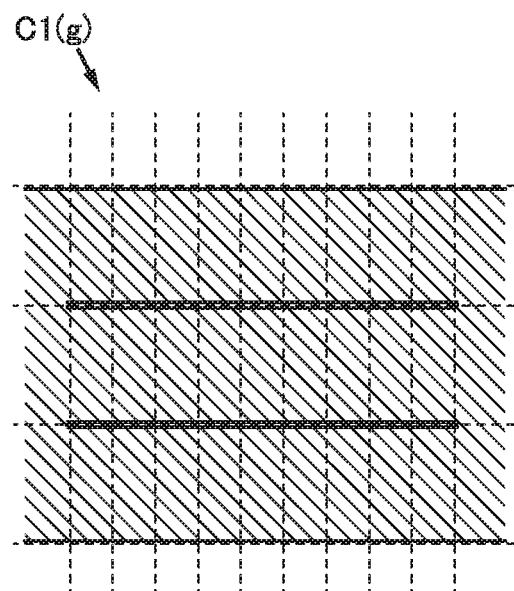
Figure 3C:
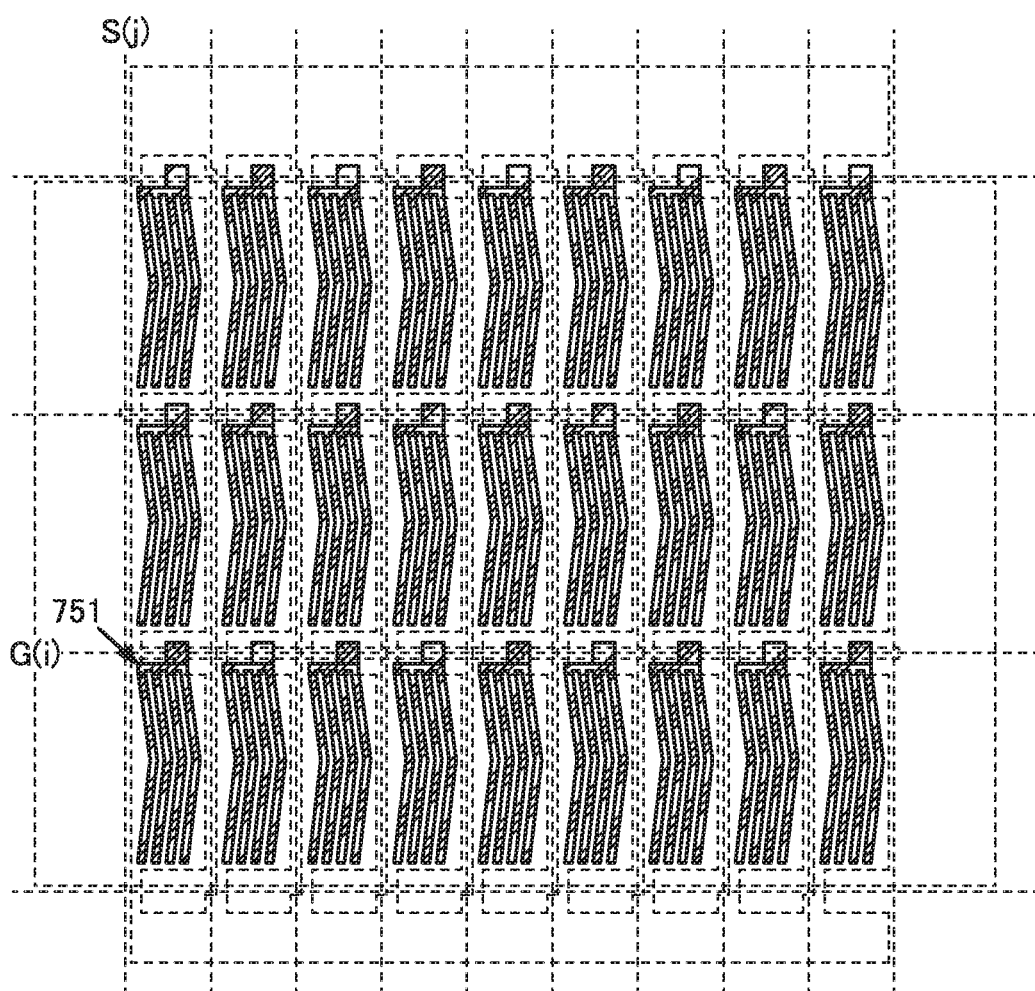

FIGS. 3A to 3C illustrate the structure of the sensor element C(g,h) of the touch panel 700 according to one embodiment of the present invention. FIG. 3A is a top view of a second conductive film C2(h) of the sensor element C(g,h). FIG. 3B is a top view of a first conductive film C1(g) of the sensor element C(g,h). FIG. 3C is a top view of a third conductive film 751 of the touch panel 700, which is one embodiment of the present invention.

Figure 4A:
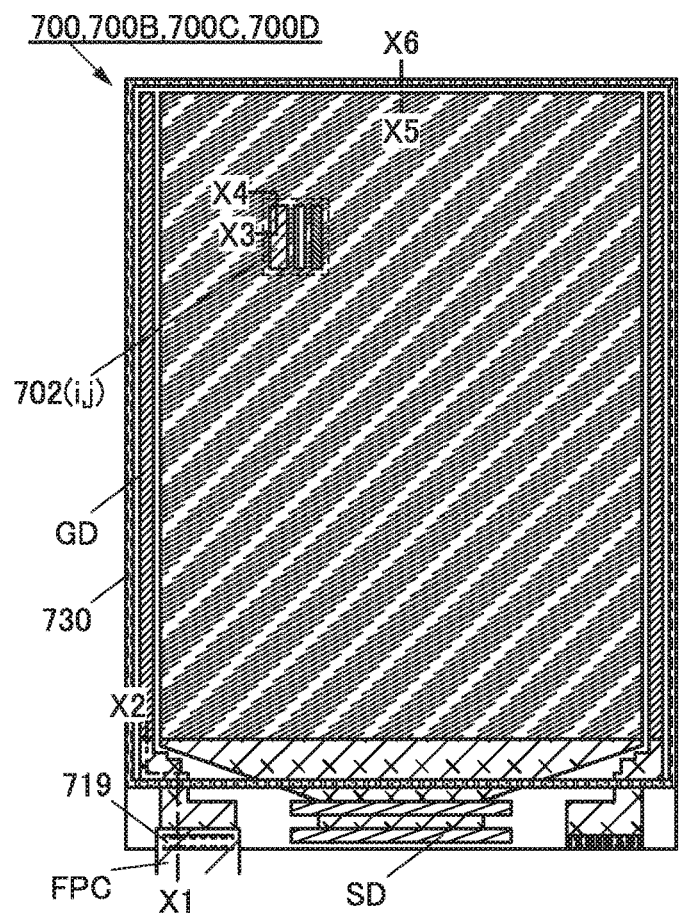
FIGS. 4A and 4B illustrate the structure of a touch panel of one embodiment.
Figure 4B:
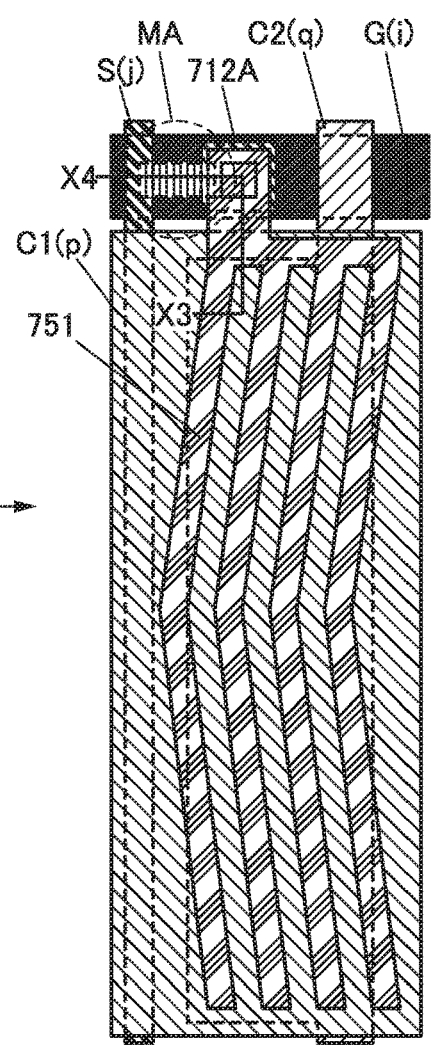

FIGS. 4A and 4B illustrate the structure of the touch panel 700 according to one embodiment of the present invention. FIG. 4A is a bottom view of the touch panel 700, which is one embodiment of the present invention. FIG. 4B is a bottom view of the pixel 702(i,j) of the touch panel 700, which is one embodiment of the present invention.

FIGS. 5A to 5D illustrate the structure of the touch panel 700 according to one embodiment of the present invention. FIG. 5A is a cross-sectional view of the touch panel 700, which is one embodiment of the present invention, taken along the section line X1-X2, X3-X4, and X5-X6 in FIG. 4A. FIG. 5B is a cross-sectional view illustrating the details of a transistor MD which is illustrated in FIG. 5A. FIG. 5C is a cross-sectional view illustrating the details of a transistor MD which is illustrated in FIG. 5A. FIG. 5D is a cross-sectional view illustrating a modification example of part of FIG. 5A.

<Structure Example of Touch Panel 700>

The touch panel 700 described in this embodiment includes a base 710, the pixel 702(i,j), a display element 750, and the sensor element C(g,h) (see FIGS. 5A to 5D).

The base 710 transmits light. The display element 750 includes a region overlapping with the base 710. The sensor element C(g,h) lies between the display element 750 and the base 710.

The pixel 702(i,j) includes the display element 750.

The display element 750 displays images on the base 710 side. For example, a backlight is provided on a base 770 side so that light is emitted from the base 770 side toward the base 710, whereby images can be displayed (see FIG. 2B).

The sensor element C(g,h) senses an object which approaches or touches the base 710 side (see FIG. 2B).

The sensor element C(g,h) includes the first conductive film C1(g), the second conductive film C2(h) between the first conductive film C1(g) and the base 710, and an insulating film 721B between the first conductive film C1(g) and the second conductive film C2(h).

The display element 750 of the touch panel 700 includes a layer 753 containing a liquid crystal material (hereinafter referred to as a liquid crystal layer 753) and the third conductive film 751 which is provided so that an electric field controlling the alignment of the liquid crystal material contained in the liquid crystal layer 753 can be applied between the first conductive film C1(g) and the third conductive film 751.

The touch panel 700 in this embodiment includes the sensor element C(g,h) and the display element 750. The sensor element C(g,h) includes the first conductive film C1(g) and the second conductive film C2(h). The display element 750 includes the liquid crystal layer 753 and the third conductive film 751 which is provided so that an electric field controlling the alignment of the liquid crystal material contained in the liquid crystal layer 753 can be applied between the first conductive film C1(g) and the third conductive film 751. Thus, the conductive film included in the sensor element can be used for the display element. As a result, a novel touch panel with high convenience or high reliability can be provided.

In addition, the touch panel 700 includes the transistor MA electrically connected to the display element 750. The third conductive film 751 is electrically connected to a source electrode or a drain electrode of the transistor MA.

The transistor MA of the touch panel 700 includes a semiconductor film 718. The insulating film 721B includes a region which lies between the liquid crystal layer 753 and the semiconductor film 718 (see FIG. 5C).

The touch panel 700 includes a scan line G(i) electrically connected to the transistor MA, a signal line S(j) electrically connected to the transistor MA, a plurality of transistors electrically connected to the scan line G(i), and a plurality of transistors electrically connected to the signal line S(j) (see FIG. 2A). Specifically, a conductive film 704 serving as a gate electrode of the transistor MA is electrically connected to the scan line G(i), and a conductive film 712B serving as the source electrode or the drain electrode of the transistor MA is electrically connected to the signal line S(j) (see FIG. 5C).

The first conductive film C1(g) or the second conductive film C2(h) has an opening overlapping with the scan line G(i) or the signal line S(j) (see FIG. 3A or FIG. 3B).

The touch panel 700 in this embodiment includes the scan line G(i) electrically connected to transistors MA, the signal line S(j) electrically connected to transistors, and the first conductive film C1(g) or the second conductive film C2(h) which includes the opening overlapping with the scan line S(j) or the signal line G(i). With the structure, the area of a region of the first conductive film or the second conductive film where the scan line or the signal line overlaps can be small and thus the parasitic capacitance of the scan line or the signal line can be small. As a result, a novel touch panel with high convenience or high reliability can be provided.

The semiconductor film 718 of the touch panel 700 contains indium, gallium, zinc, and oxide.

The second conductive film C2(h) of the touch panel 700 contains indium, gallium, zinc, and oxide.

The touch panel 700 in this embodiment includes the transistor MA which includes the semiconductor film 718 containing indium, gallium, zinc, and oxygen and the sensor element C(g,h) which includes the second conductive film C2(h) containing indium, gallium, zinc, and oxygen. Thus, films containing indium, gallium, zinc, and oxygen that can be formed in one process can be used as the semiconductor film or the second conductive film. As a result, a novel touch panel with high convenience or high reliability can be provided.

The touch panel 700 can include a driver circuit GD or a driver circuit SD other than the above components (see FIG. 1A).

The driver circuit GD is electrically connected to the scan line G(i) and supplies a selection signal, for example. The driver circuit SD is electrically connected to the signal line S(j) and supplies an image signal, for example. For example, the transistor MD can be used in the driver circuit GD. For example, a semiconductor film that is formed in the same process as the semiconductor film of the transistor MA can be used in the transistor MD (see FIGS. 5A to 5D).

The touch panel 700 can include an oscillator circuit OSC or a sensor circuit DC (see FIG. 1A).

The oscillator circuit OSC is electrically connected to the first conductive film C1(g) and supplies a driver signal containing a square waveform or the like, for example. In addition, the sensor circuit DC is electrically connected to the second conductive film C2(h). The sensor circuit DC senses the potential of the second conductive film C2(h), which changes depending on the driver signal and the magnitude of an electric field shielded by an object approaching an input/output panel, and supplies a sensor signal.

The touch panel 700 can include p first conductive films (see FIG. 1A) and q second conductive films. Note that p and q are each an integer of 1 or more, g is an integer of 1 or more and p or less, and h is an integer of 1 or more and q or less.

The touch panel 700 can include sensor elements in a matrix of p rows and q columns. Note that the sensor element C(g,h) includes the gth-row first conductive film C1(g) and the hth-column second conductive film C2(h).

Moreover, the touch panel 700 can include m scan lines and n signal lines. Note that m and n are each an integer of 1 or more, i is an integer of 1 or more and m or less, and j is an integer of 1 or more and n or less.

The touch panel 700 can include display elements in a matrix of m rows and n columns. Note that the pixel 702(i,j) includes the display element 750. In addition, the pixel 702(i,j) is electrically connected to the ith-row scan line G(i) and the jth-column signal line S(j).

The touch panel 700 can include a single or a plurality of pixels including a region overlapping with the sensor element. For example, the touch panel 700 can include the pixel 702(i,j) and other pixels overlapping with the sensor element C(g,h) (see FIG. 1B and FIG. 2B).

The touch panel 700 can include a plurality of scan lines which are provided along the first conductive film C1(g). For example, the touch panel 700 can include a scan line G(i−1) and the scan line G(i) along the first conductive film C1(g) (see FIG. 2A). Note that the first conductive film C2(h) may be electrically connected to another conductive film. For example, the first conductive film C2(h) may be connected to a conductive film 704S (see FIG. 5D), so that electrical resistance can be reduced.

The touch panel 700 can include a plurality of signal lines which are provided along the second conductive film. For example, the touch panel 700 can include the signal lines S(j) to S(j+9) which are provided along the second conductive film C2(h) (see FIG. 2A).

The touch panel 700 can include the first conductive film C1(*g*) having an opening. The first conductive film C1(*g*) can be formed using a conductive film having an opening which overlaps with the scan line G(i−1) and an opening which overlaps with the scan line G(i) (see FIG. 3B).

The touch panel 700 can include the second conductive film having an opening. The second conductive film C2(*h*) can be formed using a conductive film having an opening which overlaps with the signal line S(j) and an opening which overlaps with the signal line S(j+9) (see FIG. 3A).

The touch panel 700 can include the third conductive film 751 which is provided so that an electric field in a direction intersecting with the thickness direction of the liquid crystal layer 753 (such an electric field is also referred to as a horizontal electric field) is applied. For example, the comb-like third conductive film 751 including a region overlapping with the first conductive film C1(*g*) can be used (see FIGS. 2A and 2B and FIGS. 3B and 3C). Alternatively, the third conductive film 751 can be provided so that an electric field in the thickness direction of the liquid crystal layer 753 (such an electric field is also referred to as a vertical electric field) is applied.

Components constituting the touch panel of one embodiment of the present invention will be described below. Note that the components cannot be clearly distinguished from one another and one component serves as another component or includes part of another component in some cases.

For example, the first conductive film C1(*g*) serves as part of the display element 750 as well as part of the sensor element C(g,h).

The touch panel 700 can include the base 770 and a sealant 730. The base 770 includes a region overlapping with the base 710. The sealant 730 bonds the base 710 and the base 770. Thus, for example, the display element 750 can be provided n a region surrounded by the base 710, the base 770, and the sealant 730.

The touch panel 700 can include a structure KB between the base 710 and the base 770, and a predetermined gap can be provided between the base 710 and the base 770.

The touch panel 700 can include a coloring film CF which has a region overlapping with the display element 750 and a light-blocking film BM which has an opening in a region overlapping with the display element 750.

The touch panel 700 can include an insulating film 771 between the coloring film CF and the liquid crystal layer 753 and between the light-blocking film BM and the liquid crystal layer 753. Thus, the unevenness due to the thickness of the coloring film CF can be reduced, or impurities can be prevented from being diffused from the coloring film CF or the light-blocking film BM to the liquid crystal layer 753.

The touch panel 700 can include an alignment film AF1 between the liquid crystal layer 753 and the base 710 and an alignment film AF2 between the liquid crystal layer 753 and the base 770.

The touch panel 700 can include an optical film 710P or an optical film 770P. For example, the optical film 710P can be provided such that the base 710 lies between the liquid crystal layer 753 and the optical film 710P. The optical film 770P can be provided such that the base 770 lies between the liquid crystal layer 753 and the optical film 770P.

The optical films 710P and 770P can be formed using polarizing plates. One of the polarizing plates is provided in a predetermined polarization direction with respect to the polarization direction of the other of the plates. Specifically, the two linear polarizing plates are provided in a cross-Nicol state.

The touch panel 700 can include a conductive film 724 which has a region overlapping with the semiconductor film 718 of the transistor MD. The conductive film 724 can be formed of a material which can be formed in the same process as the first conductive film C1(*g*) (see FIG. 5B).

The touch panel 700 can include an insulating film 701 between the transistor MA and the base 710. The touch panel 700 can include the insulating film 721B or an insulating film 728 between the liquid crystal layer 753 and the semiconductor film 718. The touch panel 700 can include an insulating film 721A between the insulating film 721B and the semiconductor film 718.

For example, the insulating film 701 suppresses impurity diffusion from the base 710 to the transistor MA, and the insulating film 721B or the insulating film 721A has a function of suppressing impurity diffusion to the semiconductor film 718.

For example, the insulating film 728 makes a step due to the transistor MA or the like which overlaps with the insulating film 728 flat.

The touch panel 700 can include an insulating film 706 between the conductive film 704 and the semiconductor film 718. For example, the insulating film 706 functions as a gate insulating film.

The touch panel 700 can include a wiring 711 which is electrically connected to the display element 750 or the sensor element C(g,h).

The touch panel 700 can include a terminal 719 which is electrically connected to the wiring 711. For example, the flexible printed circuit board FPC can be electrically connected to the terminal 719 using a conductive member ACF.

<<Structure>>

The touch panel 700 includes the base 710, the display element 750, or the sensor element C(g,h).

The touch panel 700 includes the first conductive film C1(*g*), the second conductive film C2(*h*), the insulating film 721B, the liquid crystal layer 753, or the third conductive film 751.

The touch panel 700 includes the transistor MA, the semiconductor film 718, the scan line G(i), or the signal line S(j).

The touch panel 700 can include the oscillator circuit OSC, the sensor circuit DC, the driver circuit GD, or the driver circuit SD.

<<Base 710>>

A light-transmitting material is used for the base 710.

A material having heat resistance high enough to withstand heat treatment in the manufacturing process can be used for the base 710.

For example, a large-sized glass substrate having any of the following sizes can be used as the base 710: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the base 710, an organic material, an inorganic material, a composite material of an organic material and an inorganic material, or the like can be used. For example, an inorganic material such as glass, ceramic, or metal can be used for the base 710.

Specifically, non-alkali glass, soda-lime glass, potash glass, crystal glass, quartz, sapphire, or the like can be used for the base 710. Specifically, an inorganic oxide film, an inorganic nitride film, an inorganic oxynitride film, or the like can be used for the base 710. For example, a silicon oxide film, a silicon nitride film, a silicon oxynitride film, or an alumina film can be used for the base 710. For example, stainless steel or aluminum can be used for the base 710.

For example, a single crystal semiconductor substrate or a polycrystalline semiconductor substrate of silicon or silicon carbide, a compound semiconductor substrate of silicon germanium or the like, or an SOI substrate can be used as the base 710. Thus, a semiconductor element can be provided over the base 710.

For example, an organic material such as a resin, a resin film, or plastic can be used for the base 710. Specifically, a resin film or resin plate of polyester, polyolefin, polyamide, polyimide, polycarbonate, an acrylic resin, or the like can be used for the base 710.

For example, a composite material formed by attaching a metal plate, a thin glass plate, or a film of an inorganic material to a resin film or the like can be used for the base 710. For example, a composite material formed by dispersing a fibrous or particulate metal, glass, inorganic material, or the like into a resin film can be used for the base 710. For example, a composite material formed by dispersing a fibrous or particulate resin, organic material, or the like into an inorganic material can be used for the base 710.

Furthermore, a single-layer material or a layered material in which a plurality of layers are stacked can be used for the base 710. For example, a layered material in which a base, an insulating film that prevents diffusion of impurities contained in the base, and the like are stacked can be used for the base 710. Specifically, a layered material in which glass and one or a plurality of films that are selected from a silicon oxide layer, a silicon nitride layer, a silicon oxynitride layer, and the like and that prevent diffusion of impurities contained in the glass are stacked can be used for the base 710. Alternatively, a layered material in which a resin and a film for preventing diffusion of impurities that penetrate the resin, such as a silicon oxide film, a silicon nitride film, and a silicon oxynitride film are stacked can be used for the base 710.

Specifically, a resin film, a resin plate, a stack, or the like of polyester, polyolefin, polyamide, polyimide, polycarbonate, an acrylic resin, or the like can be used for the base 710.

Specifically, a material including polyester, polyolefin, polyamide (e.g., nylon or aramid), polyimide, polycarbonate, polyurethane, an acrylic resin, an epoxy resin, a resin having a siloxane bond such as silicone, or the like can be used for the base 710. Alternatively, a film, a plate, a stacked body, or the like which contains any one or more of the resins can be used for the base 710.

Specifically, polyethylene terephthalate (PET), polyethylene naphthalate (PEN), polyethersulfone (PES), acrylic, or the like can be used for the base 710.

Note that a transistor, a capacitor, or the like can be directly formed on the base 710. Alternatively, a transistor, a capacitor, or the like formed on a substrate for use in manufacturing processes which can withstand heat applied in the manufacturing process can be transferred to the base 710.

<<Base 770>>

A material that can be used for the base 710 can be used for the base 770.

<<Conductive Film 704, 712A, 712B, Wiring 711, Terminal 719>>

The conductive film 704, the conductive film 712A, the conductive film 712B, the wiring 711, or the terminal 719 can be formed using a conductive material.

The conductive film 704, the conductive film 712A, the conductive film 712B, the wiring 711, or the terminal 719 can be formed using an inorganic conductive material, an organic conductive material, a metal, conductive ceramics, or the like.

Specifically, a metal element selected from aluminum, gold, platinum, silver, copper, chromium, tantalum, titanium, molybdenum, tungsten, nickel, iron, cobalt, palladium, and manganese, or the like can be used for the conductive film 704, the conductive film 712A, the conductive film 712B, the wiring 711, or the terminal 719. Alternatively, an alloy including any of the above-described metal elements, or the like can be used for the conductive film 704, the conductive film 712A, the conductive film 712B, the wiring 711, or the terminal 719. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used for the conductive film 704, the conductive film 712A, the conductive film 712B, the wiring 711, or the terminal 719.

Specifically, a conductive oxide such as indium oxide, indium tin oxide, indium zinc oxide, zinc oxide, or zinc oxide to which gallium is added can be used for the conductive film 704, the conductive film 712A, the conductive film 712B, the wiring 711, or the terminal 719.

Specifically, a film containing graphene or graphite can be used for the conductive film 704, the conductive film 712A, the conductive film 712B, the wiring 711, or the terminal 719.

For example, a film including graphene oxide is formed and is reduced, so that a film including graphene can be formed. As a reducing method, a method using heat, a method using a reducing agent, or the like can be employed.

A conductive polymer can be used for the conductive film 704, the conductive film 712A, the conductive film 712B, the wiring 711, or the terminal 719.

<<Scan Line G(i), Signal Line S(j)>>

The scan line G(i) and the signal line S(j) can be formed using a conductive material, such as a material which can be used for the wiring 711.

<<Sensor Element C(g,h)>>

The sensor element C(g,h) senses a change in the magnitude of an electric field, capacitance, illuminance, a magnetic force, a radio wave, pressure, or the like and supplies a signal based on the sensed physical quantity.

For example, a capacitor, a photoelectric conversion element, a magnetic sensing element, a piezoelectric element, a resonator, or the like can be used as the sensor element C(g,h).

As the sensor element C(g,h), a sensor element supplying a signal which changes depending on a change in the magnitude of an electric field which is shielded by an object approaching the input/output panel can be used. Specifically, a self-capacitive method or a mutual capacitive method can be used.

For example, the sensor element C(g,h) can be a capacitor including the first conductive film C1(*g*) and the second conductive film C2(*h*).

Note that in the air, when a finger or the like whose dielectric constant is larger than that of the air approaches the second conductive film C2(*h*), the magnitude of an electric field shielded by the finger is changed. A signal can be supplied depending on a change in the magnitude of the electric field.

Specifically, a driver signal can be supplied to the first conductive film C1(g), the potential of the second conductive film C2(h) which changes depending on the driver signal and the static capacitance can be sensed, and the sensed potential can be used as a sensor signal.

<<First Conductive Film C1(g)>>

A conductive material can be used for the first conductive film C1(g). For example, a material which can be used for the wiring 711 can be used for the first conductive film C1(g).

Specifically, a light-transmitting conductive material can be used for the first conductive film C1(g). For example, a conductive oxide such as indium oxide, indium tin oxide, indium zinc oxide, zinc oxide, or zinc oxide to which gallium is added can be used. Thus, the first conductive film C1(g) can supply a uniform electric field without shielding the display of the display element 750.

<<Second Conductive Film C2(h)>>

A conductive material can be used for the second conductive film C2(h). For example, a light-transmitting conductive material can be used for the second conductive film C2(h). Specifically, a conductive oxide or an oxide semiconductor can be used. For example, a material containing indium, gallium, zinc, and oxide can be used.

For example, an oxide semiconductor whose conductivity is increased using a method for controlling the resistivity and which is formed in the same process as the semiconductor film 718 can be used for the second conductive film C2(h). The second conductive film C2(h) can thus be formed in a simple process.

Note that the method for controlling the resistivity of an oxide semiconductor will be described in the end of this embodiment.

<<Insulating Film 701, 706, 721a, 721B, 728, 771>>

For example, an inorganic insulating material, an organic insulating material, or an insulating composite material containing an inorganic material and an organic material can be used for the insulating film 701, the insulating film 706, the insulating film 721A, the insulating film 721B, the insulating film 728, or the insulating film 771.

Specifically, an inorganic oxide film, an inorganic nitride film, an inorganic oxynitride film, or a material obtained by stacking any of these films can be used for the insulating film 701, the insulating film 706, the insulating film 721A, the insulating film 721B, the insulating film 728, or the insulating film 771. For example, a silicon oxide film, a silicon nitride film, a silicon oxynitride film, or a material obtained by stacking any of these films can be used.

Specifically, polyester, polyolefin, polyamide, polyimide, polycarbonate, polysiloxane, an acrylic resin, or a stacked or composite material including resins selected from these, or the like can be used for the insulating film 721A, the insulating film 721B, the insulating film 728, or the insulating film 771. A photosensitive material may be used.

The insulating film 771 can be formed of polyimide, an epoxy resin, an acrylic resin, or the like.

The insulating film 721B can be formed using a hydrogen-containing insulating film, for example. Specifically, the insulating film 721B can be formed of a material which can be used for a method for controlling the resistivity of the oxide semiconductor when being in contact with the oxide semiconductor.

For example, the insulating film 721B can be formed of a material which causes hydrogen diffusion when being in contact with an oxide semiconductor formed in the same process as the semiconductor film 718.

Note that the method for controlling the resistivity of an oxide semiconductor will be described later in the end of this embodiment.

<<Display Element 750>>

For example, a display element having a function of controlling transmission or reflection of light can be used as the display element 750. For example, a combined structure of a polarizing plate and a liquid crystal element or a MEMS shutter display element can be used.

Specifically, a liquid crystal element driven in any of the following driving modes can be used: an in-plane-switching (IPS) mode, a twisted nematic (TN) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, or an advanced super V (ASV) mode can be used for the display element 750.

For example, the display element 750 can include the liquid crystal layer 753, the first conductive film C1(g), and the third conductive film 751. The first conductive film C1(g) and the third conductive film 751 are disposed to apply an electric field for controlling the alignment of the liquid crystal material.

<<Liquid Crystal Layer 753>>

For example, thermotropic liquid crystal, low-molecular liquid crystal, high-molecular liquid crystal, polymer dispersed liquid crystal, ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like depending on conditions. Alternatively, a liquid crystal material which exhibits a blue phase can be used for the liquid crystal layer 753.

<<Third Conductive Film 751>>

The third conductive film 751 can be formed using a conductive material.

The third conductive film 751 can be formed of a material which can be used for the wiring 711, such as a light-transmitting material, and can have a comb-like shape, for example.

<<Transistor MA>>

As the transistor MA, a bottom-gate transistor, a top-gate transistor, or the like can be used.

For example, a transistor having a lower leakage current in an off state than a transistor that uses amorphous silicon for a semiconductor film can be used as the transistor MA. Specifically, a transistor in which an oxide semiconductor is used for the semiconductor film 718 can be used as the transistor MA.

Thus, a pixel circuit can hold an image signal for a longer time than a pixel circuit including a transistor that uses amorphous silicon for a semiconductor film. Specifically, a selection signal can be supplied at a frequency of lower than 30 Hz, preferably lower than 1 Hz, more preferably less than once per minute while flickering is suppressed. Consequently, eyestrain on a user of the data processor can be reduced, and the driving power consumption can be reduced.

The transistor MA includes the semiconductor film 718 and a conductive film 704 having a region overlapping with the semiconductor film 718 (see FIG. 5B). The transistor MA further includes a conductive film 712A and a conductive film 712B.

Note that the conductive film 704 and the insulating film 706 serve as a gate electrode and a gate insulating film, respectively. The conductive film 712A serves as one of a source electrode and a drain electrode, and the conductive film 712B serves as the other of the source electrode and the drain electrode.

<<Semiconductor Film 718>>

The semiconductor film 718 can be formed using a semiconductor containing an element of Group 4, for example. Specifically, a semiconductor containing silicon can be used for the semiconductor film 718. For example, single crystal silicon, polysilicon, microcrystalline silicon, or amorphous silicon can be used for the semiconductor film 718.

For example, an oxide semiconductor can be used for the semiconductor film 718. Specifically, an oxide semiconductor containing indium or an oxide semiconductor containing indium, gallium, and zinc can be used for the semiconductor film.

For example, a compound semiconductor can be used for the semiconductor film 718. Specifically, a semiconductor containing gallium arsenide can be used for the semiconductor film 718.

For example, an organic semiconductor can be used for the semiconductor film 718. Specifically, an organic semiconductor containing any of polyacenes or graphene can be used for the semiconductor film 718.

<<Driver Circuit GD>>

Any of a variety of sequential circuits, such as a shift register, can be used as the driver circuit GD. For example, the transistor MD, a capacitor, and the like can be used in the driver circuit GD.

For example, a semiconductor film that is formed at the same step as the semiconductor film 718 included in the transistor MA can be used in the transistor MD.

Specifically, as the transistor MD, a transistor having the same structure as the transistor MA can be used. Alternatively, as the transistor MD, a transistor different from the transistor MA can be used.

Specifically, the transistor MD can include the conductive film 724 which has a region overlapping with the conductive film 704 serving as a first gate electrode.

The transistor MD includes a stacked-layer of the insulating film 721B and the insulating film 721A between the conductive film 724 and the semiconductor film 718.

For example, the conductive film 724 is electrically connected to a wiring supplying the same potential as that supplied to the conductive film 704.

<<Driver Circuit SD>>

For example, an integrated circuit can be used in the driver circuit SD. Specifically, an integrated circuit formed over a silicon substrate can be used.

For example, a chip on glass (COG) method can be used to mount the driver circuit SD on a pad which is electrically connected to the signal line SU), using an anisotropic conductive film.

<<Oscillation Circuit OSC>>

The oscillation circuit OSC has a function of, for example, supplying one or more signals to one or more first conductive films selected from the first conductive film C1(1) to the first conductive film C1(*p*) (see FIG. 1A).

<<Sensor Circuit DC>>

The sensor circuit DC has a function of, for example, dividing and amplifying one or more signals supplied to one or more second conductive films selected from the second conductive films C2(1) to C2(*q*).

<<Sealant 730>>

For example, an inorganic material, an organic material, a composite material of an inorganic material and an organic material, or the like can be used for the sealant 730.

For example, an organic material such as a thermally fusible resin or a curable resin can be used for the sealant 730.

For the sealant 730, an organic material such as a reactive curable adhesive, a photo-curable adhesive, a thermosetting adhesive, and/or an anaerobic adhesive can be used.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, or an ethylene vinyl acetate (EVA) resin, or the like can be used for the sealant 730.

<<Coloring Film CF>>

The coloring film CF can be formed using a material transmitting light of a predetermined color and can thus be used as a color filter or the like.

For example, the coloring film CF can be formed using a material transmitting light of blue, green, red, yellow, or white.

<<Light-Blocking Film BM>>

The light-blocking film BM can be formed using a material that prevents light transmission and can thus be used as a black matrix, for example.

<<Structure KB>>

For example, an organic material, an inorganic material, or a composite material of an organic material and an inorganic material can be used for the structure KB. Thus, a predetermined space can be provided between components between which the structure KB is provided.

Specifically, for the structure KB, polyester, polyolefin, polyamide, polyimide, polycarbonate, polysiloxane, an acrylic resin, or the like, or a composite material of a plurality of kinds of resins selected from these can be used. Alternatively, a photosensitive material may be used.

<<Alignment Films AF1 and AF2>>

The alignment films AF1 and AF2 can be formed of polyimide or the like. Specifically, an alignment film subjected to a rubbing process or an optical alignment process for alignment in a predetermined direction can be used.

<<Optical Film 710P, 770P>>

For example, a polarizing plate, a retardation plate, a diffusing film, an anti-reflective film, a condensing film, or the like can be used as the optical film 710P or the optical film 770P. Alternatively, a polarizing plate containing a dichromatic pigment can be used for the optical film 710P.

Alternatively, an antistatic film preventing the attachment of a foreign substance, a water repellent film suppressing the attachment of stain, a hard coat film suppressing a scratch in use, or the like can be used for the optical film 710P.

<Structure Example of Touch Panel 700B>

Another structure of a touch panel of one embodiment of the present invention is described below with reference to FIGS. 6A and 6B.

FIGS. 6A and 6B illustrate the structure of a touch panel 700B of one embodiment of the present invention. FIG. 6A is a cross-sectional view of the touch panel 700, which is one embodiment of the present invention, taken along the section lines X1-X2, X3-X4, and X5-X6 in FIG. 4A. FIG. 6B is a cross-sectional view showing the detail of a transistor MDB shown in FIG. 6A.

Note that the touch panel 700B is different from the touch panel 700 in FIGS. 5A to 5D in that a conductive film 724B is included instead of the conductive film 724 (see FIG. 6B) and that the second conductive film C2B(h) is included instead of the second conductive film C2(h) (see FIG. 6A). Different structures will be described in detail below, and the above description is referred to for the other similar structures.

The touch panel 700B in this embodiment includes the conductive film 724B between the insulating film 721A and the insulating film 721B and includes the second conductive film C2B between the insulating film 721A and the insulating film 721B. The conductive film 724B and the second conductive film C2B contain conductive oxides (see FIG. 6A or 6B).

<<Conductive Film 724B, Second Conductive Film C2B(h)>>

Specifically, an oxide semiconductor whose conductivity is increased using a method for controlling the resistivity thereof can be used for the conductive film 724B and the second conductive film C2B(h).

Specifically, a conductive oxide, such as an indium oxide, indium tin oxide, indium zinc oxide, an oxide containing indium, gallium, and zinc, a zinc oxide, or a zinc oxide to which gallium is added, can be used for the conductive film 724B and the second conductive film C2B(h).

For example, an oxide semiconductor and a hydrogen-diffusing material can be used respectively for the conductive film 724B and the insulating film 721B which is in contact with the conductive film 724B and the second conductive film C2B(h). Thus, the resistivity of the conductive film 724B and that of the second conductive film C2B(h) can be lowered.

Note that the method for controlling the resistivity of an oxide semiconductor will be described in the end of this embodiment.

<Structure Example of Touch Panel 700C>

Another structure of the touch panel of one embodiment of the present invention is described below with reference to FIGS. 7A and 7B.

FIGS. 7A and 7B are cross-sectional views of a display panel 700C, which is one embodiment of the present invention. FIG. 7A is a cross-sectional view of the touch panel 700 taken along the section lines X1-X2, X3-X4, and X5-X6 in FIG. 4A. FIG. 7B is a cross-sectional view showing the details of a transistor MDC in FIG. 6A.

Note that the touch panel 700C is different from the touch panel 700 in FIGS. 5A to 5C in that a top-gate transistor MC is included instead of the bottom-gate transistor MA, that the top-gate transistor MDC is included instead of the bottom-gate transistor MD, and that a second conductive film C2C(h) is included instead of the second conductive film C2(h) (see FIG. 7A). Different structures will be described in detail below, and the above description is referred to for the other similar structures.

<<Transistor MC, Transistor MDC>>

The transistor MDC includes the conductive film 704 having a region overlapping with an insulating film 701C and the semiconductor film 718 having a region provided between the insulating film 701C and the conductive film 704. Note that the conductive film 704 functions as a gate electrode (see FIG. 7B).

The semiconductor film 718 includes a first region 718A, a second region 718B, and a third region 718C. The first region 718A and the second region 718B do not overlap with the conductive film 714. The third region 718C is positioned between the first region 718A and the second region 718B and overlaps with the conductive film 704.

The transistor MDC includes an insulating film 706 between the third region 718C and the conductive film 704. Note that the insulating film 706 functions as a gate insulating film.

The first region 718A and the second region 718B have a lower resistance than the third region 718C, and function as a source region and a drain region.

Note that, for example, a method for controlling the resistivity of the oxide semiconductor film, which is described in the end of this embodiment, can be used as a method for forming the first region 718A and the second region 718B in the semiconductor film 718. Specifically, plasma treatment using a gas containing a rare gas can be used.

For example, when the conductive film 704 is used as a mask, the shape of part of the third region 718C can be the same as the shape of an end portion of the conductive film 704.

The transistor MDC includes the conductive films 712A and 712B which are in contact with the first region 718A and the second region 718B, respectively. The conductive film 712A serves as one of the source electrode and drain electrode, and the conductive film 712B serves as the other thereof.

The transistor which can be formed in the same process as the transistor MDC can be used as the transistor MC.

<<Second Conductive Film C2C(h)>>

For example, an oxide semiconductor which is formed in the same process as the first region 718A and the second region 718B of the semiconductor film can be used for the second conductive film C2C(h). Thus, the second conductive film C2C(h) can be formed by a simple process.

<Structure Example of Touch Panel 700D>

Another structure of the touch panel of one embodiment of the present invention is described below with reference to FIGS. 8A to 8D FIGS. 8A to 8D are cross-sectional views of the display panel 700D, which is one embodiment of the present invention. FIG. 8A is a cross-sectional view of the touch panel 700 taken along the section lines X1-X2, X3-X4, and X5-X6 in FIG. 4A. FIGS. 8B to 8D are cross-sectional views showing modification examples where some components shown in FIG. 8A are changed.

Note that the touch panel 700D is different from the touch panel 700C shown in FIGS. 7A and 7B in that an insulating film 728B is included between the liquid crystal layer 753 and the insulating film 728A, that a first conductive film C1D(g) is included instead of the first conductive film C1(g), and that a second conductive film C2D(h) is included instead of the second conductive film C2C(h). Different structures will be described in detail below, and the above description is referred to for the other similar structures.

<<Insulating Film 728A>>

For example, the material that can be used for the insulating film 728 can be used for the insulating film 728A.

<<Insulating Film 728B>>

The touch panel 700D includes the insulating film 728B between the liquid crystal layer 753 and the insulating film 728A.

For example, the material that can be used for the insulating film 728 can be used for the insulating film 728B.

<<First Conductive Film C1D(g)>>

The touch panel 700D includes the first conductive film C1D(g) between the insulating films 728A and 728B.

The first conductive film C1D(g) can have an opening in a region overlapping with the comb-like third conductive film 751.

For example, a conductive material can be used for the first conductive film C1D(g). For example, the material that can be used for the wiring 711 can be used for the first conductive film C1D(g).

Specifically, a light-transmitting conductive material can be used for the first conductive film C1D(g). For example, a conductive oxide such as indium oxide, indium tin oxide, indium zinc oxide, zinc oxide, or zinc oxide to which gallium is added can be used. Thus, the first conductive film C1D(g) can supply a uniform electric field without shielding the display of the display element 750.

<<Second Conductive Film C2D(h)>>

A conductive material can be used for the second conductive film C2D(h). For example, the material which can be used for the wiring 711 can be used for the second conductive film C2D(h).

Specifically, a light-transmitting conductive material can be used for the second conductive film C2D(h). For example, a conductive oxide such as indium oxide, indium tin oxide, indium zinc oxide, zinc oxide, or zinc oxide to which gallium is added can be used. Thus, the second conductive film C2D(h) can supply a uniform electric field without shielding the display of the display element 750.

The first conductive film C1D(g) can overlap with the third conductive film 751 and openings in the third conductive film 751 (see FIG. 8B).

Alternatively, the first conductive film C1D(g) can be provided in the openings in the third conductive film 751 (see FIG. 8C).

Alternatively, the third conductive film 751 can overlap with the first conductive film C1D(g) and openings in the first conductive film C1D(g) (see FIG. 8D).

<Structure Example of Touch Panel 700E>

Figure 24A:
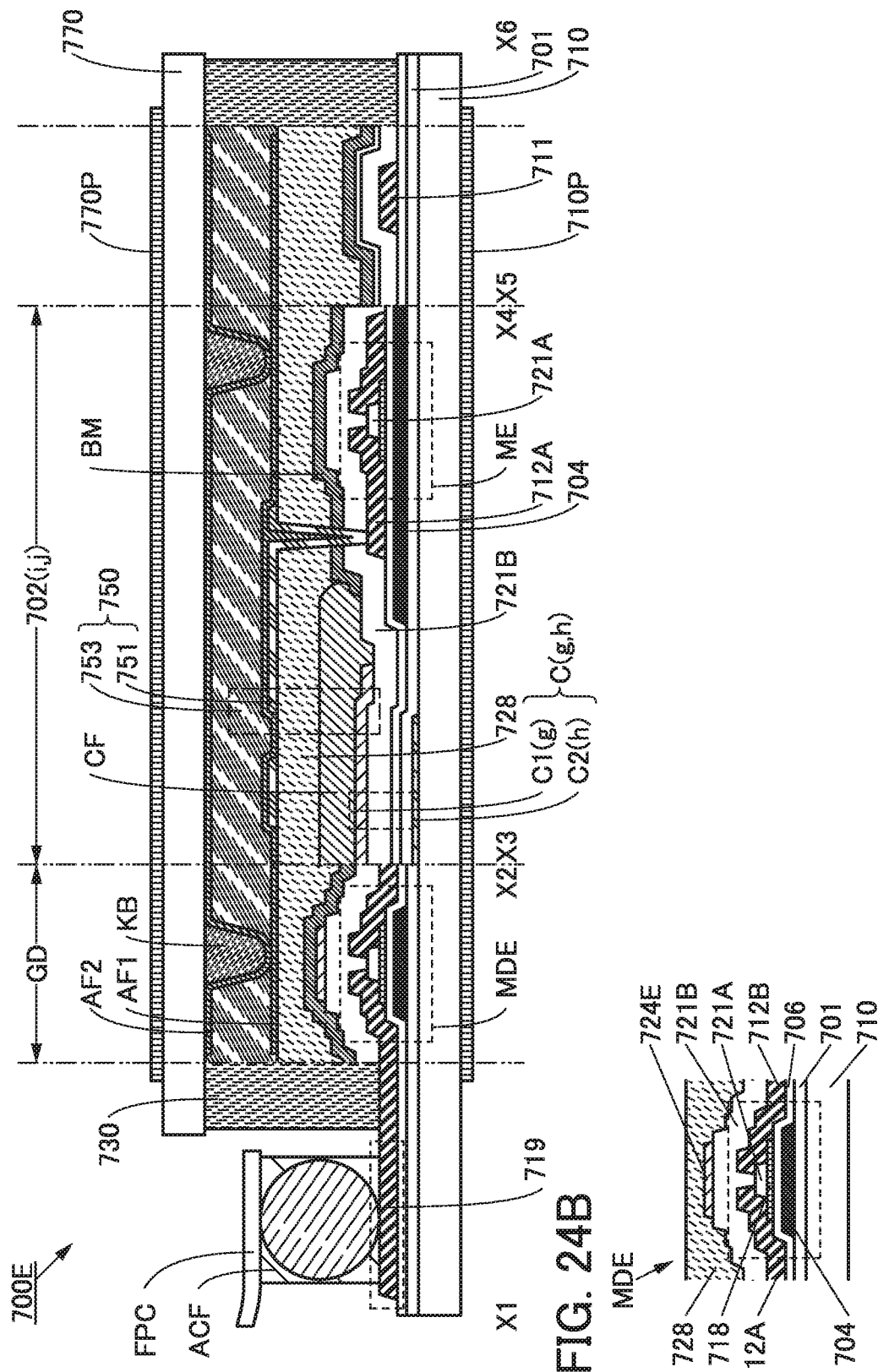
FIGS. 24A and 24B illustrate the structure of a touch panel of one embodiment.
Figure 24B:
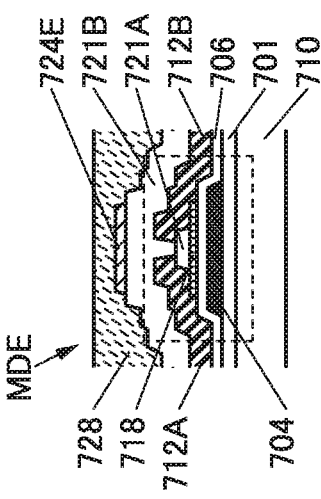

Another structure of the touch panel of one embodiment of the present invention is described below with reference to FIGS. 24A and 24B FIGS. 24A and 24B are diagrams illustrating the structure of the touch panel 700E of one embodiment of the present invention. FIG. 24A is a cross-sectional view of a display panel 700, which is one embodiment of the present invention, taken along the section lines X1-X2, X3-X4, and X5-X6 in FIG. 4A. FIG. 24B is a cross-sectional view illustrating the details of the transistor MDE of FIG. 24A.

Note that different points between the touch panel 700E and the touch panel 700 shown in FIGS. 5A to 5D are that the touch panel 700E includes a channel protective transistor ME instead of the channel etched transistor MA, that the touch panel 700E includes a channel protective transistor MDE instead of the channel etched transistor MD, that the touch panel 700E includes the coloring film CF between the first conductive film C1(g) and the third conductive film 751, and that the touch panel 700E includes the light blocking film BM between the liquid crystal layer 753 and the base 710 (see FIG. 24A). Different structures will be described in detail below, and the above description is referred to for the other similar structures.

<<Transistor ME, Transistor MDE>>

The transistors ME and MDE can be channel protective transistors. For example, the transistor MDE includes the insulating film 721A which is provided so that the semiconductor film 718 is sandwiched between the insulating film 721A and the insulating film 706 serving as a gate insulating film (see FIG. 24B).

<Method for Controlling Resistivity of Oxide Semiconductor>

The method for controlling the resistivity of a film containing oxide semiconductor will be described.

A film containing an oxide semiconductor with a predetermined resistivity can be used for the second conductive film C2(h) (see FIG. 5A), the second conductive film C2B(h) and the conductive film 724B (see FIGS. 6A and 6B) or the second conductive film C2C(h), the first region 718A and the second region 718B (see FIGS. 7A and 7B).

For example, a method for controlling the concentration of impurities such as hydrogen and water contained in the oxide semiconductor film and/or the oxygen vacancies in the film can be used as the method for controlling the resistivity of an oxide semiconductor film.

Specifically, plasma treatment can be used as a method for increasing or decreasing the concentration of impurities such as hydrogen and water and/or the oxygen vacancies in the film.

Specifically, plasma treatment using a gas containing one or more kinds selected from a rare gas (He, Ne, Ar, Kr, Xe), hydrogen, boron, phosphorus, and nitrogen can be employed. For example, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, or plasma treatment in a nitrogen atmosphere can be employed. Thus, the oxide semiconductor film can have a high carrier density and a low resistivity.

Alternatively, hydrogen, boron, phosphorus, or nitrogen is added to the oxide semiconductor film by an ion implantation method, an ion doping method, a plasma immersion ion implantation method, or the like, so that the oxide semiconductor film can have a low resistivity.

Alternatively, an insulating film containing hydrogen is formed in contact with the oxide semiconductor film, and the hydrogen is diffused from the insulating film to the oxide semiconductor film, so that the oxide semiconductor film can have a high carrier density and a low resistivity.

For example, an insulating film with a hydrogen concentration of greater than or equal to $1 \times 10^{22}$ atoms/cm$^3$ is formed in contact with the oxide semiconductor film, in that case hydrogen can be effectively supplied to the oxide semiconductor film. Specifically, a silicon nitride film can be used as the insulating film formed in contact with the oxide semiconductor film.

Hydrogen contained in the oxide semiconductor film reacts with oxygen bonded to a metal atom to be water, and an oxygen vacancy is formed in a lattice from which oxygen is released (or a portion from which oxygen is released). Due to entry of hydrogen into the oxygen vacancy, an electron serving as a carrier is generated in some cases. Furthermore, bonding of part of hydrogen to oxygen bonded to a metal atom causes generation of an electron serving as a carrier in some cases. Thus, the oxide semiconductor film can have a high carrier density and a low resistivity.

Specifically, an oxide semiconductor with a hydrogen concentration measured by secondary ion mass spectrometry (SIMS) of greater than or equal to $8 \times 10^{19}$ atoms/cm$^3$, preferably greater than or equal to $1 \times 10^{20}$ atoms/cm$^3$, more preferably greater than or equal to $5 \times 10^{20}$ atoms/cm$^3$ can be suitably used for the second conductive film C2(h) (see FIG. 5A), the second conductive film C2B(h) and the conductive film 724B (see FIGS. 6A and 6B) or the second conductive film C2C(h), the first region 718A and the second region 718B (see FIGS. 7A and 7B).

On the other hand, an oxide semiconductor with a high resistivity can be used for a semiconductor film where a channel of a transistor is formed.

For example, an insulating film containing oxygen, in other words, an insulating film capable of releasing oxygen, is formed in contact with an oxide semiconductor film, and the oxygen is supplied from the insulating film to the oxide semiconductor film, so that oxygen vacancies in the film or at the interface can be filled. Thus, the oxide semiconductor film can have a high resistivity.

For example, a silicon oxide film or a silicon oxynitride film can be used as the insulating film capable of releasing oxygen.

The oxide semiconductor film in which oxygen vacancies are filled and the hydrogen concentration is reduced can be referred to as a highly purified intrinsic or substantially highly purified intrinsic oxide semiconductor film. The term "substantially intrinsic" refers to the state in which an oxide semiconductor film has a carrier density lower than $8 \times 10^{11}/cm^3$, preferably lower than $1 \times 10^{11}/cm^3$, further preferably lower than $1 \times 10^{10}/cm^3$. A highly purified intrinsic or substantially highly purified intrinsic oxide semiconductor film has few carrier generation sources and thus can have a low carrier density. The highly purified intrinsic or substantially highly purified intrinsic oxide semiconductor film has a low density of defect states and accordingly can have a low density of trap states.

Furthermore, a transistor including the highly purified intrinsic or substantially highly purified intrinsic oxide semiconductor film has an extremely low off-state current; even when an element has a channel width of $1 \times 10^6$ μm and a channel length of 10 μm, the off-state current can be lower than or equal to the measurement limit of a semiconductor parameter analyzer, that is, lower than or equal to $1 \times 10^{-13}$ A, at a voltage (drain voltage) between a source electrode and a drain electrode of from 1 V to 10 V.

The transistor in which a channel region is formed in the oxide semiconductor film that is a highly purified intrinsic or substantially highly purified intrinsic oxide semiconductor film can have a small change in electrical characteristics and high reliability.

Specifically, an oxide semiconductor has a hydrogen concentration which is measured by secondary ion mass spectrometry (SIMS) of lower than or equal to $2 \times 10^{20}$ atoms/cm$^3$, preferably lower than or equal to $5 \times 10^{19}$ atoms/cm$^3$, more preferably lower than or equal to $1 \times 10^{19}$ atoms/cm$^3$, more preferably lower than $5 \times 10^{18}$ atoms/cm$^3$, more preferably lower than or equal to $1 \times 10^{18}$ atoms/cm$^3$, more preferably lower than or equal to $5 \times 10^{17}$ atoms/cm$^3$, more preferably lower than or equal to $1 \times 10^{16}$ atoms/cm$^3$ can be favorably used for a semiconductor film where a channel of a transistor is formed.

Note that the transistor MDB includes the semiconductor film 718 and that an oxide semiconductor film that has a higher hydrogen concentration and/or a larger number of oxygen vacancies and that has a lower resistivity than the semiconductor film 718 can be used as the conductive film 724B (see FIG. 6B).

The hydrogen concentration in the conductive film 724B is twice or more, preferably ten times or more that in the semiconductor film 718.

The resistivity of the conductive film 724B is greater than or equal to $1 \times 10^{-8}$ times and less than $1 \times 10^{-1}$ times that of the semiconductor film 718.

Specifically, the resistivity of the conductive film 724B is higher than or equal to $1 \times 10^{-3}$ Ωcm and lower than $1 \times 10^4$ Ωcm, preferably higher than or equal to $1 \times 10^{-3}$ Ωcm and lower than $1 \times 10^{-1}$ Ωcm.

This embodiment can be combined with any of the other embodiments in this specification as appropriate.

Embodiment 2

In this embodiment, an operating method of a touch panel which is one embodiment of the present invention is described with reference to FIGS. 2A and 2B, FIG. 9, and FIG. 10.

FIGS. 2A and 2B illustrate the structure of the sensor element C(g,h) of the touch panel 700 shown in FIGS. 1A and 1B, which is one embodiment of the present invention. FIG. 2A is a top view of the sensor element C(g,h). FIG. 2B is a cross-sectional view of the sensor element C(g,h) and the pixel 702(i,j) taken along the section line W1-W2 in FIG. 2A.

Figure 9:
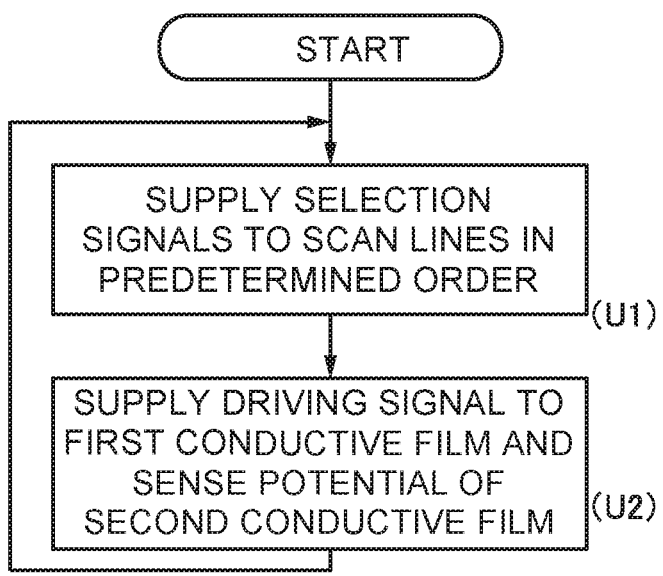
FIG. 9 is a flow chart showing a driving method of a touch panel of one embodiment.

FIG. 9 is a flow chart showing the operating method of the touch panel of one embodiment of the present invention. FIG. 10 is a timing chart showing the operating method of the touch panel of one embodiment of the present invention.

<Example of Driving Method of Touch Panel>

A method for driving a touch panel in this embodiment includes the following two steps (see FIG. 9).

In a first step, selection signals are supplied to scan lines in a predetermined order which are electrically connected to gate electrodes of transistors electrically connected to the third conductive film 751 having a region overlapping with the first conductive film C1(g) (see U1 in FIG. 9).

For example, in a period R1, a selection signal GOUT[i−2], a selection signal GOUT[i−1], a selection signal GOUT[i], and a selection signal GOUT[i+1] are respectively supplied to a scan line G(i−2), a scan line G(i−1), a scan line G(i), and a scan line G(i+1) in a predetermined order (see FIG. 10).

In a second step, a driver signal is supplied to the first conductive film C1(g) and a change in the potential of the second conductive films having a region overlapping with the first conductive film C1(g) is obtained as a sensor signal (see U2 in FIG. 9).

For example, a change in the potential of the second conductive film C2(1) to the second conductive film C2(q) is obtained as a sensor signal.

The driving method of a touch panel according to one embodiment of the present invention includes the first step and the second step. The first step is for supplying a selection signal to scan lines which are electrically connected to gate electrodes of transistors whose source electrodes or drain electrodes are electrically connected to the third conductive film 751 having a region overlapping with the first conductive film C1(g), and the second step is for supplying a driver signal to the first conductive film C1(g) in a period during which the selection signal is not supplied.

The driver signal is supplied to the first conductive film C1(g) in other than a period during which the transistor is ON, whereby an image signal can be supplied to the third conductive film 751 without fail. In addition, the potential of the second conductive film, which changes depending on the driver signal and the level of an electric field interrupted by an object approaching the input/output panel, can be obtained as a sensor signal. As a result, a driving method of a novel touch panel with high convenience or high reliability can be provided.

Note that a driver signal COM[1] to a driver signal COM[p] may be supplied to the respective first conductive films C1(1) to C1(p) after all the selection signals GOUT[1] to GOUT[n] are supplied to the respective scan lines G1(1) to G1(n) (e.g., after the period R3). In other words, the driver signals COM[1] to COM[p] may be supplied to the respective first conductive films C1(1) to C1(p) in a vertical retrace period R4.

Note that this embodiment can be combined with any of the other embodiments in this specification as appropriate.

Embodiment 3

In this embodiment, a structure of a transistor that can be used in the touch panel of one embodiment of the present invention will be described with reference to FIGS. 11A to 11D.

<Structure Example of Semiconductor Device>

Figure 11A:
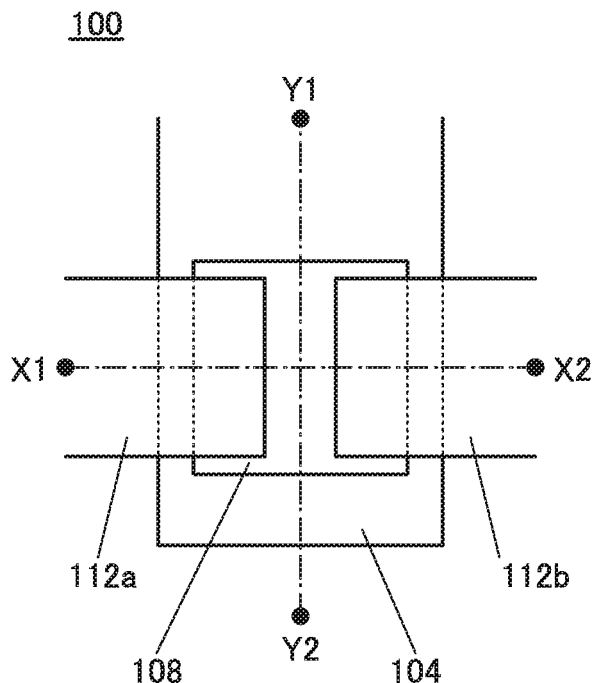
FIGS. 11A to 11D illustrate the structures of a transistor of one embodiment.

FIG. 11A is a top view of a transistor 100. FIG. 11C is a cross-sectional view taken along the cutting plane line X1-X2 in FIG. 11A, and FIG. 11D is a cross-sectional view taken along the cutting plane line Y1-Y2 in FIG. 11A. Note that in FIG. 11A, some components of the transistor 100 (e.g., an insulating film serving as a gate insulating film) are not illustrated to avoid complexity. Furthermore, the direction of the cutting plane line X1-X2 may be called a channel length direction, and the direction of the cutting plane line Y1-Y2 may be called a channel width direction. As in FIG. 11A, some components are not illustrated in some cases in top views of transistors described below.

The transistor 100 can be used in the touch panel described in Embodiment 1.

For example, when the transistor 100 is used as the transistor MA, a substrate 102, a conductive film 104, a stacked film of an insulating film 106 and an insulating film 107, an oxide semiconductor film 108, a conductive film 112a, a conductive film 112b, a stacked film of an insulating film 114 and an insulating film 116, and an insulating film 118 can be referred to as a stacked material of the base 710 and the insulating film 701, the conductive film 704, the insulating film 706, the semiconductor film 718, the conductive film 712A, the conductive film 712B, the insulating film 721A, and the insulating film 721B, respectively.

The transistor 100 includes the conductive film 104 functioning as a gate electrode over the substrate 102, the insulating film 106 over the substrate 102 and the conductive film 104, the insulating film 107 over the insulating film 106, the oxide semiconductor film 108 over the insulating film 107, and the conductive films 112a and 112b functioning as source and drain electrodes electrically connected to the oxide semiconductor film 108. Over the transistor 100, specifically, over the conductive films 112a and 112b and the oxide semiconductor film 108, the insulating films 114, 116, and 118 are provided. The insulating films 114, 116, and 118 function as protective insulating films for the transistor 100.

The oxide semiconductor film 108 includes a first oxide semiconductor film 108a on the conductive film 104 side and a second oxide semiconductor film 108b over the first oxide semiconductor film 108a. The conductive film 104 serves as a gate electrode. The insulating films 106 and 107 function as gate insulating films of the transistor 100.

In-M oxide (M is Ti, Ga, Sn, Y, Zr, La, Ce, Nd, or Hf) or In-M-Zn oxide can be used for the oxide semiconductor film 108. It is particularly preferable to use In-M-Zn oxide for the oxide semiconductor film 108.

The first oxide semiconductor film 108a includes a first region in which the atomic proportion of In is larger than the atomic proportion of M. The second oxide semiconductor film 108b includes a second region in which the atomic proportion of In is smaller than that in the first oxide semiconductor film 108a. The second region includes a portion thinner than the first region.

The first oxide semiconductor film 108a including the first region in which the atomic proportion of In is larger than that of M can increase the field-effect mobility (also simply referred to as mobility or μFE) of the transistor 100. Specifically, the field-effect mobility of the transistor 100 can exceed 10 cm$^2$/Vs.

For example, the use of the transistor with high field-effect mobility for a gate driver that generates a gate signal (specifically, a demultiplexer connected to an output terminal of a shift register included in a gate driver) allows a semiconductor device or a display device to have a narrow frame.

On the other hand, the first oxide semiconductor film 108a including the first region in which the atomic proportion of In is larger than that of M makes it easier to change electrical characteristics of the transistor 100 in light irradiation. However, in the semiconductor device of one embodiment of the present invention, the second oxide semiconductor film 108b is formed over the first oxide semiconductor film 108a. In addition, the thickness of the channel region in the second oxide semiconductor film 108b is smaller than the thickness of the first oxide semiconductor film 108a.

Furthermore, the second oxide semiconductor film 108b includes the second region in which the atomic proportion of In is smaller than the first oxide semiconductor film 108a and thus has larger Eg than that of the first oxide semiconductor film 108a. For this reason, the oxide semiconductor film 108 which is a layered structure of the first oxide semiconductor film 108a and the second oxide semiconductor film 108b has high resistance to a negative bias stress test with light irradiation.

The amount of light absorbed by the oxide semiconductor film 108 can be reduced during light irradiation. As a result, the change in electrical characteristics of the transistor 100 due to light irradiation can be reduced. In the semiconductor device of one embodiment of the present invention, the insulating film 114 or the insulating film 116 includes excess oxygen. This structure can further reduce the change in electrical characteristics of the transistor 100 due to light irradiation.

Here, the oxide semiconductor film 108 is described in detail with reference to FIG. 11B.

Figure 11B:
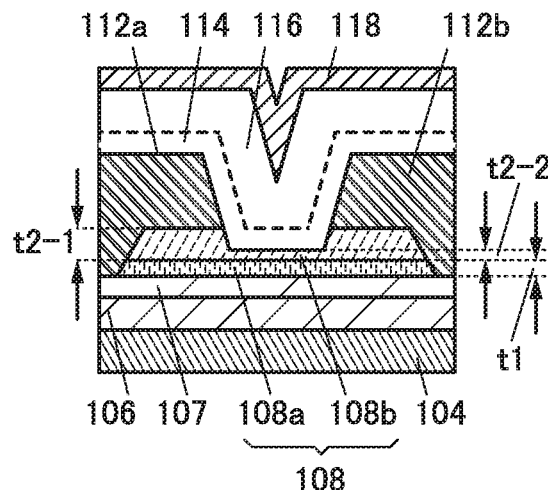
Figure 11C:
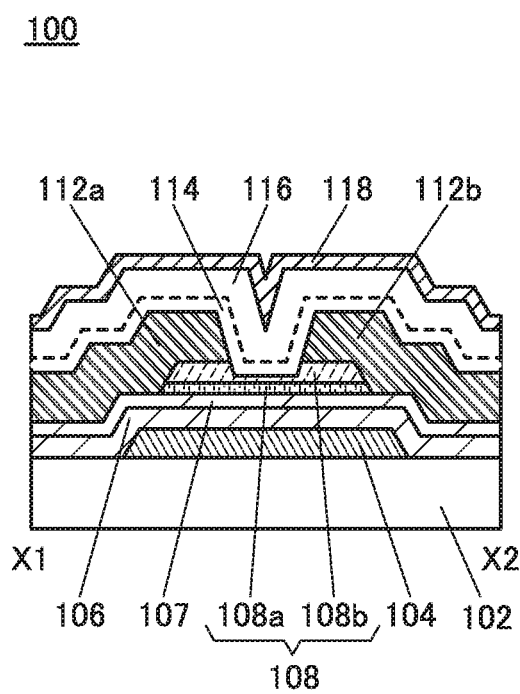
Figure 11D:
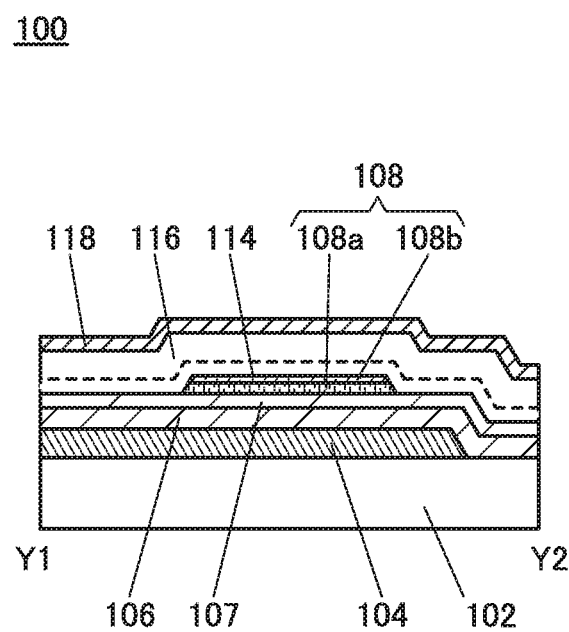

FIG. 11B is a cross-sectional enlarged view of the oxide semiconductor film 108 and the vicinity thereof in the transistor 100 illustrated in FIG. 11C.

In FIG. 11B, t1, t2-1, and t2-2 denote a thickness of the first oxide semiconductor film 108a, one thickness of the second oxide semiconductor film 108b, and the other thickness the second oxide semiconductor film 108b, respectively. The second oxide semiconductor film 108b over the first oxide semiconductor film 108a prevents the first oxide semiconductor film 108a from being exposed to an etching gas, an etchant, or the like when the conductive films 112a and 112b are formed. This is why the first oxide semiconductor film 108a is not or is hardly reduced in thickness. In contrast, in the second oxide semiconductor film 108b, a portion not overlapping with the conductive films 112a and 112b is etched by formation of the conductive films 112a and 112b, so that a depression is formed in the etched region. In other words, a thickness of the second oxide semiconductor film 108b in a region overlapping with the conductive films 112a and 112b is t2-1, and a thickness of the second oxide semiconductor film 108b in a region not overlapping with the conductive films 112a and 112b is t2-2.

As for the relationships between the thicknesses of the first oxide semiconductor film 108a and the second oxide semiconductor film 108b, t2-1>t1>t2-2 is preferable. A transistor with the thickness relationships can have high field-effect mobility and less variation in threshold voltage in light irradiation.

When oxygen vacancy is formed in the oxide semiconductor film 108 included in the transistor 100, electrons serving as carriers are generated; as a result, the transistor 100 tends to be normally-on. Therefore, for stable transistor characteristics, it is important to reduce oxygen vacancy in the oxide semiconductor film 108 particularly oxygen vacancy in the first oxide semiconductor film 108a. In the structure of the transistor of one embodiment of the present invention, excess oxygen is introduced into an insulating film over the oxide semiconductor film 108, here, the insulating film 114 and/or the insulating film 116 over the oxide semiconductor film 108, whereby oxygen is moved from the insulating film 114 and/or the insulating film 116 to the oxide semiconductor film 108 to fill oxygen vacancy in the oxide semiconductor film 108 particularly in the first oxide semiconductor film 108a.

It is preferable that the insulating films 114 and 116 each include a region (oxygen excess region) including oxygen in excess of that in the stoichiometric composition. In other words, the insulating films 114 and 116 are insulating films capable of releasing oxygen. Note that the oxygen excess region is formed in the insulating films 114 and 116 in such a manner that oxygen is introduced into the insulating films 114 and 116 after the deposition, for example. As a method for introducing oxygen, an ion implantation method, an ion doping method, a plasma immersion ion implantation method, plasma treatment, or the like may be employed.

In order to fill oxygen vacancy in the first oxide semiconductor film 108a, the thickness of the portion including the channel region and the vicinity of the channel region in the second oxide semiconductor film 108b is preferably small, and t2-2<t1 is preferably satisfied. For example, the thickness of the portion including the channel region and the vicinity of the channel region in the second oxide semiconductor film 108b is preferably more than or equal to 1 nm and less than or equal to 20 nm, more preferably more than or equal to 3 nm and less than or equal to 10 nm.

Other constituent elements of the semiconductor device of this embodiment are described below in detail.

<<Substrate>>

There is no particular limitation on the property of a material and the like of the substrate 102 as long as the material has heat resistance enough to withstand at least heat treatment to be performed later. For example, a glass substrate, a ceramic substrate, a quartz substrate, or a sapphire substrate may be used as the substrate 102. Alternatively, a single crystal semiconductor substrate or a polycrystalline semiconductor substrate of silicon or silicon carbide, a compound semiconductor substrate of silicon germanium, an SOI substrate, or the like can be used as the substrate 102. Alternatively, any of these substrates provided with a semiconductor element may be used as the substrate 102. Note that in the case where a glass substrate is used as the substrate 102, a large substrate having any of the following sizes can be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large display device can be manufactured.

Alternatively, a flexible substrate may be used as the substrate 102, and the transistor 100 may be provided directly on the flexible substrate. Alternatively, a separation layer may be provided between the substrate 102 and the transistor 100. The separation layer can be used when part or the whole of a semiconductor device formed over the separation layer is separated from the substrate 102 and transferred onto another substrate. In such a case, the transistor 100 can be transferred to a substrate having low heat resistance or a flexible substrate as well.

<<Conductive Film Functioning as Gate Electrode and Source and Drain Electrodes>>

The conductive film 104 functioning as a gate electrode and the conductive films 112a and 112b functioning as a source electrode and a drain electrode, respectively, can each be formed using a metal element selected from chromium (Cr), copper (Cu), aluminum (Al), gold (Au), silver (Ag), zinc (Zn), molybdenum (Mo), tantalum (Ta), titanium (Ti), tungsten (W), manganese (Mn), nickel (Ni), iron (Fe), and cobalt (Co); an alloy including any of these metal element as its component; an alloy including a combination of any of these metal elements; or the like.

Furthermore, the conductive films 104, 112a, and 112b may have a single-layer structure or a stacked-layer structure of two or more layers. For example, a single-layer structure of an aluminum film including silicon, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, and a three-layer structure in which a titanium film, an aluminum film, and a titanium film are stacked in this order can be given. Alternatively, an alloy film or a nitride film in which aluminum and one or more elements selected from titanium, tantalum, tungsten, molybdenum, chromium, neodymium, and scandium are combined may be used.

The conductive films 104, 112a, and 112b can be formed using a light-transmitting conductive material such as indium tin oxide, indium oxide including tungsten oxide, indium zinc oxide including tungsten oxide, indium oxide including titanium oxide, indium tin oxide including titanium oxide, indium zinc oxide, or indium tin oxide to which silicon oxide is added.

A Cu—X alloy film (X is Mn, Ni, Cr, Fe, Co, Mo, Ta, or Ti) may be used for the conductive films 104, 112a, and 112b. Use of a Cu—X alloy film enables the manufacturing cost to be reduced because wet etching process can be used in the processing.

<<Insulating Film Functioning as Gate Insulating Film>>

As each of the insulating films 106 and 107 functioning as gate insulating films of the transistor 100, an insulating film including at least one of the following films formed by a plasma enhanced chemical vapor deposition (PECVD) method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film. Note that instead of a stacked-layer structure of the insulating films 106 and 107, an insulating film of a single layer formed using a material selected from the above or an insulating film of three or more layers may be used.

The insulating film 106 has a function as a blocking film which inhibits penetration of oxygen. For example, in the case where excess oxygen is supplied to the insulating film 107, the insulating film 114, the insulating film 116, and/or the oxide semiconductor film 108, the insulating film 106 can inhibit penetration of oxygen.

Note that the insulating film 107 that is in contact with the oxide semiconductor film 108 functioning as a channel region of the transistor 100 is preferably an oxide insulating film and preferably includes a region including oxygen in excess of the stoichiometric composition (oxygen-excess region). In other words, the insulating film 107 is an insulating film capable of releasing oxygen. In order to provide the oxygen excess region in the insulating film 107, the insulating film 107 is formed in an oxygen atmosphere, for example. Alternatively, the oxygen excess region may be formed by introduction of oxygen into the insulating film 107 after the deposition. As a method for introducing oxygen, an ion implantation method, an ion doping method, a plasma immersion ion implantation method, plasma treatment, or the like may be employed.

In the case where hafnium oxide is used for the insulating film 107, the following effect is attained. Hafnium oxide has a higher dielectric constant than silicon oxide and silicon oxynitride. Therefore, by using hafnium oxide, the thickness of the insulating film 107 can be made large as compared with the case where silicon oxide is used; thus, leakage current due to tunnel current can be low. That is, it is possible to provide a transistor with a low off-state current. Moreover, hafnium oxide with a crystalline structure has higher dielectric constant than hafnium oxide with an amorphous structure. Therefore, it is preferable to use hafnium oxide with a crystalline structure in order to provide a transistor with a low off-state current. Examples of the crystalline structure include a monoclinic crystal structure and a cubic crystal structure. Note that one embodiment of the present invention is not limited thereto.

In this embodiment, a silicon nitride film is formed as the insulating film 106, and a silicon oxide film is formed as the insulating film 107. The silicon nitride film has a higher dielectric constant than a silicon oxide film and needs a larger thickness for capacitance equivalent to that of the silicon oxide film. Thus, when the silicon nitride film is included in the gate insulating film of the transistor 150, the physical thickness of the insulating film can be increased. This makes it possible to reduce a decrease in withstand voltage of the transistor 100 and furthermore to increase the withstand voltage, thereby reducing electrostatic discharge damage to the transistor 100.

<<Oxide Semiconductor Film>>

The oxide semiconductor film 108 can be formed using the materials described above.

In the case where the oxide semiconductor film 108 includes In-M-Zn oxide, it is preferable that the atomic ratio of metal elements of a sputtering target used for forming the In-M-Zn oxide satisfy In≤M and Zn≤M As the atomic ratio of metal elements of such a sputtering target, In:M:Zn=1:1:1, In:M:Zn=1:1:1.2, In:M:Zn=2:1:3, In:M:Zn=3:1:2, and In:M:Zn=4:2:4.1 are preferable.

In the case where the oxide semiconductor film 108 is formed of In-M-Zn oxide, it is preferable to use a target including polycrystalline In-M-Zn oxide as the sputtering target. The use of the target including polycrystalline In-M-Zn oxide facilitates formation of the oxide semiconductor film 108 having crystallinity. Note that the atomic ratios of metal elements in the formed oxide semiconductor film 108 vary from the above atomic ratio of metal elements of the sputtering target within a range of ±40% as an error. For example, when a sputtering target with an atomic ratio of In to Ga and Zn of 4:2:4.1 is used, the atomic ratio of In to Ga and Zn in the oxide semiconductor film 108 may be 4:2:3 or in the vicinity of 4:2:3.

The first oxide semiconductor film 108a can be formed using the sputtering target having an atomic ratio of In:M:Zn=2:1:3, In:M:Zn=3:1:2, or In:M:Zn=4:2:4.1. The second oxide semiconductor film 108b can be formed using the sputtering target having an atomic ratio of In:M:Zn=1:1:1 or In:M:Zn=1:1:1.2. Note that the atomic ratio of metal elements in a sputtering target used for forming the second oxide semiconductor film 108b does not necessarily satisfy In≤M and Zn≤M, and may satisfy In≤M and Zn<M, such as In:M:Zn=3:2:1.

The energy gap of the oxide semiconductor film 108 is 2 eV or more, preferably 2.5 eV or more, further preferably 3 eV or more. The use of an oxide semiconductor having a wide energy gap can reduce off-state current of the transistor 100. In particular, an oxide semiconductor film having an energy gap more than or equal to 2 eV, preferably more than or equal to 2 eV and less than or equal to 3.0 eV is preferably used as the first oxide semiconductor film 108a, and an oxide semiconductor film having an energy gap more than or equal to 2.5 eV and less than or equal to 3.5 eV is preferably used as the second oxide semiconductor film 108b. Furthermore, the second oxide semiconductor film 108b preferably has a higher energy gap than that of the first oxide semiconductor film 108a.

Each thickness of the first oxide semiconductor film 108a and the second oxide semiconductor film 108b is more than or equal to 3 nm and less than or equal to 200 nm, preferably more than or equal to 3 nm and less than or equal to 100 nm, more preferably more than or equal to 3 nm and less than or equal to 50 nm. Note that the above-described thickness relationships between them are preferably satisfied.

An oxide semiconductor film with low carrier density is used as the second oxide semiconductor film 108b. For example, the carrier density of the second oxide semiconductor film 108b is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$.

Note that, without limitation to the compositions and materials described above, a material with an appropriate composition may be used depending on required semiconductor characteristics and electrical characteristics (e.g., field-effect mobility and threshold voltage) of a transistor. Furthermore, in order to obtain required semiconductor characteristics of a transistor, it is preferable that the carrier density, the impurity concentration, the defect density, the atomic ratio of a metal element to oxygen, the interatomic distance, the density, and the like of the first oxide semiconductor film 108a and the second oxide semiconductor film 108b be set to be appropriate.

Note that it is preferable to use, as the first oxide semiconductor film 108a and the second oxide semiconductor film 108b, an oxide semiconductor film in which the impurity concentration is low and the density of defect states is low, in which case the transistor can have more excellent electrical characteristics. Here, the state in which the impurity concentration is low and the density of defect states is low (the amount of oxygen vacancy is small) is referred to as "highly purified intrinsic" or "substantially highly purified intrinsic". A highly purified intrinsic or substantially highly purified intrinsic oxide semiconductor film has few carrier generation sources, and thus can have a low carrier density. Thus, a transistor in which a channel region is formed in the oxide semiconductor film rarely has a negative threshold voltage (is rarely normally on). A highly purified intrinsic or substantially highly purified intrinsic oxide semiconductor film has a low density of defect states and accordingly has few carrier traps in some cases. Furthermore, the highly purified intrinsic or substantially highly purified intrinsic oxide semiconductor film has an extremely low off-state current; even when an element has a channel width of 1×10$^6$ μm and a channel length of 10 μm, the off-state current can be less than or equal to the measurement limit of a semiconductor parameter analyzer, that is, less than or equal to 1×10$^{-13}$ A, at a voltage (drain voltage) between a source electrode and a drain electrode of from 1 V to 10 V.

Accordingly, the transistor in which the channel region is formed in the highly purified intrinsic or substantially highly purified intrinsic oxide semiconductor film can have a small change in electrical characteristics and high reliability. Charges trapped by the trap states in the oxide semiconductor film take a long time to be released and may behave like fixed charges. Thus, the transistor whose channel region is formed in the oxide semiconductor film having a high density of trap states has unstable electrical characteristics in some cases. As examples of the impurities, hydrogen, nitrogen, alkali metal, alkaline earth metal, and the like are given.

Hydrogen included in the oxide semiconductor film reacts with oxygen bonded to a metal atom to be water, and also causes oxygen vacancy in a lattice from which oxygen is released (or a portion from which oxygen is released). Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Thus, a transistor including an oxide semiconductor film which contains hydrogen is likely to be normally on. Accordingly, it is preferable that hydrogen be reduced as much as possible in the oxide semiconductor film 108. Specifically, in the oxide semiconductor film 108, the concentration of hydrogen which is measured by SIMS is lower than or equal to 2×10$^{20}$ atoms/cm$^3$, preferably lower than or equal to 5×10$^{19}$ atoms/cm$^3$, further preferably lower than or equal to 1×10$^{19}$ atoms/cm$^3$, further preferably lower than or equal to 5×10$^{18}$ atoms/cm$^3$, further preferably lower than or equal to 1×10$^{18}$ atoms/cm$^3$, further preferably lower than or equal to 5×10$^{17}$ atoms/cm$^3$, and further preferably lower than or equal to 1×10$^{16}$ atoms/cm$^3$.

The first oxide semiconductor film 108a preferably includes a region having lower hydrogen concentration than the second oxide semiconductor film 108b. When the first oxide semiconductor film 108a includes the region having lower hydrogen concentration than the second oxide semiconductor film 108b, the semiconductor device can be highly reliable.

When silicon or carbon that is one of elements belonging to Group 14 is included in the first oxide semiconductor film 108a, oxygen vacancy is increased in the first oxide semiconductor film 108a, and the first oxide semiconductor film 108a becomes an n-type film. Thus, the concentration of silicon or carbon (the concentration is measured by SIMS) in the first oxide semiconductor film 108a or the concentration of silicon or carbon (the concentration is measured by SIMS) in the vicinity of an interface with the first oxide semiconductor film 108a is set to be lower than or equal to 2×10$^{18}$ atoms/cm$^3$, preferably lower than or equal to 2×10$^{17}$ atoms/cm$^3$.

In addition, the concentration of alkali metal or alkaline earth metal of the first oxide semiconductor film 108a, which is measured by SIMS, is lower than or equal to 1×10$^{18}$ atoms/cm$^3$, preferably lower than or equal to 2×10$^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal of the first oxide semiconductor film 108a.

Furthermore, when including nitrogen, the first oxide semiconductor film 108a easily becomes n-type by generation of electrons serving as carriers and an increase of carrier density. Thus, a transistor including an oxide semiconductor film which contains nitrogen is likely to have normally-on characteristics. For this reason, nitrogen in the oxide semiconductor film is preferably reduced as much as possible; the concentration of nitrogen which is measured by SIMS is preferably set to be, for example, lower than or equal to 5×10$^{18}$ atoms/cm$^3$.

Each of the oxide semiconductor films 108a and 108b may have a non-single-crystal structure, for example. The non-single crystal structure includes a c-axis aligned crystalline oxide semiconductor (CAAC-OS) described later, a polycrystalline structure, a microcrystalline structure, or an amorphous structure, for example. Among the non-single crystal structure, the amorphous structure has the highest density of defect states, whereas CAAC-OS has the lowest density of defect states.

<<Insulating Film Functioning as Protective Insulating Film of Transistor>>

The insulating films 114 and 116 each have a function of supplying oxygen to the oxide semiconductor film 108. The insulating film 118 has a function of a protective insulating film of the transistor 100. The insulating films 114 and 116 include oxygen. Furthermore, the insulating film 114 is an insulating film which can transmit oxygen. The insulating film 114 also functions as a film which relieves damage to the oxide semiconductor film 108 at the time of forming the insulating film 116 in a later step.

A silicon oxide film, a silicon oxynitride film, or the like with a thickness greater than or equal to 5 nm and less than or equal to 150 nm, preferably greater than or equal to 5 nm and less than or equal to 50 nm can be used as the insulating film 114.

In addition, it is preferable that the number of defects in the insulating film 114 be small and typically, the spin density corresponding to a signal that appears at g=2.001 due to a dangling bond of silicon be lower than or equal to 3×10$^{17}$ spins/cm$^3$ by electron spin resonance (ESR) measurement. This is because if the density of defects in the insulating film 114 is high, oxygen is bonded to the defects and the amount of oxygen that transmits the insulating film 114 is decreased.

Note that all oxygen entering the insulating film 114 from the outside does not move to the outside of the insulating film 114 and some oxygen remains in the insulating film 114. Furthermore, movement of oxygen occurs in the insulating film 114 in some cases in such a manner that oxygen enters the insulating film 114 and oxygen included in the insulating film 114 moves to the outside of the insulating film 114. When an oxide insulating film which can transmit oxygen is formed as the insulating film 114, oxygen released from the insulating film 116 provided over the insulating film 114 can be moved to the oxide semiconductor film 108 through the insulating film 114.

Note that the insulating film 114 can be formed using an oxide insulating film having a low density of states due to nitrogen oxide. Note that the density of states due to nitrogen oxide can be formed between the energy of the valence band maximum ($E_{v\_os}$) and the energy of the conduction band minimum ($E_{c\_os}$) of the oxide semiconductor film. A silicon oxynitride film that releases less nitrogen oxide, an aluminum oxynitride film that releases less nitrogen oxide, and the like can be used as the above oxide insulating film.

Note that a silicon oxynitride film that releases less nitrogen oxide is a film of which the amount of released ammonia is larger than the amount of released nitrogen oxide in TDS analysis; the amount of released ammonia is typically greater than or equal to $1\times10^{18}/cm^3$ and less than or equal to $5\times10^{19}/cm^3$. Note that the amount of released ammonia is the amount of ammonia released by heat treatment with which the surface temperature of a film becomes higher than or equal to 50° C. and lower than or equal to 650° C., preferably higher than or equal to 50° C. and lower than or equal to 550° C.

Nitrogen oxide ($NO_x$; x is greater than 0 and less than or equal to 2, preferably greater than or equal to 1 and less than or equal to 2), typically $NO_2$ or NO, forms levels in the insulating film 114, for example. The level is positioned in the energy gap of the oxide semiconductor film 108. Therefore, when nitrogen oxide is diffused to the interface between the insulating film 114 and the oxide semiconductor film 108, an electron is in some cases trapped by the level on the insulating film 114 side. As a result, the trapped electron remains in the vicinity of the interface between the insulating film 114 and the oxide semiconductor film 108; thus, the threshold voltage of the transistor is shifted in the positive direction.

Nitrogen oxide reacts with ammonia and oxygen in heat treatment. Since nitrogen oxide included in the insulating film 114 reacts with ammonia included in the insulating film 116 in heat treatment, nitrogen oxide included in the insulating film 114 is reduced. Therefore, an electron is hardly trapped at the vicinity of the interface between the insulating film 114 and the oxide semiconductor film 108.

By using such an oxide insulating film, the insulating film 114 can reduce the shift in the threshold voltage of the transistor, which leads to a smaller change in the electrical characteristics of the transistor.

Note that in an ESR spectrum at 100 K or lower of the insulating film 114, by heat treatment of a manufacturing process of the transistor, typically heat treatment at a temperature higher than or equal to 300° C. and lower than 350° C., a first signal that appears at a g-factor of greater than or equal to 2.037 and less than or equal to 2.039, a second signal that appears at a g-factor of greater than or equal to 2.001 and less than or equal to 2.003, and a third signal that appears at a g-factor of greater than or equal to 1.964 and less than or equal to 1.966 are observed. The split width of the first and second signals and the split width of the second and third signals that are obtained by ESR measurement using an X-band are each approximately 5 mT. The sum of the spin densities of the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 is lower than $1\times10^{18}$ spins/$cm^3$, typically higher than or equal to $1\times10^{17}$ spins/$cm^3$ and lower than $1\times10^{18}$ spins/$cm^3$.

In the ESR spectrum at 100 K or lower, the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 correspond to signals attributed to nitrogen oxide ($NO_x$; x is greater than 0 and less than or equal to 2, preferably greater than or equal to 1 and less than or equal to 2). Typical examples of nitrogen oxide include nitrogen monoxide and nitrogen dioxide. In other words, the lower the total spin density of the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 is, the lower the content of nitrogen oxide in the oxide insulating film is.

The concentration of nitrogen of the above oxide insulating film measured by SIMS is lower than or equal to $6\times10^{20}$ atoms/$cm^3$.

The above oxide insulating film is formed by a PECVD method at a film surface temperature higher than or equal to 220° C. and lower than or equal to 350° C. using silane and dinitrogen monoxide, whereby a dense and hard film can be formed.

The insulating film 116 is formed using an oxide insulating film that contains oxygen in excess of that in the stoichiometric composition. Part of oxygen is released by heating from the oxide insulating film including oxygen in excess of that in the stoichiometric composition. The oxide insulating film including oxygen in excess of that in the stoichiometric composition is an oxide insulating film of which the amount of released oxygen converted into oxygen atoms is greater than or equal to $1.0\times10^{19}$ atoms/$cm^3$, preferably greater than or equal to $3.0\times10^{20}$ atoms/$cm^3$ in TDS analysis. Note that the temperature of the film surface in the TDS analysis is preferably higher than or equal to 100° C. and lower than or equal to 700° C., or higher than or equal to 100° C. and lower than or equal to 500° C.

A silicon oxide film, a silicon oxynitride film, or the like with a thickness greater than or equal to 30 nm and less than or equal to 500 nm, preferably greater than or equal to 50 nm and less than or equal to 400 nm can be used as the insulating film 116.

It is preferable that the number of defects in the insulating film 116 be small, and typically the spin density corresponding to a signal which appears at g=2.001 due to a dangling bond of silicon be lower than $1.5\times10^{18}$ spins/$cm^3$, preferably lower than or equal to $1\times10^{18}$ spins/$cm^3$ by ESR measurement. Note that the insulating film 116 is provided more apart from the oxide semiconductor film 108 than the insulating film 114 is; thus, the insulating film 116 may have higher density of defects than the insulating film 114.

Furthermore, the insulating films 114 and 116 can be formed using insulating films formed of the same kinds of materials; thus, a boundary between the insulating films 114 and 116 cannot be clearly observed in some cases. Thus, in this embodiment, the boundary between the insulating films 114 and 116 is shown by a dashed line. Although a two-layer structure of the insulating films 114 and 116 is described in this embodiment, the present invention is not limited to this. For example, a single-layer structure of the insulating film 114 may be employed.

The insulating film 118 includes nitrogen. Alternatively, the insulating film 118 includes nitrogen and silicon. The insulating film 118 has a function of blocking oxygen, hydrogen, water, alkali metal, alkaline earth metal, or the like. It is possible to prevent outward diffusion of oxygen from the oxide semiconductor film 108, outward diffusion of oxygen included in the insulating films 114 and 116, and entry of hydrogen, water, or the like into the oxide semiconductor film 108 from the outside by providing the insulating film 118. A nitride insulating film, for example, can be used as the insulating film 118. The nitride insulating film is formed using silicon nitride, silicon nitride oxide, aluminum nitride, aluminum nitride oxide, or the like. Note that instead of the nitride insulating film having a blocking effect against oxygen, hydrogen, water, alkali metal, alkaline earth metal, and the like, an oxide insulating film having a blocking effect against oxygen, hydrogen, water, and the like may be provided. As the oxide insulating film having a blocking effect against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, a hafnium oxynitride film, and the like can be given.

Although the variety of films such as the conductive films, the insulating films, and the oxide semiconductor films which are described above can be formed by a sputtering method or a PECVD method, such films may be formed by another method, e.g., a thermal CVD method. Examples of the thermal CVD method include a metal organic chemical vapor deposition (MOCVD) method and an atomic layer deposition (ALD) method.

A thermal CVD method has an advantage that no defect due to plasma damage is generated since it does not utilize plasma for forming a film.

Deposition by a thermal CVD method may be performed in such a manner that a source gas and an oxidizer are supplied to the chamber at a time so that the pressure in a chamber is set to an atmospheric pressure or a reduced pressure, and react with each other in the vicinity of the substrate or over the substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves). For example, a first source gas is introduced, an inert gas (e.g., argon or nitrogen) or the like is introduced at the same time as or after the introduction of the first source gas so that the source gases are not mixed, and then a second source gas is introduced. Note that in the case where the first source gas and the inert gas are introduced at a time, the inert gas serves as a carrier gas, and the inert gas may also be introduced at the same time as the introduction of the second source gas. Alternatively, the first source gas may be exhausted by vacuum evacuation instead of the introduction of the inert gas, and then the second source gas may be introduced. The first source gas is adsorbed on the surface of the substrate to form a first layer; then the second source gas is introduced to react with the first layer; as a result, a second layer is stacked over the first layer, so that a thin film is formed. The sequence of the gas introduction is repeated plural times until a desired thickness is obtained, whereby a thin film with excellent step coverage can be formed. The thickness of the thin film can be adjusted by the number of repetition times of the sequence of the gas introduction; therefore, an ALD method makes it possible to accurately adjust a thickness and thus is suitable for manufacturing a minute FET.

The variety of films such as the conductive films, the insulating films, the oxide semiconductor films, and the metal oxide films in this embodiment can be formed by a thermal CVD method such as an MOCVD method or an ALD method. For example, in the case where an In—Ga—Zn—O film is formed, trimethylindium, trimethylgallium, and dimethylzinc are used. Note that the chemical formula of trimethylindium is $In(CH_3)_3$. The chemical formula of trimethylgallium is $Ga(CH_3)_3$. The chemical formula of dimethylzinc is $Zn(CH_3)_2$. Without limitation to the above combination, triethylgallium (chemical formula: $Ga(C_2H_5)_3$) can be used instead of trimethylgallium and diethylzinc (chemical formula: $Zn(C_2H_5)_2$) can be used instead of dimethylzinc.

For example, in the case where a hafnium oxide film is formed by a deposition apparatus using an ALD method, two kinds of gases, that is, ozone ($O_3$) as an oxidizer and a source gas which is obtained by vaporizing liquid containing a solvent and a hafnium precursor compound (e.g., a hafnium alkoxide or a hafnium amide such as tetrakis(dimethylamide)hafnium (TDMAH)) are used. Note that the chemical formula of tetrakis(dimethylamide)hafnium is $Hf[N(CH_3)_2]_4$. Examples of another material liquid include tetrakis(ethylmethylamide)hafnium.

For example, in the case where an aluminum oxide film is formed by a deposition apparatus using an ALD method, two kinds of gases, e.g., $H_2O$ as an oxidizer and a source gas which is obtained by vaporizing liquid containing a solvent and an aluminum precursor compound (e.g., trimethylaluminum (TMA)) are used. Note that the chemical formula of trimethylaluminum is $Al(CH_3)_3$. Examples of another material liquid include tris(dimethylamide)aluminum, triisobutylaluminum, and aluminum tris(2,2,6,6-tetramethyl-3,5-heptanedionate).

For example, in the case where a silicon oxide film is formed by a deposition apparatus using an ALD method, hexachlorodisilane is adsorbed on a surface where a film is to be formed, chlorine included in the adsorbate is removed, and radicals of an oxidizing gas (e.g., $O_2$ or dinitrogen monoxide) are supplied to react with the adsorbate.

For example, in the case where a tungsten film is formed with a deposition apparatus using an ALD method, a $WF_6$ gas and a $B_2H_6$ gas are sequentially introduced plural times to form an initial tungsten film, and then a $WF_6$ gas and an $H_2$ gas are used, so that a tungsten film is formed. Note that an $SiH_4$ gas may be used instead of a $B_2H_6$ gas.

For example, in the case where an oxide semiconductor film, e.g., an In—Ga—Zn—O film is formed using a deposition apparatus using an ALD method, an $In(CH_3)_3$ gas and an $O_3$ gas are sequentially introduced plural times to form an InO layer, a GaO layer is formed using a $Ga(CH_3)_3$ gas and an $O_3$ gas, and then a ZnO layer is formed using a $Zn(CH_3)_2$ gas and an $O_3$ gas. Note that the order of these layers is not limited to this example. A mixed compound layer such as an In—Ga—O layer, an In—Zn—O layer, or a Ga—Zn—O layer may be formed by mixing these gases. Note that although an $H_2O$ gas which is obtained by bubbling water with an inert gas such as Ar may be used instead of an $O_3$ gas, it is preferable to use an $O_3$ gas, which does not contain H. Furthermore, instead of an $In(CH_3)_3$ gas, an $In(C_2H_5)_3$ gas may be used. Instead of a $Ga(CH_3)_3$ gas, a $Ga(C_2H_5)_3$ gas may be used. Furthermore, a $Zn(CH_3)_2$ gas may be used.

This embodiment can be combined with any of the other embodiments in this specification as appropriate.

Embodiment 4

In this embodiment, structures of a transistor that can be used in the touch panel of one embodiment of the present invention will be described with reference to FIGS. 12A to 12C.

<Structure Example of Semiconductor Device>

Figure 12A:
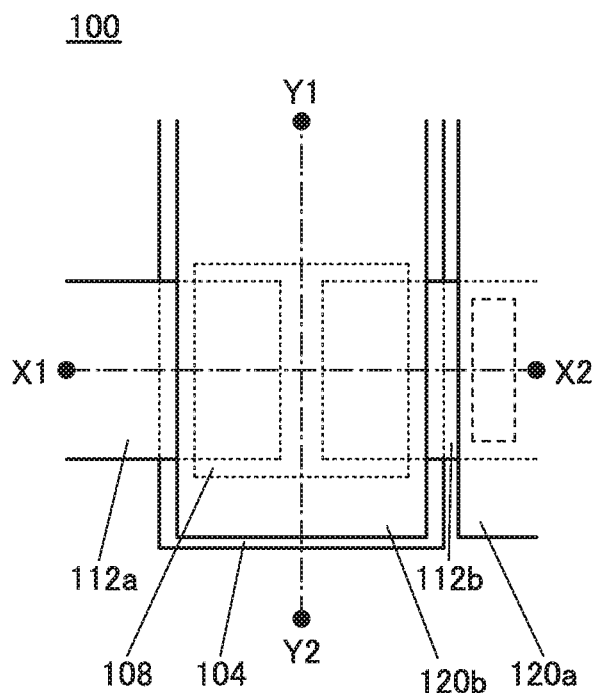
FIGS. 12A to 12C illustrate the structures of a transistor of one embodiment.
Figure 12B:
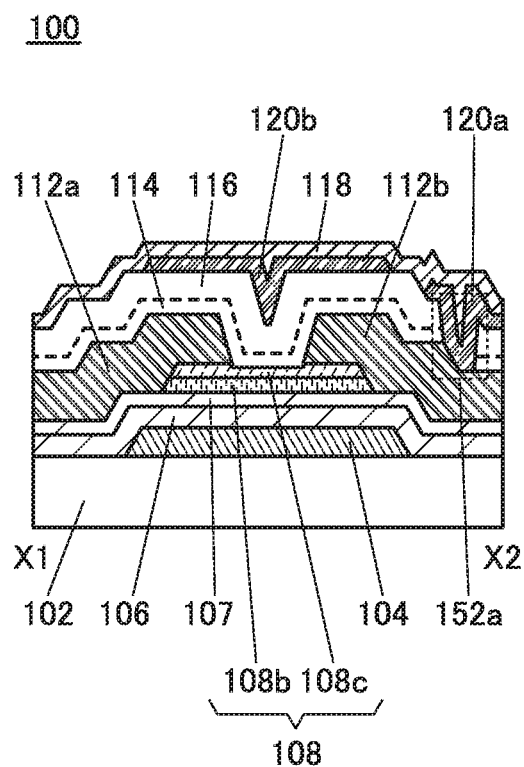
Figure 12C:
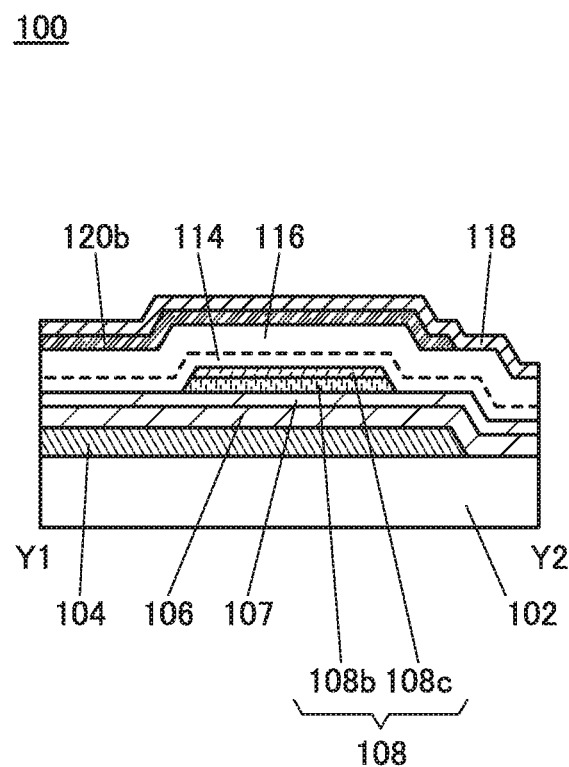

FIG. 12A is a top view of the transistor 100. FIG. 12B is a cross-sectional view taken along the cutting plane line X1-X2 in FIG. 12A, and FIG. 12C is a cross-sectional view taken along the cutting plane line Y1-Y2 in FIG. 12A. Note that in FIG. 12A, some components of the transistor 100 (e.g., an insulating film serving as a gate insulating film) are not illustrated to avoid complexity. Furthermore, the direction of the cutting plane line X1-X2 may be called a channel length direction, and the direction of the cutting plane line Y1-Y2 may be called a channel width direction. As in FIG. 12A, some components are not illustrated in some cases in top views of transistors described below.

The transistor 100 can be used for the touch panel described in Embodiment 1.

For example, when the transistor 100 is used as the transistor MA, the substrate 102, the conductive film 104, a stacked film of the insulating film 106 and the insulating film 107, the oxide semiconductor film 108, the conductive film 112a, the conductive film 112b, a stacked film of the insulating film 114 and the insulating film 116, the insulating film 118, and a conductive film 120b can be referred to as a stacked material of the base 710 and the insulating film 701, the conductive film 704, the insulating film 706, the semiconductor film 718, the conductive film 712A, the conductive film 712B, an insulating film 721A, the insulating film 721B, and the conductive film 724B, respectively.

The transistor 100 includes the conductive film 104 functioning as a first gate electrode over the substrate 102, the insulating film 106 over the substrate 102 and the conductive film 104, the insulating film 107 over the insulating film 106, the oxide semiconductor film 108 over the insulating film 107, and the conductive films 112a and 112b functioning as source and drain electrodes electrically connected to the oxide semiconductor film 108, the insulating films 114 and 116 over the oxide semiconductor film 108 and the conductive films 112a and 112b, a conductive film 120a that is over the insulating film 116 and electrically connected to the conductive film 112b, the conductive film 120b over the insulating film 116, and the insulating film 118 over the insulating film 116 and the conductive films 120a and 120b.

The insulating films 106 and 107 function as a first gate insulating film of the transistor 100. The insulating films 114 and 116 function as a second gate insulating film of the transistor 100. The insulating film 118 functions as a protective insulating film of the transistor 100. In this specification and the like, the insulating films 106 and 107 are collectively referred to as a first insulating film, the insulating films 114 and 116 are collectively referred to as a second insulating film, and the insulating film 118 is referred to as a third insulating film in some cases.

The conductive film 120b can be used as a second gate electrode of the transistor 100.

In the case where the transistor 100 is used in a pixel portion of a display panel, the conductive film 120a can be used as an electrode of a display element, or the like.

The oxide semiconductor film 108 includes the second oxide semiconductor film 108b (on the conductive film 104 side) that functions as a first gate electrode, and an oxide semiconductor film 108c over the second oxide semiconductor film 108b. The oxide semiconductor films 108b and 108c contain In, M (M is Al, Ga, Y, or Sn), and Zn.

The second oxide semiconductor film 108b preferably includes a region in which the atomic proportion of In is larger than the atomic proportion of M, for example. The oxide semiconductor film 108c preferably includes a region in which the atomic proportion of In is smaller than that in the second oxide semiconductor film 108b.

The second oxide semiconductor film 108b including the region in which the atomic proportion of In is larger than that of M can increase the field-effect mobility (also simply referred to as mobility or μFE) of the transistor 100. Specifically, the field-effect mobility of the transistor 100 can exceed 10 cm$^2$/Vs, preferably exceed 30 cm$^2$/Vs.

For example, the use of the transistor with high field-effect mobility for a gate driver that generates a gate signal (specifically, a demultiplexer connected to an output terminal of a shift register included in a gate driver) allows a semiconductor device or a display device to have a narrow frame.

On the other hand, the second oxide semiconductor film 108b including the region in which the atomic proportion of In is larger than that of M makes it easier to change electrical characteristics of the transistor 100 in light irradiation. However, in the semiconductor device of one embodiment of the present invention, the oxide semiconductor film 108c is formed over the second oxide semiconductor film 108b. Furthermore, the oxide semiconductor film 108c including the region in which the atomic proportion of In is smaller than that in the second oxide semiconductor film 108b has larger Eg than the second oxide semiconductor film 108b. For this reason, the oxide semiconductor film 108 which is a layered structure of the second oxide semiconductor film 108b and the oxide semiconductor film 108c has high resistance to a negative bias stress test with light irradiation.

Impurities such as hydrogen or moisture entering the channel region of the oxide semiconductor film 108, particularly the second oxide semiconductor film 108b adversely affect the transistor characteristics and therefore cause a problem. Moreover, it is preferable that the amount of impurities such as hydrogen or moisture in the channel region of the second oxide semiconductor film 108b be as small as possible. Furthermore, oxygen vacancies formed in the channel region in the second oxide semiconductor film 108b adversely affect the transistor characteristics and therefore cause a problem. For example, oxygen vacancies formed in the channel region in the second oxide semiconductor film 108b are bonded to hydrogen to serve as a carrier supply source. The carrier supply source generated in the channel region in the second oxide semiconductor film 108b causes a change in the electrical characteristics, typically, shift in the threshold voltage, of the transistor 100 including the second oxide semiconductor film 108b. Therefore, it is preferable that the amount of oxygen vacancies in the channel region of the second oxide semiconductor film 108b be as small as possible.

In view of this, one embodiment of the present invention is a structure in which insulating films in contact with the oxide semiconductor film 108, specifically the insulating film 107 formed under the oxide semiconductor film 108 and the insulating films 114 and 116 formed over the oxide semiconductor film 108 include excess oxygen. Oxygen or excess oxygen is transferred from the insulating film 107 and the insulating films 114 and 116 to the oxide semiconductor film 108, whereby the oxygen vacancies in the oxide semiconductor film can be reduced. As a result, a change in electrical characteristics of the transistor 100, particularly a change in the transistor 100 due to light irradiation, can be reduced.

In one embodiment of the present invention, a manufacturing method is used in which the number of manufacturing steps is not increased or an increase in the number of manufacturing steps is extremely small, because the insulating film 107 and the insulating films 114 and 116 are made to contain excess oxygen. Thus, the transistors 100 can be manufactured with high yield.

Specifically, in a step of forming the second oxide semiconductor film 108b, the second oxide semiconductor film 108b is formed by a sputtering method in an atmosphere containing an oxygen gas, whereby oxygen or excess oxygen is added to the insulating film 107 over which the second oxide semiconductor film 108b is formed.

Furthermore, in a step of forming the conductive films 120a and 120b, the conductive films 120a and 120b are formed by a sputtering method in an atmosphere containing an oxygen gas, whereby oxygen or excess oxygen is added to the insulating film 116 over which the conductive films 120a and 120b are formed. Note that in some cases, oxygen or excess oxygen is added also to the insulating film 114 and the oxide semiconductor film 108 under the insulating film 116 when oxygen or excess oxygen is added to the insulating film 116.

<Oxide Conductor>

Next, an oxide conductor is described. In a step of forming the conductive films 120a and 120b, the conductive films 120a and 120b serve as a protective film for suppressing release of oxygen from the insulating films 114 and 116. The conductive films 120a and 120b serve as semiconductors before a step of forming the insulating film 118 and serve as conductors after the step of forming the insulating film 118.

To allow the conductive films 120a and 120b to serve as conductors, an oxygen vacancy is formed in the conductive films 120a and 120b and hydrogen is added from the insulating film 118 to the oxygen vacancy, whereby a donor level is formed in the vicinity of the conduction band. As a result, the conductivity of each of the conductive films 120a and 120b is increased, so that the oxide semiconductor film becomes a conductor. The conductive films 120a and 120b having become conductors can each be referred to as oxide conductor. Oxide semiconductors generally have a visible light transmitting property because of their large energy gap. An oxide conductor is an oxide semiconductor having a donor level in the vicinity of the conduction band. Therefore, the influence of absorption due to the donor level is small in an oxide conductor, and an oxide conductor has a visible light transmitting property comparable to that of an oxide semiconductor.

<Components of the Semiconductor Device>

Components of the semiconductor device of this embodiment will be described below in detail.

As materials described below, materials described in Embodiment 3 can be used.

The material that can be used for the substrate 102 described in Embodiment 3 can be used for the substrate 102 in this embodiment. Furthermore, the materials that can be used for the insulating films 106 and 107 described in Embodiment 3 can be used for the insulating films 106 and 107 in this embodiment.

In addition, the materials that can be used for the conductive films functioning as the gate electrode, the source electrode, and the drain electrode described in Embodiment 3 can be used for the conductive films functioning as the first gate electrode, the source electrode, and the drain electrode in this embodiment.

<<Oxide Semiconductor Film>>

The oxide semiconductor film 108 can be formed using the materials described above.

In the case where the second oxide semiconductor film 108b includes In-M-Zn oxide, it is preferable that the atomic ratio of metal elements of a sputtering target used for forming the In-M-Zn oxide satisfy In>M. The atomic ratio between metal elements in such a sputtering target is, for example, In:M:Zn=2:1:3, InM:Zn=3:1:2, or In:M:Zn=4:2:4.1.

In the case where the oxide semiconductor film 108c is In-M-Zn oxide, it is preferable that the atomic ratio of metal elements of a sputtering target used for forming a film of the In-M-Zn oxide satisfy In≤M. The atomic ratio of metal elements in such a sputtering target is, for example, In:M:Zn=1:1:1, In:M:Zn=1:1:1.2, In:M:Zn=1:3:2, In:M:Zn=1:3:4, or In:M:Zn=1:3:6.

In the case where the oxide semiconductor films 108b and 108c are formed of In-M-Zn oxide, it is preferable to use a target including polycrystalline In-M-Zn oxide as the sputtering target. The use of the target including polycrystalline In-M-Zn oxide facilitates formation of the oxide semiconductor films 108b and 108c having crystallinity. Note that the atomic ratios of metal elements in each of the formed oxide semiconductor films 108b and 108c vary from the above atomic ratio of metal elements of the sputtering target within a range of ±40% as an error. For example, when a sputtering target of the second oxide semiconductor film 108b with an atomic ratio of In to Ga and Zn of 4:2:4.1 is used, the atomic ratio of In to Ga and Zn in the second oxide semiconductor film 108b may be 4:2:3 or in the vicinity of 4:2:3.

The energy gap of the oxide semiconductor film 108 is 2 eV or more, preferably 2.5 eV or more, further preferably 3 eV or more. The use of an oxide semiconductor having a wide energy gap can reduce off-state current of the transistor 100. In particular, an oxide semiconductor film having an energy gap more than or equal to 2 eV, preferably more than or equal to 2 eV and less than or equal to 3.0 eV is preferably used as the second oxide semiconductor film 108b, and an oxide semiconductor film having an energy gap more than or equal to 2.5 eV and less than or equal to 3.5 eV is preferably used as the oxide semiconductor film 108c. Furthermore, the oxide semiconductor film 108c preferably has a higher energy gap than the second oxide semiconductor film 108b.

Each thickness of the second oxide semiconductor film 108b and the oxide semiconductor film 108c is more than or equal to 3 nm and less than or equal to 200 nm, preferably more than or equal to 3 nm and less than or equal to 100 nm, more preferably more than or equal to 3 nm and less than or equal to 50 nm.

An oxide semiconductor film with low carrier density is used as the second oxide semiconductor film 108c. For example, the carrier density of the oxide semiconductor film 108c is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$.

Note that, without limitation to the compositions and materials described above, a material with an appropriate composition may be used depending on required semiconductor characteristics and electrical characteristics (e.g., field-effect mobility and threshold voltage) of a transistor. Furthermore, in order to obtain required semiconductor characteristics of a transistor, it is preferable that the carrier density, the impurity concentration, the defect density, the atomic ratio of a metal element to oxygen, the interatomic distance, the density, and the like of the second oxide semiconductor film 108b and the oxide semiconductor film 108c be set to be appropriate.

Note that it is preferable to use, as the second oxide semiconductor film 108b and the oxide semiconductor film 108c, an oxide semiconductor film in which the impurity concentration is low and the density of defect states is low, in which case the transistor can have more excellent electrical characteristics. Here, the state in which the impurity concentration is low and the density of defect states is low (the amount of oxygen vacancy is small) is referred to as "highly purified intrinsic" or "substantially highly purified intrinsic". A highly purified intrinsic or substantially highly purified intrinsic oxide semiconductor film has few carrier generation sources, and thus can have a low carrier density. Thus, a transistor in which a channel region is formed in the oxide semiconductor film rarely has a negative threshold voltage (is rarely normally on). A highly purified intrinsic or substantially highly purified intrinsic oxide semiconductor film has a low density of defect states and accordingly has a low density of trap states in some cases. Furthermore, the highly purified intrinsic or substantially highly purified intrinsic oxide semiconductor film has an extremely low off-state current; even when an element has a channel width of $1\times10^6$ μm and a channel length L of 10 μm, the off-state current can be less than or equal to the measurement limit of a semiconductor parameter analyzer, that is, less than or equal to $1\times10^{-13}$ A, at a voltage (drain voltage) between a source electrode and a drain electrode of from 1 V to 10 V.

Accordingly, the transistor in which the channel region is formed in the highly purified intrinsic or substantially highly purified intrinsic oxide semiconductor film can have a small change in electrical characteristics and high reliability. Charges trapped by the trap states in the oxide semiconductor film take a long time to be released and may behave like fixed charges. Thus, the transistor whose channel region is formed in the oxide semiconductor film having a high density of trap states has unstable electrical characteristics in some cases. As examples of the impurities, hydrogen, nitrogen, alkali metal, and alkaline earth metal are given.

Hydrogen included in the oxide semiconductor film reacts with oxygen bonded to a metal atom to be water, and also causes oxygen vacancy in a lattice from which oxygen is released (or a portion from which oxygen is released). Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Thus, a transistor including an oxide semiconductor film which contains hydrogen is likely to be normally on. Accordingly, it is preferable that hydrogen be reduced as much as possible in the oxide semiconductor film 108. Specifically, in the oxide semiconductor film 108, the concentration of hydrogen which is measured by SIMS is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, further preferably lower than or equal to $5\times10^{18}$ atoms/cm$^3$, further preferably lower than or equal to $1\times10^{18}$ atoms/cm$^3$, further preferably lower than or equal to $5\times10^{17}$ atoms/cm$^3$, and further preferably lower than or equal to $1\times10^{16}$ atoms/cm$^3$.

The second oxide semiconductor film 108b preferably includes a region in which hydrogen concentration is smaller than that in the oxide semiconductor film 108c. A semiconductor device including the second oxide semiconductor film 108b having the region in which hydrogen concentration is smaller than that in the oxide semiconductor film 108c can be increased in reliability.

When silicon or carbon that is one of elements belonging to Group 14 is included in the second oxide semiconductor film 108b, oxygen vacancy increases in the second oxide semiconductor film 108b, and the second oxide semiconductor film 108b becomes an n-type film. Thus, the concentration of silicon or carbon (the concentration is measured by SIMS) in the second oxide semiconductor film 108b or the concentration of silicon or carbon (the concentration is measured by SIMS) in the vicinity of an interface with the second oxide semiconductor film 108b is set to be lower than or equal to $2\times10^{18}$ atoms/cm$^3$, preferably lower than or equal to $2\times10^{17}$ atoms/cm$^3$.

In addition, the concentration of alkali metal or alkaline earth metal of the second oxide semiconductor film 108b, which is measured by SIMS, is lower than or equal to $1\times10^{18}$ atoms/cm$^3$, preferably lower than or equal to $2\times10^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal of the second oxide semiconductor film 108b.

Furthermore, when including nitrogen, the second oxide semiconductor film 108b easily becomes n-type by generation of electrons serving as carriers and an increase of carrier density. Thus, a transistor including an oxide semiconductor film which contains nitrogen is likely to have normally-on characteristics. For this reason, nitrogen in the oxide semiconductor film is preferably reduced as much as possible; the concentration of nitrogen which is measured by SIMS is preferably set to be, for example, lower than or equal to $5\times10^{18}$ atoms/cm$^3$.

The second oxide semiconductor film 108b and the oxide semiconductor film 108c may have a non-single-crystal structure, for example. The non-single crystal structure includes a c-axis aligned crystalline oxide semiconductor (CAAC-OS) described later, a polycrystalline structure, a microcrystalline structure, or an amorphous structure, for example. Among the non-single crystal structure, the amorphous structure has the highest density of defect states, whereas CAAC-OS has the lowest density of defect states.

<<Insulating Films Functioning as Second Gate Insulating Film>>

The insulating films 114 and 116 function as a second gate insulating film of the transistor 100. In addition, the insulating films 114 and 116 each have a function of supplying oxygen to the oxide semiconductor film 108. That is, the insulating films 114 and 116 contain oxygen. Furthermore, the insulating film 114 is an insulating film which can transmit oxygen. Note that the insulating film 114 also functions as a film which relieves damage to the oxide semiconductor film 108 at the time of forming the insulating film 116 in a later step.

For example, the insulating films 114 and 116 described in Embodiment 3 can be used as the insulating films 114 and 116 in this embodiment.

<<Oxide Semiconductor Film Functioning as Conductive Film, Oxide Semiconductor Film Functioning as Second Gate Electrode>>

The material of the oxide semiconductor film 108 described above can be used for the conductive film 120a functioning as a conductive film and the conductive film 120b functioning as the second gate electrode.

That is, the conductive film 120a functioning as a conductive film and the conductive film 120b functioning as a second gate electrode contain a metal element which is the same as that contained in the oxide semiconductor film 108 (the second oxide semiconductor film 108b and the oxide semiconductor film 108c). For example, the conductive film 120b functioning as a second gate electrode and the oxide semiconductor film 108 (the second oxide semiconductor film 108b and the oxide semiconductor film 108c) contain the same metal element; thus, the manufacturing cost can be reduced.

For example, in the case where the conductive film 120a functioning as a conductive film and the conductive film 120b functioning as a second gate electrode are each In-M-Zn oxide, the atomic ratio of metal elements in a sputtering target used for forming the In-M-Zn oxide preferably satisfies In≤M The atomic ratio of metal elements in such a sputtering target is In:M:Zn=2:1:3, In:M:Zn=3:1:2, In:M:Zn=4:2:4.1, or the like.

The conductive film 120a functioning as a conductive film and the conductive film 120b functioning as a second gate electrode can each have a single-layer structure or a stacked-layer structure of two or more layers. Note that in the case where the conductive film 120a functioning as a conductive film and the conductive film 120b each have a stacked-layer structure, the composition of the sputtering target is not limited to that described above.

<<Insulating Film Functioning as Protective Insulating Film of Transistor>>

The insulating film 118 serves as a protective insulating film of the transistor 100.

The insulating film 118 includes one or both of hydrogen and nitrogen. Alternatively, the insulating film 118 includes nitrogen and silicon. The insulating film 118 has a function of blocking oxygen, hydrogen, water, alkali metal, alkaline earth metal, or the like. It is possible to prevent outward diffusion of oxygen from the oxide semiconductor film 108, outward diffusion of oxygen included in the insulating films 114 and 116, and entry of hydrogen, water, or the like into the oxide semiconductor film 108 from the outside by providing the insulating film 118.

The insulating film 118 has a function of supplying one or both of hydrogen and nitrogen to the conductive film 120a and the conductive film 120b functioning as a second gate electrode. The insulating film 118 preferably includes hydrogen and has a function of supplying the hydrogen to the conductive films 120a and 120b. The conductive films 120a and 120b supplied with hydrogen from the insulating film 118 function as conductors.

A nitride insulating film, for example, can be used as the insulating film 118. The nitride insulating film is formed using silicon nitride, silicon nitride oxide, aluminum nitride, aluminum nitride oxide, or the like.

Although the variety of films such as the conductive films, the insulating films, and the oxide semiconductor films which are described above can be formed by a sputtering method or a PECVD method, such films may be formed by another method, e.g., a thermal CVD method. Examples of the thermal CVD method include an MOCVD method and an ALD method. Specifically, the methods described in the above embodiment can be used.

A thermal CVD method has an advantage that no defect due to plasma damage is generated since it does not utilize plasma for forming a film.

Deposition by a thermal CVD method may be performed in such a manner that a source gas and an oxidizer are supplied to the chamber at a time so that the pressure in a chamber is set to an atmospheric pressure or a reduced pressure, and react with each other in the vicinity of the substrate or over the substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves). For example, a first source gas is introduced, an inert gas (e.g., argon or nitrogen) or the like is introduced at the same time as or after the introduction of the first source gas so that the source gases are not mixed, and then a second source gas is introduced. Note that in the case where the first source gas and the inert gas are introduced at a time, the inert gas serves as a carrier gas, and the inert gas may also be introduced at the same time as the introduction of the second source gas. Alternatively, the first source gas may be exhausted by vacuum evacuation instead of the introduction of the inert gas, and then the second source gas may be introduced. The first source gas is adsorbed on the surface of the substrate to form a first layer; then the second source gas is introduced to react with the first layer; as a result, a second layer is stacked over the first layer, so that a thin film is formed. The sequence of the gas introduction is repeated plural times until a desired thickness is obtained, whereby a thin film with excellent step coverage can be formed. The thickness of the thin film can be adjusted by the number of repetition times of the sequence of the gas introduction; therefore, an ALD method makes it possible to accurately adjust a thickness and thus is suitable for manufacturing a minute FET.

The variety of films such as the conductive films, the insulating films, the oxide semiconductor films, and the metal oxide films in this embodiment can be formed by a thermal CVD method such as an MOCVD method or an ALD method. For example, in the case where an In—Ga—Zn—O film is formed, trimethylindium, trimethylgallium, and dimethylzinc are used. Note that the chemical formula of trimethylindium is $In(CH_3)_3$. The chemical formula of trimethylgallium is $Ga(CH_3)_3$. The chemical formula of dimethylzinc is $Zn(CH_3)_2$. Without limitation to the above combination, triethylgallium (chemical formula: $Ga(C_2H_5)_3$) can be used instead of trimethylgallium and diethylzinc (chemical formula: $Zn(C_2H_5)_2$) can be used instead of dimethylzinc.

For example, in the case where a hafnium oxide film is formed by a deposition apparatus using an ALD method, two kinds of gases, that is, ozone ($O_3$) as an oxidizer and a source gas which is obtained by vaporizing liquid containing a solvent and a hafnium precursor compound (e.g., a hafnium alkoxide or a hafnium amide such as tetrakis(dimethylamide)hafnium (TDMAH)) are used. Note that the chemical formula of tetrakis(dimethylamide)hafnium is $Hf[N(CH_3)_2]_4$. Examples of another material liquid include tetrakis(ethylmethylamide)hafnium.

For example, in the case where an aluminum oxide film is formed by a deposition apparatus using an ALD method, two kinds of gases, e.g., $H_2O$ as an oxidizer and a source gas which is obtained by vaporizing liquid containing a solvent and an aluminum precursor compound (e.g., trimethylaluminum (TMA)) are used. Note that the chemical formula of trimethylaluminum is $Al(CH_3)_3$. Examples of another material liquid include tris(dimethylamide)aluminum, triisobutylaluminum, and aluminum tris(2,2,6,6-tetramethyl-3,5-heptanedionate).

For example, in the case where a silicon oxide film is formed by a deposition apparatus using an ALD method, hexachlorodisilane is adsorbed on a surface where a film is to be formed, chlorine included in the adsorbate is removed, and radicals of an oxidizing gas (e.g., $O_2$ or dinitrogen monoxide) are supplied to react with the adsorbate.

For example, in the case where a tungsten film is formed with a deposition apparatus using an ALD method, a $WF_6$ gas and a $B_2H_6$ gas are sequentially introduced plural times to form an initial tungsten film, and then a $WF_6$ gas and an $H_2$ gas are used, so that a tungsten film is formed. Note that an $SiH_4$ gas may be used instead of a $B_2H_6$ gas.

For example, in the case where an oxide semiconductor film, e.g., an In—Ga—Zn—O film is formed using a deposition apparatus using an ALD method, an $In(CH_3)_3$ gas and an $O_3$ gas are sequentially introduced plural times to form an InO layer, a GaO layer is formed using a $Ga(CH_3)_3$ gas and an $O_3$ gas, and then a ZnO layer is formed using a $Zn(CH_3)_2$ gas and an $O_3$ gas. Note that the order of these layers is not limited to this example. A mixed compound layer such as an In—Ga—O layer, an In—Zn—O layer, or a Ga—Zn—O layer may be formed by mixing these gases. Note that although an $H_2O$ gas which is obtained by bubbling water with an inert gas such as Ar may be used instead of an $O_3$ gas, it is preferable to use an $O_3$ gas, which does not contain H. Furthermore, instead of an $In(CH_3)_3$ gas, an $In(C_2H_5)_3$ gas may be used. Instead of a $Ga(CH_3)_3$ gas, a $Ga(C_2H_5)_3$ gas may be used. Furthermore, a $Zn(CH_3)_2$ gas may be used.

Note that this embodiment can be combined with any of the other embodiments in this specification as appropriate.

Embodiment 5

In this embodiment, the structure of a data processor of one embodiment of the present invention will be described with reference to FIGS. 13A and 13B, FIGS. 14A to 14D, FIGS. 15A and 15B, and FIG. 16.

Figure 13A:
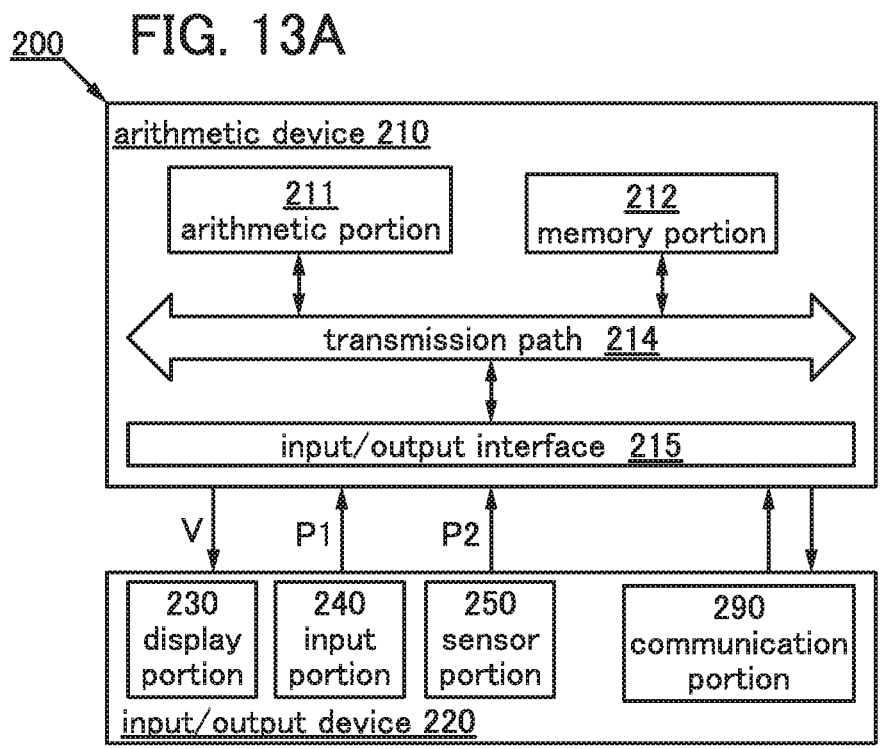
FIGS. 13A and 13B illustrate the structure of a data processor of one embodiment.
Figure 13B:
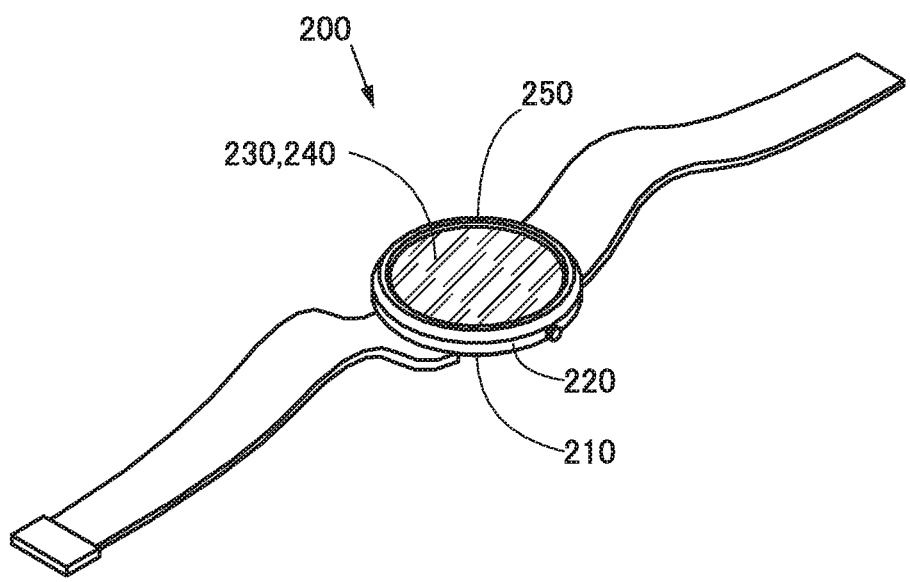

FIG. 13A is a block diagram illustrating the structure of a data processor 200. FIG. 13B is a projection view illustrating an example of an external view of the data processor 200.

Figure 14A:
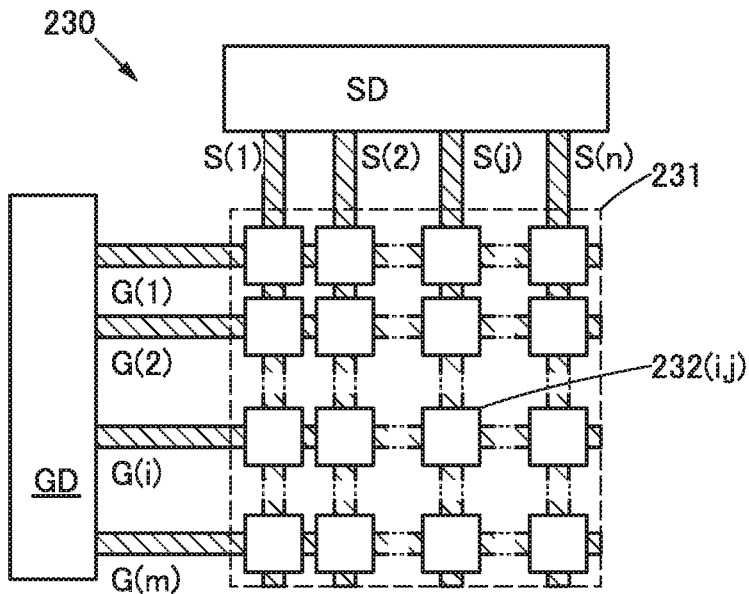
FIGS. 14A to 14C are block diagrams of a display portion of one embodiment.
Figure 14B:
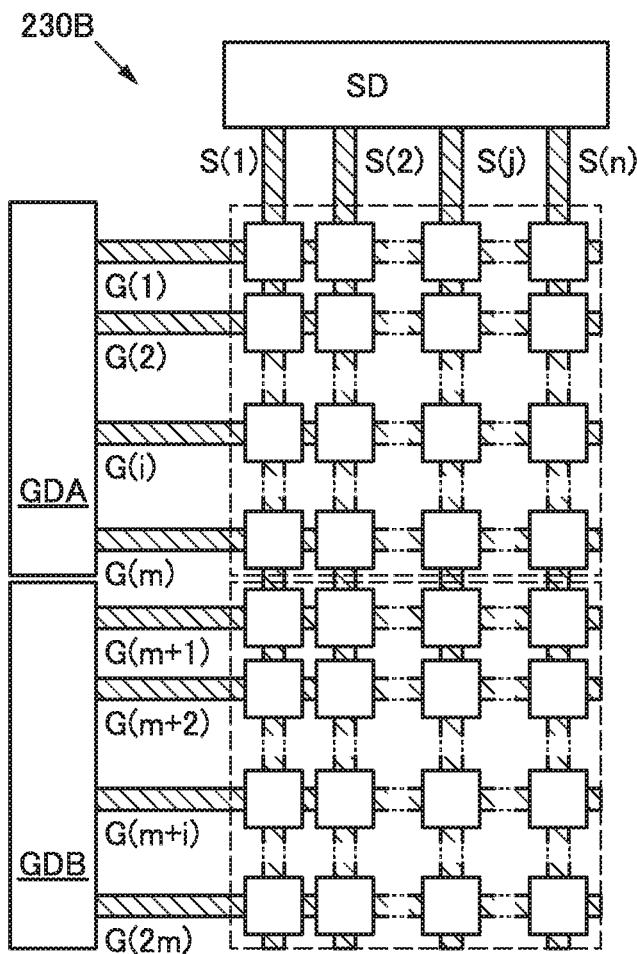
Figure 14C:
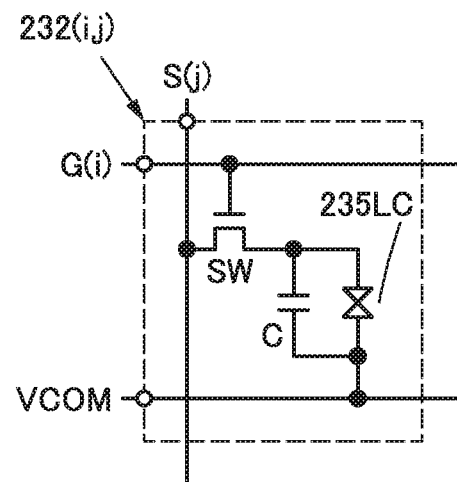

FIG. 14A is a block diagram illustrating the structure of a display portion 230. FIG. 14B is a block diagram illustrating the structure of a display portion 230B. FIG. 14C is a circuit diagram illustrating the structure of a pixel 232(i, j).

<Configuration Example of Data Processor>

The data processor 200 described in this embodiment includes an arithmetic device 210 and an input/output device 220 (see FIG. 13A).

The arithmetic device 210 is configured to receive positional data P1 and supply image data V and control data.

The input/output device 220 is configured to supply the positional data P1 and receive the image data V and the control data.

The input/output device 220 includes the display portion 230 that displays the image data V and an input portion 240 that supplies the positional data P1. Note that the touch panel includes the display portion 230 and the input portion 240.

The display portion 230 includes a display element and a pixel circuit for driving the display element.

The input portion 240 is configured to sense the position of a pointer and supply the positional data P1 sensed in accordance with the position.

The arithmetic device 210 is configured to determine the moving speed of the pointer in accordance with the positional data P1, and the like.

The arithmetic device 210 is configured to determine the contrast or brightness of the image data V in accordance with the moving speed, and the like.

With this structure, eyestrain on a user caused when the display position of image data is moved can be reduced, that is, eye-friendly display can be achieved. Thus, the novel data processor that is highly convenient or reliable can be provided.

<Configuration>

The data processor of one embodiment of the present invention includes the arithmetic device 210 or the input/output device 220.

<<Arithmetic Device 210>>

The arithmetic device 210 includes an arithmetic portion 211 and a memory portion 212. The arithmetic device 210 further includes a transmission path 214 and an input/output interface 215 (see FIG. 13A).

<<Arithmetic Portion 211>>

The arithmetic portion 211 is configured to, for example, execute a program.

For example, a CPU described in Embodiment 6 can be used for the arithmetic portion 211. In that case, power consumption can be reduced.

<<Memory Portion 212>>

The memory portion 212 is configured to, for example, store the program executed by the arithmetic portion 211, initial information, setting information, an image, or the like.

Specifically, a hard disk, a flash memory, a memory including a transistor including an oxide semiconductor, or the like can be used for the memory portion 212.

<<Input/Output Interface 215, Transmission Path 214>>

The input/output interface 215 includes a terminal or a wiring and is configured to supply and receive information. For example, the input/output interface 215 can be electrically connected to the transmission path 214 and the input/output device 220.

The transmission path 214 includes a wiring and is configured to supply and receive information. For example, the transmission path 214 can be electrically connected to the input/output interface 215. In addition, the transmission path 214 can be electrically connected to the arithmetic portion 211 or the input/output interface 215.

<<Input/Output Device 220>>

The input/output device 220 includes the display portion 230, the input portion 240, a sensor portion 250, or a communication portion 290. For example, the touch panel described in Embodiment 1 can be used for the input/output device 220.

<<Display Portion 230>>

The display portion 230 includes a display region 231, a driver circuit GD, and a driver circuit SD (see FIG. 14A).

The display region 231 includes a plurality of pixels 232(i, 1) to 232 (i, n) arranged in the row direction, a plurality of pixels 232(1, j) to 232 (m, j) arranged in the column direction, a scan line G(i) electrically connected to the pixels 232(i, 1) to 232 (i, n), and a signal line S(j) electrically connected to the pixels 232(1, j) to 232 (m, j). Note that i is an integer greater than or equal to 1 and less than or equal to m, j is an integer greater than or equal to 1 and less than or equal to n, and each of m and n is an integer greater than or equal to 1.

Note that the pixel 232(i, j) is electrically connected to the scan line G1(i), the scan line G2(i), the signal line S(j), the wiring ANO, the wiring VCOM1, and the wiring VCOM2 (see FIG. 14C).

The display portion can include a plurality of driver circuits. For example, the display portion 230B can include a driver circuit GDA and a driver circuit GDB (see FIG. 14B).

<<Driver Circuit GD>>

The driver circuit GD is configured to supply a selection signal in accordance with the control data.

For example, the driver circuit GD is configured to supply a selection signal to one scan line at a frequency of 30 Hz or higher, preferably 60 Hz or higher, in accordance with the control data. Accordingly, moving images can be smoothly displayed.

For example, the driver circuit GD is configured to supply a selection signal to one scan line at a frequency of lower than 30 Hz, preferably lower than 1 Hz, more preferably less than once per minute, in accordance with the control data. Accordingly, a still image can be displayed while flickering is suppressed.

For example, in the case where a plurality of driver circuits is provided, the driver circuits GDA and GDB may supply the selection signals at different frequencies. Specifically, the selection signal can be supplied at a higher frequency to a region on which moving images are smoothly displayed than to a region on which a still image is displayed in a state where flickering is suppressed.

<<Driver Circuit SD>>

The driver circuit SD is configured to supply an image signal in accordance with the image data V.

<<Pixel 232(i,j)>>

The pixel 232(i, j) includes a display element 235LC. The pixel 232(i, j) further includes the pixel circuit for driving the display element 235LC (see FIG. 14C).

<<Display Element 235LC>>

For example, a display element having a function of controlling light transmission can be used as the display element 235LC. Specifically, a polarizing plate and a liquid crystal element, a MEMS shutter display element, or the like can be used can be used as the display element 235LC.

For example, a liquid crystal element that can be driven by an in-plane switching (IPS) mode, a fringe field switching (FFS) mode, or the like can be used for the display element.

A liquid crystal element that can be driven by any of the following driving methods can be used as the display element: a multi-domain vertical alignment (MVA) mode, an electrically tilted vertical alignment (EVA) mode, a patterned vertical alignment (PVA) mode, a continuous pinwheel alignment (CPA) mode, an advanced super-view (ASV) mode, a polymer sustained alignment (PSA) mode, an ultra violet induced multi-domain vertical alignment ($UV^2A$) mode, a field induced photo-reactive alignment (FPA) mode, a transverse bend alignment (TBA) mode, and a super-fast response (SFR) mode.

Alternatively, a liquid crystal element that can be driven by any of the following driving method can be used as the display element: a twisted nematic (TN) mode, a ferroelectric liquid crystal (FLC) mode, an antiferroelectric liquid crystal (AFLC) mode, an axially symmetric aligned microcell (ASM) mode, an optically compensated birefringence (OCB) mode, or the like.

A liquid crystal element includes a layer containing a liquid crystal material and an electrode which is provided so that an electric field for controlling the alignment of the liquid crystal material can be applied. For example, the orientation of the liquid crystal material can be controlled by an electric field in a direction intersecting with the thickness direction of the layer containing a liquid crystal material (also referred to as the vertical direction).

For example, thermotropic liquid crystal, low-molecular liquid crystal, high-molecular liquid crystal, polymer dispersed liquid crystal, ferroelectric liquid crystal, anti-ferroelectric liquid crystal, or the like can be used for the layer containing a liquid crystal material. These liquid crystal materials exhibit a cholesteric phase, a smectic phase, a cubic phase, a chiral nematic phase, an isotropic phase, or the like depending on conditions. Alternatively, a liquid crystal material which exhibits a blue phase can be used for the layer containing a liquid crystal material.

<<Pixel Circuit>>

The configuration of the pixel circuit can be designed according to the display element.

For example, a pixel circuit which is electrically connected to the scan line G1(i), the signal line S(j), and the wiring VCOM and which drives the display element 235LC is described (see FIG. 14C).

A switch, a capacitor, and the like can be used in the pixel circuit. In addition, a transistor, a diode, a resistor, a capacitor, an inductor, and the like can be used.

For example, one or a plurality of transistors can be used as a switch. Alternatively, a plurality of transistors connected in parallel, in series, or in combination of parallel connection and series connection can be used as a switch.

For example, a capacitor may be formed by the first electrode of the first display element 235LC and a conductive film having a region overlapping with the first electrode.

For example, the pixel circuit includes a transistor functioning as a switch SW, the first display element 235LC, and the capacitor C1. A gate electrode of the transistor SW is electrically connected to the scan line G(i)1, and a first electrode of the transistor SW is electrically connected to the signal line S(j)1. A first electrode of the first display element 235LC is electrically connected to a second electrode of the transistor, and a second electrode of the first display element 235LC is electrically connected to the wiring VCOM1. A first electrode of the capacitor C1 is electrically connected to a second electrode of the transistor SW, and a second electrode of the capacitor C1 is electrically connected to the wiring VCOM.

<<Transistor>>

For example, semiconductor films formed at the same step can be used for transistors in the driver circuit and the pixel circuit.

As the transistors in the driver circuit and the pixel circuit, bottom-gate transistors, top-gate transistors, or the like can be used.

A manufacturing line for a bottom-gate transistor including amorphous silicon as a semiconductor can be easily remodeled into a manufacturing line for a bottom-gate transistor including an oxide semiconductor as a semiconductor, for example. Furthermore, for example, a manufacturing line for a top-gate transistor including polysilicon as a semiconductor can be easily remodeled into a manufacturing line for a top-gate transistor including an oxide semiconductor as a semiconductor.

For example, a transistor including a semiconductor containing an element of Group 4 can be used. Specifically, a semiconductor containing silicon can be used for a semiconductor film. For example, single crystal silicon, polysilicon, microcrystalline silicon, or amorphous silicon can be used for the semiconductor film of the transistor.

Note that the temperature for forming a transistor using polysilicon in a semiconductor film is lower than the temperature for forming a transistor using single crystal silicon in a semiconductor film.

In addition, the transistor using polysilicon in a semiconductor film has higher field-effect mobility than the transistor using amorphous silicon in a semiconductor film, and therefore a pixel including the transistor using polysilicon can have a high aperture ratio. Moreover, pixels arranged at high resolution, a gate driver circuit, and a source driver circuit can be formed over the same substrate. As a result, the number of components included in an electronic device can be reduced.

In addition, the transistor using polysilicon in a semiconductor film has higher reliability than the transistor using amorphous silicon in a semiconductor film For example, a transistor including an oxide semiconductor can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon for a semiconductor film can be used. Specifically, a transistor that uses an oxide semiconductor for a semiconductor film can be used.

A pixel circuit in the transistor that uses an oxide semiconductor for the semiconductor film can hold an image signal for a longer time than a pixel circuit in a transistor that uses amorphous silicon for a semiconductor film. Specifically, the selection signal can be supplied at a frequency of lower than 30 Hz, preferably lower than 1 Hz, more preferably less than once per minute while flickering is suppressed. Consequently, eyestrain on a user of the data processor can be reduced, and power consumption for driving can be reduced.

Alternatively, for example, a transistor including a compound semiconductor can be used. Specifically, a semiconductor containing gallium arsenide can be used for a semiconductor film.

For example, a transistor including an organic semiconductor can be used. Specifically, an organic semiconductor containing any of polyacenes and graphene can be used for the semiconductor film.

<<Input Portion 240>>

A variety of human interfaces or the like can be used as the input portion 240 (see FIG. 13A).

For example, a keyboard, a mouse, a touch sensor, a microphone, a camera, or the like can be used as the input portion 240. Note that a touch sensor having a region overlapping with the display portion 230 can also be used. An input/output device that includes the display portion 230 and the touch sensor having a region overlapping with the display portion 230 can be referred to as a touch panel.

For example, a user can make various gestures (e.g., tap, drag, swipe, and pinch in) using his/her finger as a pointer on the touch panel.

The arithmetic device 210, for example, analyzes information on the position, track, or the like of the finger on the touch panel and determines that a specific gesture is supplied when the analysis results meet predetermined conditions. Therefore, the user can supply a certain operation instruction associated with a certain gesture by using the gesture.

For instance, the user can supply a "scrolling instruction" for changing a portion where image data is displayed by using a gesture of touching and moving his/her finger on the touch panel.

<<Sensor Portion 250>>

The sensor portion 250 is configured to acquire data P2 by detecting the surrounding state.

For example, a camera, an acceleration sensor, a direction sensor, a pressure sensor, a temperature sensor, a humidity sensor, an illuminance sensor, or a global positioning system (GPS) signal receiving circuit can be used as the sensor portion 250.

<<Communication Portion 290>>

The communication portion 290 is configured to supply and acquire data to/from a network.

<<Program>>

A program of one embodiment of the present invention will be described with reference to FIGS. 15A and 15B and FIG. 16.

Figure 15A:
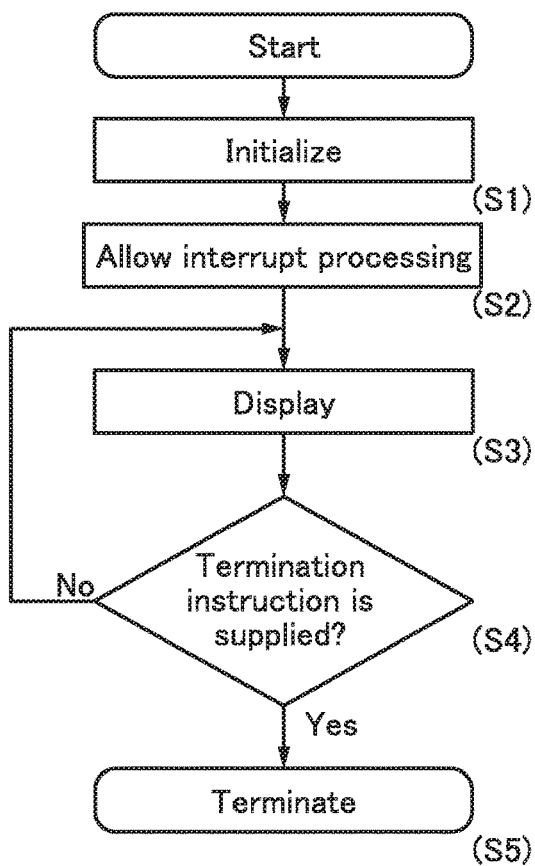
FIGS. 15A and 15B are flow charts each illustrating a program of one embodiment.
Figure 15B:
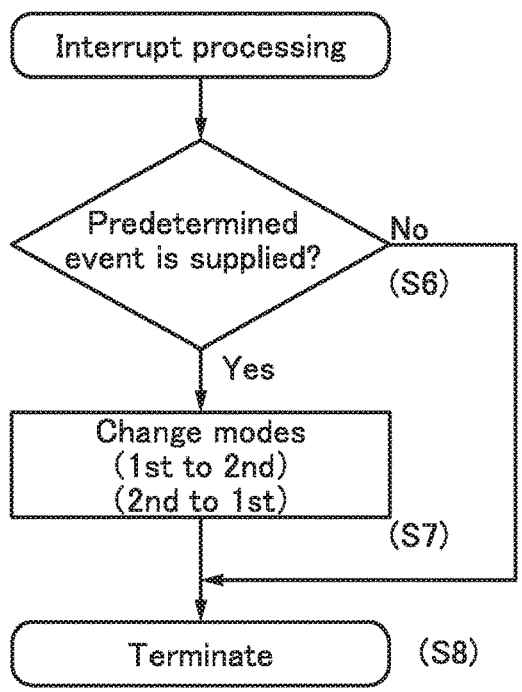

FIG. 15A is a flow chart showing main processing of the program of one embodiment of the present invention, and FIG. 15B is a flow chart showing interrupt processing.

Figure 16:
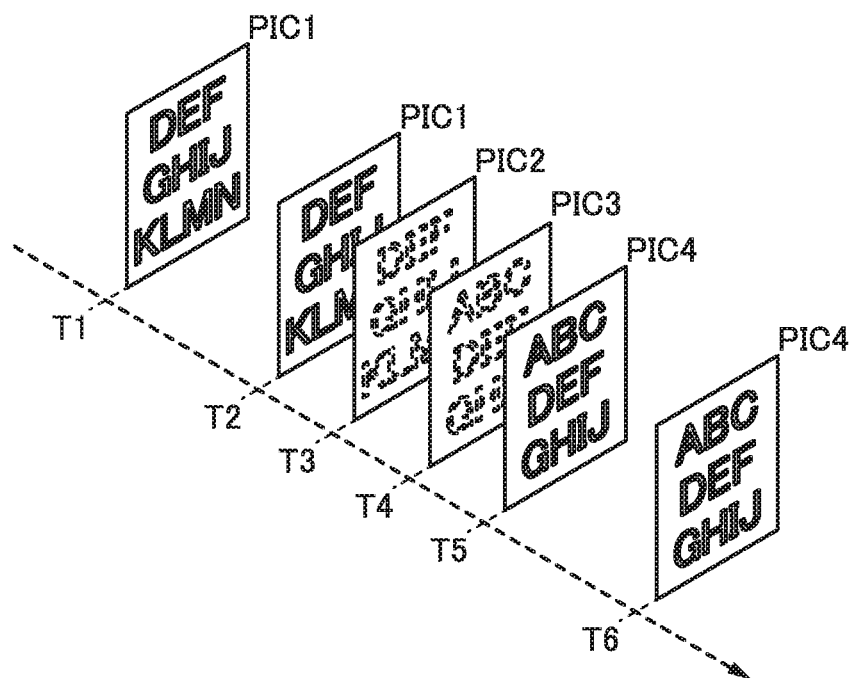
FIG. 16 is a schematic diagram illustrating image data of one embodiment.

FIG. 16 schematically illustrates a method for displaying image data on the display portion 230.

The program of one embodiment of the present invention has the following steps (see FIG. 15A).

In a first step, setting is initialized (see (S1) in FIG. 15A).

For instance, predetermined image data and the second mode can be used for the initialization.

For example, a still image can be used as the predetermined image data. Alternatively, a mode in which the selection signal is supplied at a frequency of lower than 30 Hz, preferably lower than 1 Hz, more preferably less than once per minute can be used as the second mode.

In a second step, interrupt processing is allowed (see S2 in FIG. 15A). Note that an arithmetic device allowed to execute the interrupt processing can perform the interrupt processing in parallel with the main processing. The arithmetic device which has returned from the interrupt processing to the main processing can reflect the results of the interrupt processing in the main processing.

The arithmetic device may execute the interrupt processing when a counter has an initial value, and the counter may be set at a value other than the initial value when the arithmetic device returns from the interrupt processing. Thus, the interrupt processing is ready to be executed after the program is started up.

In a third step, image data is displayed in a mode selected in the first step or the interrupt processing (see S3 in FIG. 15A).

For instance, predetermined image data is displayed in the second mode, in accordance with the initialization.

Specifically, the predetermined image data is displayed in a mode in which the selection signal is supplied to one scan line at a frequency of lower than 30 Hz, preferably lower than 1 Hz, more preferably less than once per minute.

For example, the selection signal is supplied at Time T1 so that first image data PIC1 is displayed on the display portion 230 (see FIG. 16). At Time T2, which is, for example, one second after Time T1, the selection signal is supplied so that the predetermined image data is displayed.

Alternatively, in the case where a predetermined event is not supplied in the interrupt processing, image data is displayed in the second mode.

For example, the selection signal is supplied at Time T5 so that fourth image data PIC4 is displayed on the display portion 230. At Time T6, which is, for example, one second after Time T5, the selection signal is supplied so that the same image data is displayed. Note that the length of a period from Time T5 to Time T6 can be equal to that of a period from Time T1 to Time T2.

For instance, in the case where the predetermined event is supplied in the interrupt processing, predetermined image data is displayed in the first mode.

Specifically, in the case where an event associated with a "page turning instruction" is supplied in the interrupt processing, image data is switched from one to another in a mode in which the selection signal is supplied to one scan line at a frequency of 30 Hz or higher, preferably 60 Hz or higher.

Alternatively, in the case where an event associated with the "scrolling instruction" is supplied in the interrupt processing, second image data PIC2, which includes part of the displayed first image data PIC1 and the following part, is displayed in a mode in which the selection signal is supplied to one scan line at a frequency of 30 Hz or higher, preferably 60 Hz or higher.

Thus, a moving image can be displayed smoothly by switching images in accordance with the "page tuning instruction," for example. Alternatively, a moving image in which an image is gradually moved in accordance with the "scrolling instruction" can be displayed smoothly.

Specifically, the selection signal is supplied at Time T3 after the event associated with the "scrolling instruction" is supplied so that the second image data PIC2 whose display position and the like are changed from those of the first image data PIC1 is displayed (see FIG. 16). The selection signal is supplied at Time T4 so that third image data PIC3 whose display position and the like are changed from those of the second image data PIC2 is displayed. Note that each of a period from Time T2 to Time T3, a period from Time T3 to Time T4, and a period from Time T4 to Time T5 is shorter than the period from Time T1 to Time T2.

In the fourth step, the program moves to the fifth step when a termination instruction is supplied, and the program moves to the third step when the termination instruction is not supplied (see S4 in FIG. 15A).

Note that in the interrupt processing, for example, the termination instruction can be supplied.

In the fifth step, the program terminates (see S5 in FIG. 15A).

The interrupt processing includes sixth to ninth steps described below (see FIG. 15B).

In the sixth step, the processing proceeds to the seventh step when a predetermined event has been supplied, whereas the processing proceeds to the eighth step when the predetermined event has not been supplied (see S6 in FIG. 15B).

For example, whether the predetermined event is supplied in a predetermined period or not can be a branch condition. Specifically, the predetermined period can be longer than 0 seconds and shorter than or equal to 5 seconds, preferably shorter than or equal to 1 second, further preferably shorter than or equal to 0.5 seconds, still further preferably shorter than or equal to 0.1 seconds.

For example, the predetermined event can include an event associated with the termination instruction.

In the seventh step, the mode is changed (see S7 in FIG. 15B). Specifically, the mode is changed to the second mode when the first mode has been selected, or the mode is changed to the first mode when the second mode has been selected.

In the eighth step, the interrupt processing terminates (see S8 in FIG. 15B).

<<Predetermined Event>>

A variety of instructions can be associated with a variety of events.

The following instructions can be given as examples: "page-turning instruction" for switching displayed image data from one to another and "scroll instruction" for moving the display position of part of image data and displaying another part continuing from that part.

For example, the following events can be used: events supplied using a pointing device such as a mouse (e.g., "click" and "drag") and events supplied to a touch panel with a finger or the like used as a pointer (e.g., "tap", "drag", and "swipe").

For example, the position of a slide bar pointed by a pointer, the swipe speed, and the drag speed can be used as arguments assigned to an instruction associated with the predetermined event.

Specifically, a parameter that determines the page-turning speed or the like can be used to execute the "page-turning instruction," and a parameter that determines the moving speed of the display position or the like can be used to execute the "scroll instruction."

For example, the display brightness, contrast, or saturation may be changed in accordance with the page-turning speed and/or the scroll speed.

Specifically, in the case where the page-turning speed and/or the scroll speed are/is higher than the predetermined speed, the display brightness may be decreased in synchronization with the speed.

Alternatively, in the case where the page-turning speed and/or the scroll speed are/is higher than the predetermined speed, the contrast may be decreased in synchronization with the speed.

For example, the speed at which user's eyes cannot follow displayed images can be used as the predetermined speed.

The contrast can be reduced in such a manner that the gray level of a bright region (with a high gray level) included in image data is brought close to the gray level of a dark region (with a low gray level) included in the image data.

Alternatively, the contrast can be reduced in such a manner that the gray level of the dark region included in image data is brought close to the gray level of the bright region included in the image data.

Specifically, in the case where the page-turning speed and/or the scroll speed are/is higher than the predetermined speed, display may be performed such that the yellow tone is increased or the blue tone is decreased in synchronization with the speed.

This embodiment can be combined with any of the other embodiments in this specification as appropriate.

Embodiment 6

In this embodiment, a semiconductor device (memory device) that can retain stored data even when not powered and that has an unlimited number of write cycles, and a CPU including the semiconductor device will be described. The CPU described in this embodiment can be used for the data processor described in Embodiment 5, for example.

<Memory Device>

Figure 17A:
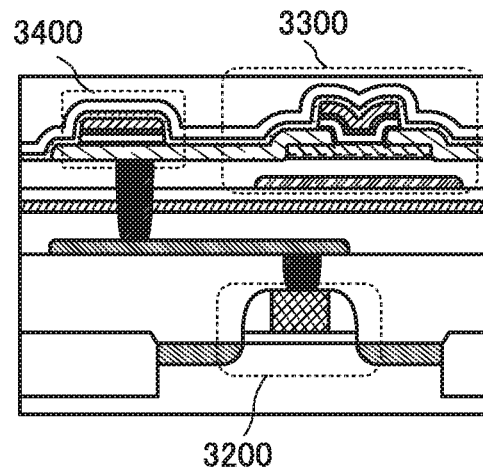
FIG. 17A is a cross-sectional view and FIGS. 17B and 17C are circuit diagrams each illustrating the structure of a semiconductor device of one embodiment.
Figure 17B:
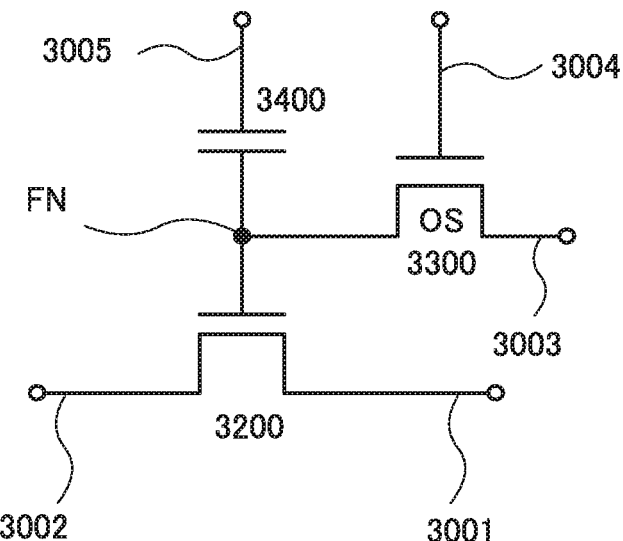
Figure 17C:
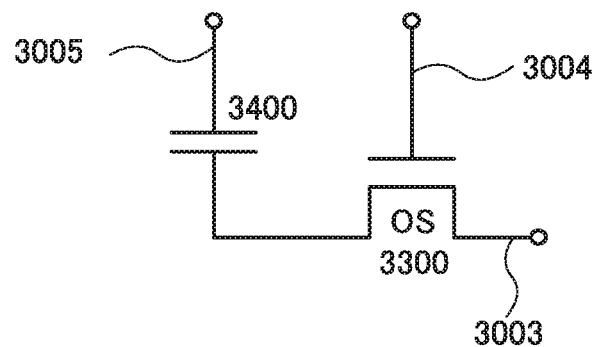

An example of a semiconductor device (memory device) which can retain stored data even when not powered and which has an unlimited number of write cycles is shown in FIGS. 17A to 17C. Note that FIG. 17B is a circuit diagram of the structure in FIG. 17A.

The semiconductor device illustrated in FIGS. 17A and 17B includes a transistor 3200 using a first semiconductor material, a transistor 3300 using a second semiconductor material, and a capacitor 3400.

The first and second semiconductor materials preferably have different energy gaps. For example, the first semiconductor material can be a semiconductor material other than an oxide semiconductor (examples of such a semiconductor material include silicon (including strained silicon), germanium, silicon germanium, silicon carbide, gallium arsenide, aluminum gallium arsenide, indium phosphide, gallium nitride, and an organic semiconductor), and the second semiconductor material can be an oxide semiconductor. A transistor using a material other than an oxide semiconductor, such as single crystal silicon, can operate at high speed easily. On the other hand, a transistor including an oxide semiconductor has a low off-state current.

The transistor 3300 is a transistor in which a channel is formed in a semiconductor layer including an oxide semiconductor. Since the off-state current of the transistor 3300 is small, stored data can be retained for a long period. In other words, power consumption can be sufficiently reduced because a semiconductor memory device in which refresh operation is unnecessary or the frequency of refresh operation is extremely low can be provided.

In FIG. 17B, a first wiring 3001 is electrically connected to a source electrode of the transistor 3200. A second wiring 3002 is electrically connected to a drain electrode of the transistor 3200. A third wiring 3003 is electrically connected to one of a source electrode and a drain electrode of the transistor 3300. A fourth wiring 3004 is electrically connected to a gate electrode of the transistor 3300. A gate electrode of the transistor 3200 and the other of the source electrode and the drain electrode of the transistor 3300 are electrically connected to one electrode of the capacitor 3400. A fifth wiring 3005 is electrically connected to the other electrode of the capacitor 3400.

The semiconductor device in FIG. 17A has a feature that the potential of the gate electrode of the transistor 3200 can be retained, and thus enables writing, retaining, and reading of data as follows.

Writing and retaining of data are described. First, the potential of the fourth wiring 3004 is set to a potential at which the transistor 3300 is turned on, so that the transistor 3300 is turned on. Accordingly, the potential of the third wiring 3003 is supplied to the gate electrode of the transistor 3200 and the capacitor 3400. That is, a predetermined charge is supplied to the gate electrode of the transistor 3200 (writing). Here, one of two kinds of charges providing different potential levels (hereinafter referred to as a low-level charge and a high-level charge) is supplied. After that, the potential of the fourth wiring 3004 is set to a potential at which the transistor 3300 is turned off, so that the transistor 3300 is turned off. Thus, the charge supplied to the gate electrode of the transistor 3200 is held (retaining).

Since the off-state current of the transistor 3300 is extremely small, the charge of the gate electrode of the transistor 3200 is retained for a long time.

Next, reading of data is described. An appropriate potential (a reading potential) is supplied to the fifth wiring 3005 while a predetermined potential (a constant potential) is supplied to the first wiring 3001, whereby the potential of the second wiring 3002 varies depending on the amount of charge retained in the gate electrode of the transistor 3200. This is because in the case of using an n-channel transistor as the transistor 3200, an apparent threshold voltage $V_{th\_H}$ at the time when the high-level charge is given to the gate electrode of the transistor 3200 is lower than an apparent threshold voltage $V_{th\_L}$ at the time when the low-level charge is given to the gate electrode of the transistor 3200. Here, an apparent threshold voltage refers to the potential of the fifth wiring 3005 which is needed to turn on the transistor 3200. Thus, the potential of the fifth wiring 3005 is set to a potential $V_0$ which is between $V_{th\_H}$ and $V_{th\_L}$, whereby charge supplied to the gate electrode of the transistor 3200 can be determined. For example, in the case where the high-level charge is supplied to the gate electrode of the transistor 3200 in writing and the potential of the fifth wiring 3005 is $V_0(>V_{th\_H})$, the transistor 3200 is turned on. On the other hand, in the case where the low-level charge is supplied to the gate electrode of the transistor 3200 in writing, even when the potential of the fifth wiring 3005 is $V_0$ ($<V_{th\_L}$), the transistor 3200 remains off. Thus, the data retained in the gate electrode of the transistor 3200 can be read by determining the potential of the second wiring 3002.

Note that in the case where memory cells are arrayed, it is necessary that data of a desired memory cell is read. For example, the fifth wiring 3005 of memory cells from which data is not read may be supplied with a potential at which the transistor 3200 is turned off regardless of the potential supplied to the gate electrode, that is, a potential lower than $V_{th\_H}$, whereby only data of a desired memory cell can be read. Alternatively, the fifth wiring 3005 of the memory cells from which data is not read may be supplied with a potential at which the transistor 3200 is turned on regardless of the potential supplied to the gate electrode, that is, a potential higher than $V_{th\_L}$, whereby only data of a desired memory cell can be read.

The semiconductor device illustrated in FIG. 17C is different from the semiconductor device illustrated in FIG. 17A in that the transistor 3200 is not provided. Also in this case, writing and retaining operation of data can be performed in a manner similar to the semiconductor device illustrated in FIG. 17A.

Next, reading of data of the semiconductor device illustrated in FIG. 17C is described. When the transistor 3300 is turned on, the third wiring 3003 which is in a floating state and the capacitor 3400 are electrically connected to each other, and the charge is redistributed between the third wiring 3003 and the capacitor 3400. As a result, the potential of the third wiring 3003 is changed. The amount of change in the potential of the third wiring 3003 varies depending on the potential of the one electrode of the capacitor 3400 (or the charge accumulated in the capacitor 3400).

For example, the potential of the third wiring 3003 after the charge redistribution is $(C_B \times V_{B0} + C \times V)/(C_B + C)$, where V is the potential of the one electrode of the capacitor 3400, C is the capacitance of the capacitor 3400, $C_B$ is the capacitance component of the third wiring 3003, and $V_{B0}$ is the potential of the third wiring 3003 before the charge redistribution. Thus, it can be found that, assuming that the memory cell is in either of two states in which the potential of the one electrode of the capacitor 3400 is $V_1$ and $V_0$ ($V_1 > V_0$), the potential of the third wiring 3003 in the case of retaining the potential $V_1$ ($=(C_B \times V_{B0} + C \times V_1)/(C_B + C)$) is higher than the potential of the third wiring 3003 in the case of retaining the potential $V_0$ ($=(C_B \times V_{B0} + C \times V_0)/(C_B + C)$).

Then, by comparing the potential of the third wiring 3003 with a predetermined potential, data can be read.

In this case, a transistor including the first semiconductor material may be used for a driver circuit for driving a memory cell, and a transistor including the second semiconductor material may be stacked over the driver circuit as the transistor 3300.

When including a transistor in which a channel formation region is formed using an oxide semiconductor and which has an extremely small off-state current, the semiconductor device described in this embodiment can retain stored data for an extremely long time. In other words, refresh operation becomes unnecessary or the frequency of the refresh operation can be extremely low, which leads to a sufficient reduction in power consumption. Moreover, stored data can be retained for a long time even when power is not supplied (note that a potential is preferably fixed).

Furthermore, in the semiconductor device described in this embodiment, high voltage is not needed for writing data and there is no problem of deterioration of elements. Unlike in a conventional nonvolatile memory, for example, it is not necessary to inject and extract electrons into and from a floating gate; thus, a problem such as deterioration of a gate insulating film is not caused. That is, the semiconductor device described in this embodiment does not have a limit on the number of times data can be rewritten, which is a problem of a conventional nonvolatile memory, and the reliability thereof is drastically improved. Furthermore, data is written depending on the state of the transistor (on or off), whereby high-speed operation can be easily achieved.

The above memory device can also be used in an LSI such as a digital signal processor (DSP), a custom LSI, or a programmable logic device (PLD), and a radio frequency identification (RF-ID), in addition to a central processing unit (CPU), for example.

<CPU>

A CPU including the above memory device is described below.

Figure 18:
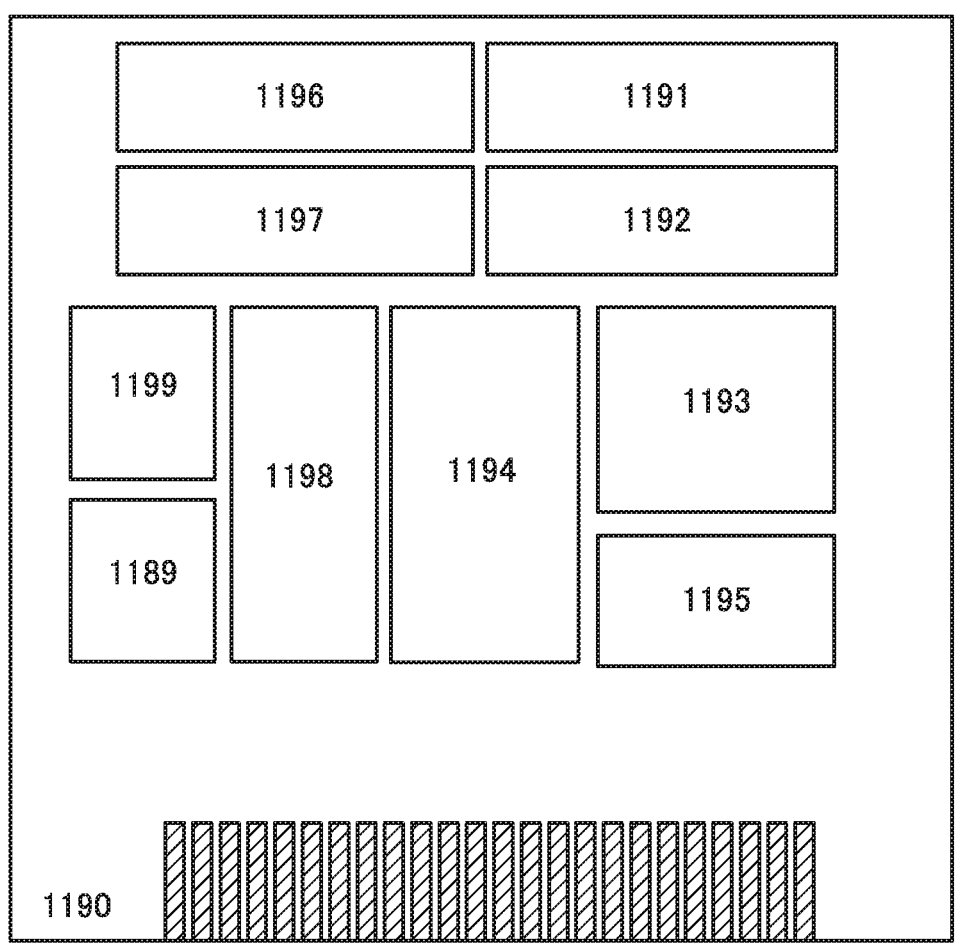
FIG. 18 is a block diagram illustrating the structure of a CPU of one embodiment.

FIG. 18 is a block diagram illustrating a configuration example of the CPU including the above memory device.

The CPU illustrated in FIG. 18 includes, over a substrate 1190, an arithmetic logic unit (ALU) 1191, an ALU controller 1192, an instruction decoder 1193, an interrupt controller 1194, a timing controller 1195, a register 1196, a register controller 1197, a bus interface (BUS I/F) 1198, a rewritable ROM 1199, and a ROM interface (ROM I/F) 1189. A semiconductor substrate, an SOI substrate, a glass substrate, or the like is used as the substrate 1190. The ROM 1199 and the ROM interface 1189 may be provided over a separate chip. Needless to say, the CPU in FIG. 18 is just an example in which the configuration is simplified, and an actual CPU may have a variety of configurations depending on the application. For example, the CPU may have the following configuration: a structure including the CPU illustrated in FIG. 18 or an arithmetic circuit is considered as one core; a plurality of the cores are included; and the cores operate in parallel. The number of bits that the CPU can process in an internal arithmetic circuit or in a data bus can be, for example, 8, 16, 32, or 64.

An instruction that is input to the CPU through the bus interface 1198 is input to the instruction decoder 1193 and decoded therein, and then, input to the ALU controller 1192, the interrupt controller 1194, the register controller 1197, and the timing controller 1195.

The ALU controller 1192, the interrupt controller 1194, the register controller 1197, and the timing controller 1195 conduct various controls in accordance with the decoded instruction. Specifically, the ALU controller 1192 generates signals for controlling the operation of the ALU 1191. While the CPU is executing a program, the interrupt controller 1194 processes an interrupt request from an external input/output device or a peripheral circuit depending on its priority or a mask state. The register controller 1197 generates an address of the register 1196, and reads/writes data from/to the register 1196 depending on the state of the CPU.

The timing controller 1195 generates signals for controlling operation timings of the ALU 1191, the ALU controller 1192, the instruction decoder 1193, the interrupt controller 1194, and the register controller 1197. For example, the timing controller 1195 includes an internal clock generator for generating an internal clock signal CLK2 on the basis of a reference clock signal CLK1, and supplies the internal clock signal CLK2 to the above circuits.

In the CPU illustrated in FIG. 18, a memory cell is provided in the register 1196.

In the CPU illustrated in FIG. 18, the register controller 1197 selects operation of retaining data in the register 1196 in accordance with an instruction from the ALU 1191. That is, the register controller 1197 selects whether data is retained by a flip-flop or by a capacitor in the memory cell included in the register 1196. When data retaining by the flip-flop is selected, a power supply voltage is supplied to the memory cell in the register 1196. When data retaining by the capacitor is selected, the data is rewritten in the capacitor, and supply of the power supply voltage to the memory cell in the register 1196 can be stopped.

Figure 19:
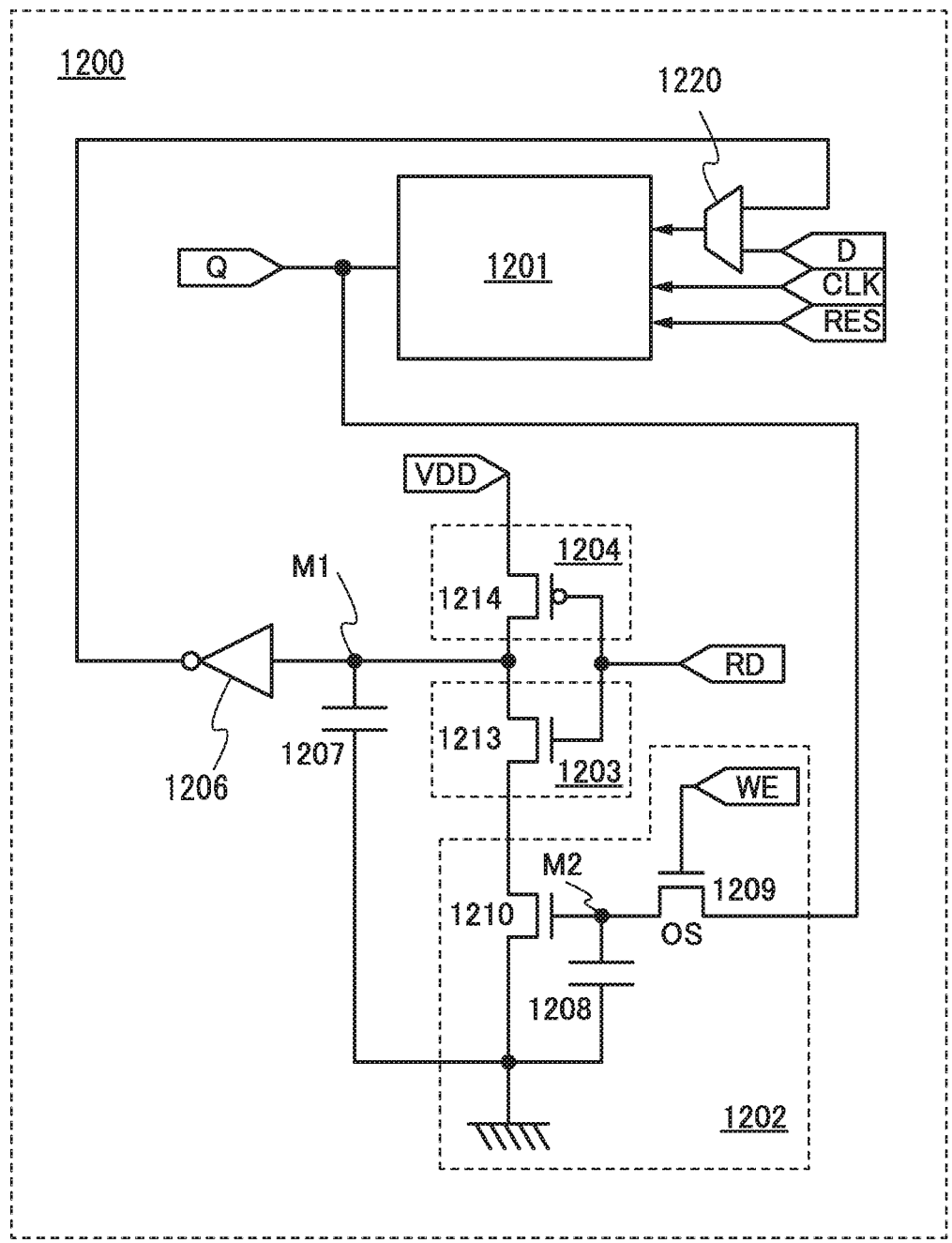
FIG. 19 is a circuit diagram illustrating the structure of a memory element of one embodiment.

FIG. 19 is an example of a circuit diagram of a memory element that can be used for the register 1196. A memory element 1200 includes a circuit 1201 in which stored data is volatile when power supply is stopped, a circuit 1202 in which stored data is nonvolatile even when power supply is stopped, a switch 1203, a switch 1204, a logic element 1206, a capacitor 1207, and a circuit 1220 having a selecting function. The circuit 1202 includes a capacitor 1208, a transistor 1209, and a transistor 1210. Note that the memory element 1200 may further include another element such as a diode, a resistor, or an inductor, as needed.

Here, the above-described memory device can be used as the circuit 1202. When supply of a power supply voltage to the memory element 1200 is stopped, a ground potential (0 V) or a potential at which the transistor 1209 in the circuit 1202 is turned off continues to be input to a gate of the transistor 1209. For example, the gate of the transistor 1209 is grounded through a load such as a resistor.

Shown here is an example in which the switch 1203 is a transistor 1213 having one conductivity type (e.g., an n-channel transistor) and the switch 1204 is a transistor 1214 having a conductivity type opposite to the one conductivity type (e.g., a p-channel transistor). A first terminal of the switch 1203 corresponds to one of a source and a drain of the transistor 1213, a second terminal of the switch 1203 corresponds to the other of the source and the drain of the transistor 1213, and conduction or non-conduction between the first terminal and the second terminal of the switch 1203 (i.e., the on/off state of the transistor 1213) is selected by a control signal RD input to a gate of the transistor 1213. A first terminal of the switch 1204 corresponds to one of a source and a drain of the transistor 1214, a second terminal of the switch 1204 corresponds to the other of the source and the drain of the transistor 1214, and conduction or non-conduction between the first terminal and the second terminal of the switch 1204 (i.e., the on/off state of the transistor 1214) is selected by the control signal RD input to a gate of the transistor 1214.

One of a source and a drain of the transistor 1209 is electrically connected to one of a pair of electrodes of the capacitor 1208 and a gate of the transistor 1210. Here, the connection portion is referred to as a node M2. One of a source and a drain of the transistor 1210 is electrically connected to a wiring that can supply a low power supply potential (e.g., a GND line), and the other thereof is electrically connected to the first terminal of the switch 1203 (the one of the source and the drain of the transistor 1213). The second terminal of the switch 1203 (the other of the source and the drain of the transistor 1213) is electrically connected to the first terminal of the switch 1204 (the one of the source and the drain of the transistor 1214). The second terminal of the switch 1204 (the other of the source and the drain of the transistor 1214) is electrically connected to a wiring that can supply a power supply potential VDD. The second terminal of the switch 1203 (the other of the source and the drain of the transistor 1213), the first terminal of the switch 1204 (the one of the source and the drain of the transistor 1214), an input terminal of the logic element 1206, and one of a pair of electrodes of the capacitor 1207 are electrically connected to each other. Here, the connection portion is referred to as a node M1. The other of the pair of electrodes of the capacitor 1207 can be supplied with a constant potential. For example, the other of the pair of electrodes of the capacitor 1207 can be supplied with a low power supply potential (e.g., GND) or a high power supply potential (e.g., VDD). The other of the pair of electrodes of the capacitor 1207 is electrically connected to the wiring that can supply a low power supply potential (e.g., a GND line). The other of the pair of electrodes of the capacitor 1208 can be supplied with a constant potential. For example, the other of the pair of electrodes of the capacitor 1208 can be supplied with a low power supply potential (e.g., GND) or a high power supply potential (e.g., VDD). The other of the pair of electrodes of the capacitor 1208 is electrically connected to the wiring that can supply a low power supply potential (e.g., a GND line).

The capacitor 1207 and the capacitor 1208 are not necessarily provided as long as the parasitic capacitance of the transistor, the wiring, or the like is actively utilized.

A control signal WE is input to the first gate (first gate electrode) of the transistor 1209. As for each of the switch 1203 and the switch 1204, a conduction state or a non-conduction state between the first terminal and the second terminal is selected by the control signal RD that is different from the control signal WE. When the first terminal and the second terminal of one of the switches are in the conduction state, the first terminal and the second terminal of the other of the switches are in the non-conduction state.

A signal corresponding to data retained in the circuit 1201 is input to the other of the source and the drain of the transistor 1209. FIG. 19 illustrates an example in which a signal output from the circuit 1201 is input to the other of the source and the drain of the transistor 1209. The logic value of a signal output from the second terminal of the switch 1203 (the other of the source and the drain of the transistor 1213) is inverted by the logic element 1206, and the inverted signal is input to the circuit 1201 through the circuit 1220.

In the example of FIG. 19, a signal output from the second terminal of the switch 1203 (the other of the source and the drain of the transistor 1213) is input to the circuit 1201 through the logic element 1206 and the circuit 1220; however, one embodiment of the present invention is not limited thereto. The signal output from the second terminal of the switch 1203 (the other of the source and the drain of the transistor 1213) may be input to the circuit 1201 without its logic value being inverted. For example, in the case where the circuit 1201 includes a node in which a signal obtained by inversion of the logic value of a signal input from the input terminal is retained, the signal output from the second terminal of the switch 1203 (the other of the source and the drain of the transistor 1213) can be input to the node.

In FIG. 19, the transistors included in the memory element 1200 except for the transistor 1209 can each be a transistor in which a channel is formed in a layer formed using a semiconductor other than an oxide semiconductor or in the substrate 1190. For example, the transistor can be a transistor whose channel is formed in a silicon layer or a silicon substrate. Alternatively, a transistor in which a channel is formed in an oxide semiconductor film can be used for all the transistors in the memory element 1200. Further alternatively, in the memory element 1200, a transistor in which a channel is formed in an oxide semiconductor film can be included besides the transistor 1209, and a transistor in which a channel is formed in a layer formed using a semiconductor other than an oxide semiconductor or in the substrate 1190 can be used for the rest of the transistors.

As the circuit 1201 in FIG. 19, for example, a flip-flop circuit can be used. As the logic element 1206, for example, an inverter or a clocked inverter can be used.

In a period during which the memory element 1200 is not supplied with the power supply voltage, the semiconductor device described in this embodiment can retain data stored in the circuit 1201 by the capacitor 1208 that is provided in the circuit 1202.

The off-state current of a transistor in which a channel is formed in an oxide semiconductor film is extremely small. For example, the off-state current of a transistor in which a channel is formed in an oxide semiconductor film is significantly smaller than that of a transistor in which a channel is formed in silicon having crystallinity. Thus, when the transistor in which a channel is formed in an oxide semiconductor film is used as the transistor 1209, a signal is retained in the capacitor 1208 for a long time also in a period during which the power supply voltage is not supplied to the memory element 1200. The memory element 1200 can accordingly retain the stored content (data) also in a period during which the supply of the power supply voltage is stopped.

Since the memory element performs pre-charge operation with the switch 1203 and the switch 1204, the time required for the circuit 1201 to retain original data again after the supply of the power supply voltage is restarted can be shortened.

In the circuit 1202, a signal retained by the capacitor 1208 is input to the gate of the transistor 1210. Thus, after supply of the power supply voltage to the memory element 1200 is restarted, the signal retained by the capacitor 1208 can be converted into the one corresponding to the state (the on state or the off state) of the transistor 1210 to be read from the circuit 1202. Consequently, an original signal can be accurately read even when a potential corresponding to the signal retained by the capacitor 1208 changes to some degree.

By using the above-described memory element 1200 in a memory device such as a register or a cache memory included in a processor, data in the memory device can be prevented from being lost owing to the stop of the supply of the power supply voltage. Furthermore, shortly after the supply of the power supply voltage is restarted, the memory device can be returned to the same state as that before the power supply is stopped. Thus, the power supply can be stopped even for a short time in the processor or one or a plurality of logic circuits included in the processor, resulting in lower power consumption.

Although the memory element 1200 is used in a CPU in this embodiment, the memory element 1200 can also be used in an LSI such as a digital signal processor (DSP), a custom LSI, or a programmable logic device (PLD), and a radio frequency identification (RF-ID).

At least part of this embodiment can be implemented in combination with any of the other embodiments described in this specification as appropriate.

Embodiment 7

In this embodiment, a display module and electronic devices which include a reflective display device of one embodiment of the present invention will be described with reference to FIGS. 20A to 20H.

FIGS. 20A to 20G illustrate electronic devices. These electronic devices can include a housing 5000, a display portion 5001, a speaker 5003, an LED lamp 5004, operation keys 5005 (including a power switch and an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 20A:
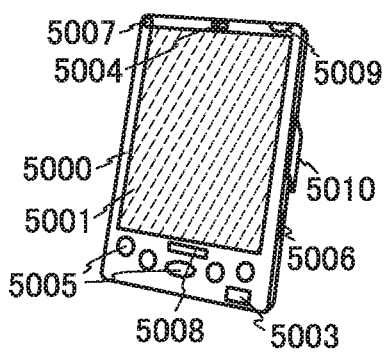
FIGS. 20A to 20H each illustrate the structure of an electronic device of one embodiment.
Figure 20B:
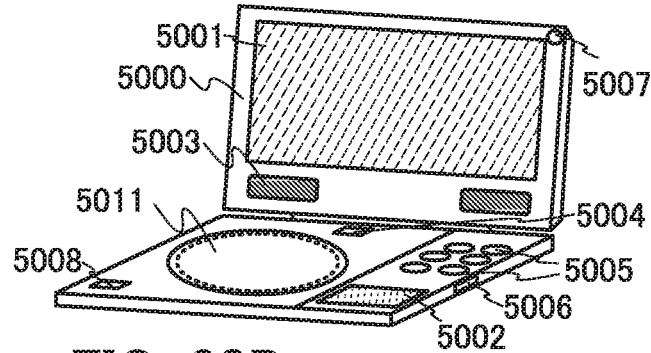
Figure 20C:
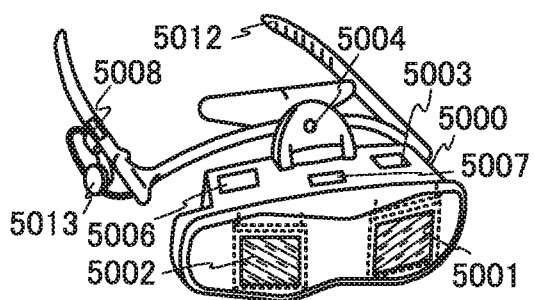
Figure 20D:
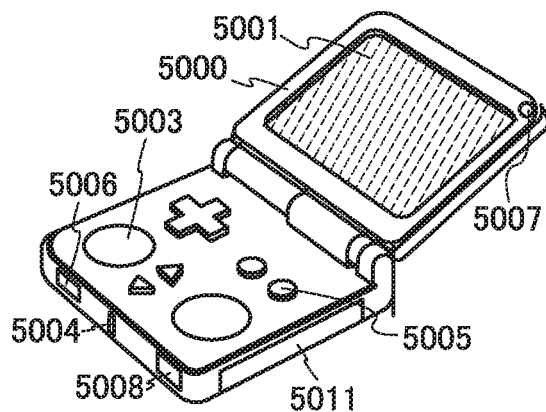
Figure 20E:
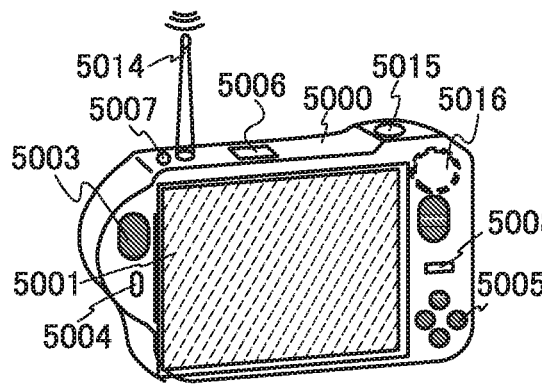
Figure 20F:
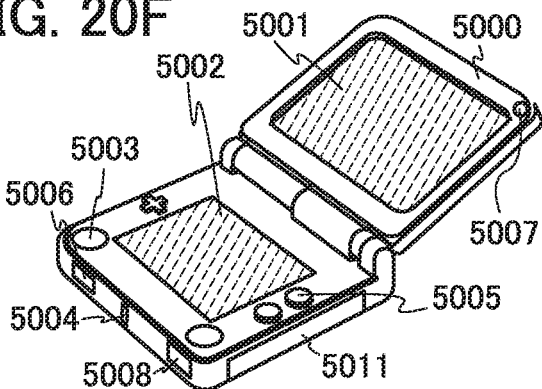
Figure 20G:
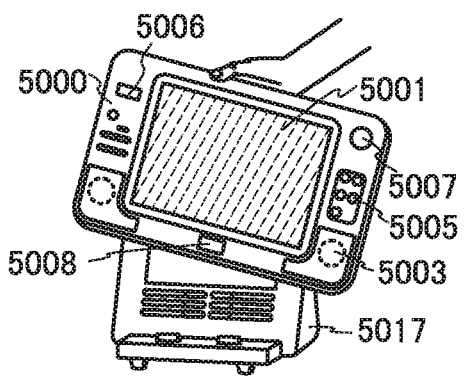

FIG. 20A illustrates a mobile computer which can include a switch 5009, an infrared port 5010, and the like in addition to the above components. FIG. 20B illustrates a portable image reproducing device (e.g., a DVD reproducing device) provided with a recording medium, and the portable image reproducing device can include a second display portion 5002, a recording medium reading portion 5011, and the like in addition to the above components. FIG. 20C illustrates a goggle-type display which can include the second display portion 5002, a support portion 5012, an earphone 5013, and the like in addition to the above components. FIG. 20D illustrates a portable game console which can include the recording medium reading portion 5011 and the like in addition to the above components. FIG. 20E illustrates a digital camera with a television reception function, and the digital camera can include an antenna 5014, a shutter button 5015, an image receiving portion 5016, and the like in addition to the above components. FIG. 20F illustrates a portable game console which can include the second display portion 5002, the recording medium reading portion 5011, and the like in addition to the above components. FIG. 20G illustrates a portable television receiver which can include a charger 5017 capable of transmitting and receiving signals, and the like in addition to the above components.

The electronic devices in FIGS. 20A to 20G can have a variety of functions such as a function of displaying a variety of information (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image information mainly on one display portion while displaying text information mainly on another display portion, a function of displaying a three-dimensional image by displaying images on a plurality of display portions with a parallax taken into account, or the like. Furthermore, the electronic device including an image receiving portion can have a function of shooting a still image, a function of taking moving images, a function of automatically or manually correcting a shot image, a function of storing a shot image in a recording medium (an external recording medium or a recording medium incorporated in the camera), a function of displaying a shot image on the display portion, or the like. Note that functions of the electronic devices in FIGS. 20A to 20G are not limited thereto, and the electronic devices can have a variety of functions.

Figure 20H:
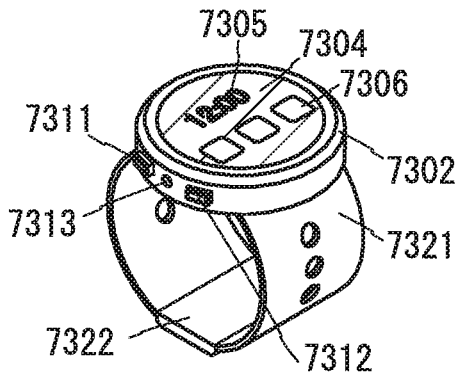

FIG. 20H illustrates a smart watch, which includes a housing 7302, a display panel 7304, operation buttons 7311 and 7312, a connection terminal 7313, a band 7321, a clasp 7322, and the like.

The display panel 7304 mounted in the housing 7302 serving as a bezel includes a non-rectangular display region. The display panel 7304 may have a rectangular display region. The display panel 7304 can display an icon 7305 indicating time, another icon 7306, and the like.

The smart watch in FIG. 20H can have a variety of functions such as a function of displaying a variety of information (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion.

The 7304 7302 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the smart watch can be manufactured using the light-emitting element for the display panel 7304.

This embodiment can be combined with any of the other embodiments in this specification as appropriate.

Embodiment 8

In this embodiment, the structure of a data processor of one embodiment of the present invention will be described with reference to FIGS. 21A and 21B.

Figure 21A:
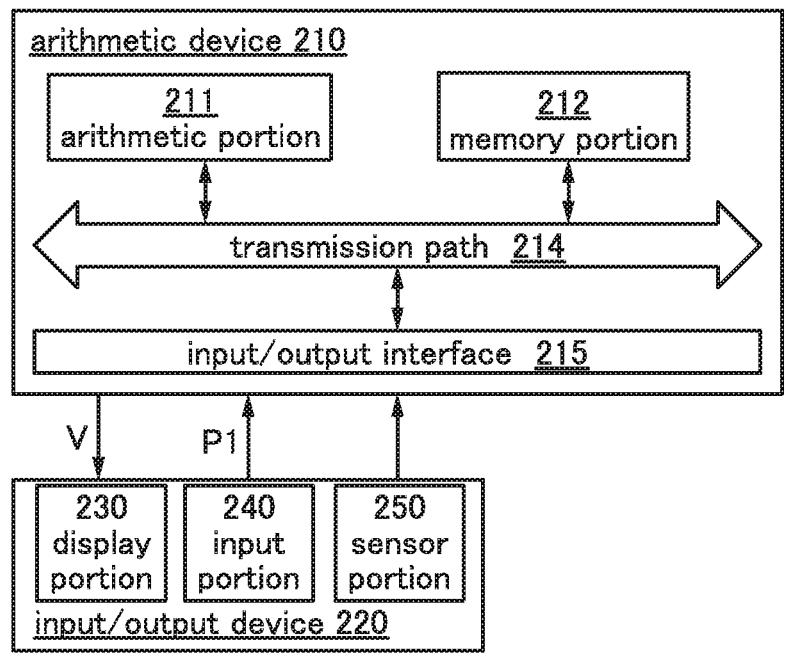
FIGS. 21A and 21B illustrate the structure of a data processor of one embodiment.
Figure 21B:
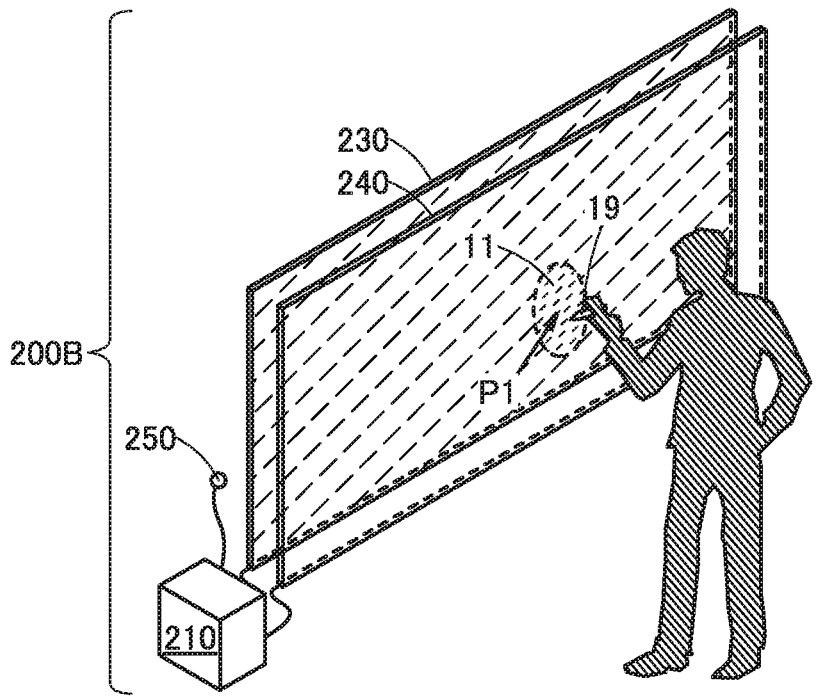

FIGS. 21A and 21B illustrate the structure of a data processor 200B of one embodiment of the present invention. FIG. 21A is a block diagram illustrating the structure of the data processor 200B, which is one embodiment of the present invention. FIG. 21B is a schematic view illustrating the data processor 200B being in operation.

<Structure Example of Data Processor>

The data processor 200B, which is described in this embodiment, includes an arithmetic device 210 which receives a positional data P1 and supplies an image data V and an input/output device 220 which supplies the positional data P1 and receives the image data V (see FIG. 21A).

The input/output device 220 includes the display portion 230 that displays the image data V and an input portion 240 that supplies the positional data P1.

The input portion 240 is configured to detect the position of a pointer 19 which approaches a region overlapping with the display portion 230 and to determine the positional data P1 in accordance with the detected position of the pointer 19 (see FIG. 21B).

The arithmetic device 210 is configured to determine a first region 11 in accordance with the positional data P1 and to generate the image data V that luminance of the first region 11 is lower than that of the other region.

In addition, the arithmetic device 210 determines that the first region 11 should have a circular shape in accordance with the positional data P1.

The data processor 200B, which is described in this embodiment, includes the input portion 240 having a function of supplying the positional data P1 of the pointer 19, the arithmetic device 210 which determines the first region 11 in accordance with the positional data P1 of the pointer 19 and generates the image data V whose luminance is reduced in the first region 11, and the display portion 230 which displays the image data V. Thus, an image with reduced luminance can be displayed in the region the pointer approaches. Thus, the novel data processing device can be highly convenient or reliable.

For example, in the case where the data processor 200B is used for education, a digital signage, a smart television system, or the like, the luminance of a displayed image is high so that the image can be seen from a separated place but it might be too high for an operator near the display portion 230.

An operator of the data processor 200B using the pointer 19 watches the portion pointed using the pointer. When the luminance of an image displayed in the portion is lower than the luminance in the other portion, glare can be reduced, which leads to providing the operator with a comfortable operation.

Note that the neighborhood of the pointed portion is sometimes hidden by the shadow of the operator standing between the data processor 200B and the viewer of the data processor 200B, in which case a feeling of strangeness of the viewer of the data processor 200B can be reduced.

The data processor 200B includes a sensor portion 250.

Components of the data processor 200B will be described below. Note that these units cannot be clearly distinguished and one unit also serves as another unit or include part of another unit in some cases.

For example, the display portion 230 with which the input portion 240 overlaps serves as both the input portion 240 and the display portion 230.

<<Structure Example>>

The data processor 200B includes the arithmetic device 210, the input/output device 220, the display portion 230, the sensor portion 250, and the input portion 240.

<<Arithmetic Device 210>>

The arithmetic device 210 includes an arithmetic portion 211 and a memory portion 212. The arithmetic device 210 further includes a transmission path 214 and an input/output interface 215.

<<Arithmetic Portion 211>>

The arithmetic portion 211 is configured to, for example, execute a program.

<<Memory Portion 212>>

The memory portion 212 is configured to, for example, store the program executed by the arithmetic portion 211, initial information, setting information, an image, or the like.

Specifically, a hard disk, a flash memory, a memory including a transistor including an oxide semiconductor, or the like can be used.

<<Program>>

For example, a program which can be used in this embodiment includes the first step for obtaining the positional data P1, the second step for determining the first region 11 in accordance with the positional data P1, and the third step for generating the image data V for a region whose luminance in the first region 11 is lower than luminance in the other region.

The arithmetic device 210 determines that the first region 11 should have a circular shape in accordance with the positional data P1. For example, the first region 11 containing the positional data P1 is within a radius of 60 cm or less, preferably 30 cm or less and 5 cm or more.

Note that the maximum luminance of an image displayed in the first region is suppressed to be 90% or less, preferably 80% or less and 10% or more the maximum luminance of the image displayed in the other region. The average luminance of an image displayed in the first region is suppressed to be 90% or less, preferably 80% or less and 10% or more the average luminance of the image displayed in the other region.

The data processor 200B which performs the program described in this embodiment can generate the image data V for a region whose luminance in the first region 11 is lower than luminance in the other region in accordance with the positional data P1. Thus, a novel program that is highly convenient and reliable can be provided.

<<Input/Output Interface 215 and Transmission Path 214>>

The input/output interface 215 includes a terminal or a wiring and is configured to supply and receive information. For example, the input/output interface 215 can be electrically connected to the transmission path 214 and the input/output device 220.

The transmission path 214 includes a wiring and is configured to supply and receive information. For example, the transmission path 214 can be electrically connected to the input/output interface 215. In addition, the transmission path 214 can be electrically connected to the arithmetic portion 211 or the memory portion 212.

<<Input/Output Device 220>>

The input/output device 220 includes the display portion 230 or the input portion 240.

For example, the input/output device 220 includes the display portion 230 and the input portion 240 having a region overlapping with the display portion 230. A touch panel or the like can be used for the input/output device 220. Specifically, the touch panel described in Embodiment 1 can be used for the input/output device 220.

<<Display Portion 230>>

The display portion 230 includes the above-mentioned display panel.

For example, a display panel including display elements arranged in matrix can be used.

A display panel can include a selection line electrically connected to display elements arranged in a row direction and a signal line electrically connected to display elements arranged in a column direction intersecting with the row direction.

The display elements of the display panel may be driven by a passive matrix method or an active matrix method.

Specifically, an organic electroluminescent element is used as the light-emitting element in this embodiment, a display element (electronic ink) that performs display by an electrophoretic method, an electronic liquid powder (registered trademark) method, an electrowetting method, or the like can be used.

Alternatively, MEMS shutter display elements, optical interference type MEMS display elements, and liquid crystal elements can be used as the display elements.

<<Input Portion 240>>

The input portion 240 includes an input panel.

For example, the input panel includes a proximity sensor which senses an approaching pointer. Note that a finger, a stylus pen, or the like can be used as the pointer.

As a stylus pen, a light-emitting element such as a light-emitting diode, a piece of metal, a coil, or the like can be used.

For example, a capacitive proximity sensor, an electromagnetic inductive proximity sensor, an infrared light detection type proximity sensor, a proximity sensor including a photoelectric conversion element, or the like can be used as the proximity sensor.

The capacitive proximity sensor includes a conductive film and detects the proximity of an object with inductivity larger than that of the air to the conductive film. For example, a plurality of conductive films is provided in different regions of the input panel, and a region a finger or the like serving as a pointer approaches is identified in accordance with change in parasitic capacitance of the conductive film to determine positional data.

The electromagnetic inductive proximity sensor detects the proximity of a piece of metal, a coil, or the like to the detection circuit. For example, a plurality of oscillator circuits is provided in different regions of the input panel, and a region a stylus or the like serving as a pointer approaches can be identified in accordance with change in circuit constant of the oscillation circuit to determine positional data.

The photo-detection proximity sensor detects the proximity of a light-emitting element. For example, a plurality of photoelectric conversion elements is provided in different regions of the input panel, and a region a stylus or the like serving as a pointer approaches can be identified in accordance with change in electromotive force of the photoelectric conversion element to determine positional data.

<<Sensor Portion 250>>

For example, a sensor that senses the brightness of an environment, a human motion sensor, or the like can be used as the sensor portion 250.

Note that this embodiment can be combined with any of the other embodiments in this specification as appropriate.

Embodiment 9

In this embodiment, the structure of a data processor of one embodiment of the present invention will be described with reference to FIGS. 22A and 22B.

Figure 22A:
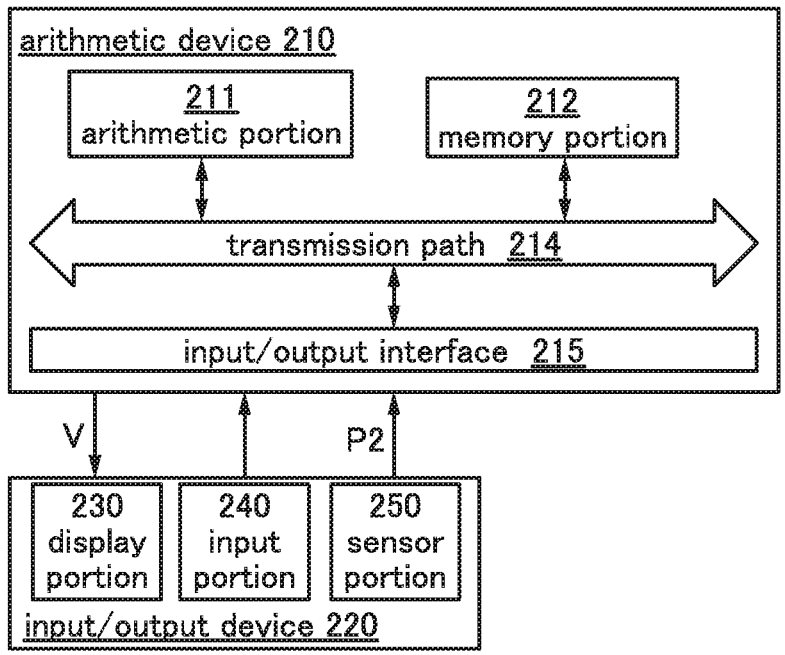
FIGS. 22A and 22B illustrate the structure of a data processor of one embodiment.
Figure 22B:
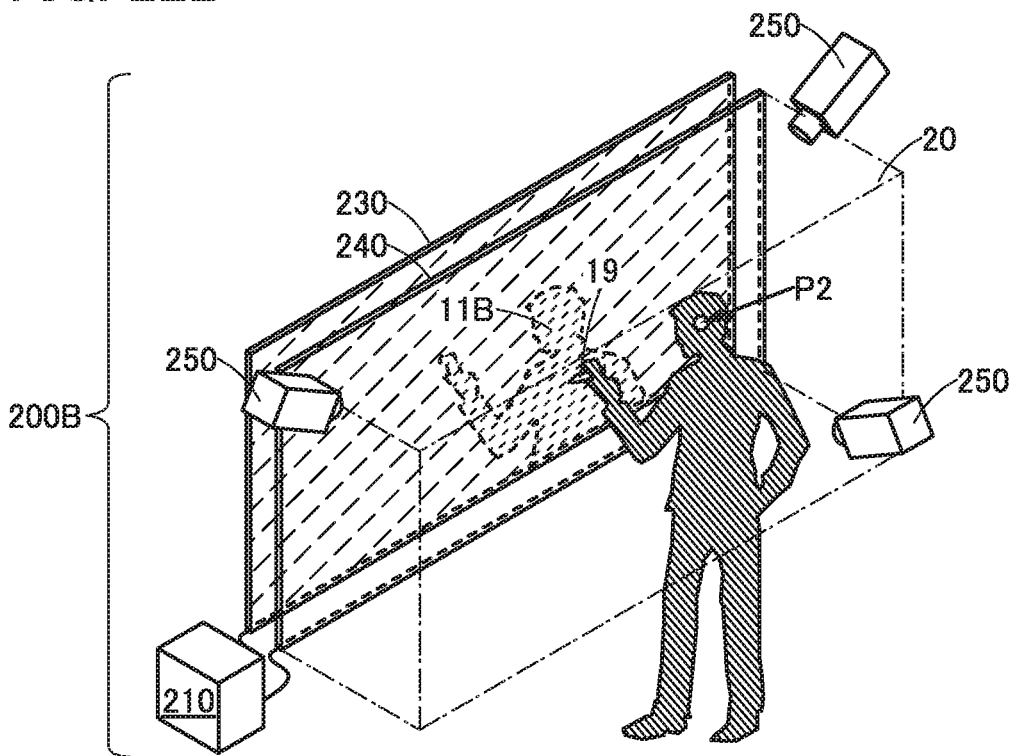

FIGS. 22A and 22B illustrate the structure of a data processor 200C of one embodiment of the present invention. FIG. 22A is a block diagram illustrating the structure of the data processor 200C, which is one embodiment of the present invention. FIG. 22B is a schematic view illustrating the data processor 200C being in operation.

<Structure Example of Data Processor>

The data processor 200C, which is described in this embodiment, includes the arithmetic device 210 which receives a data P2 and supplies the image data V and the input/output device 220 which supplies the data P2 and receives the image data V (see FIG. 22A).

The input/output device 220 includes the display portion 230 that displays the image data V and the sensor portion 250 that supplies the data P2.

The sensor portion 250 monitors a region 20 overlapping with the display portion 230 and determines data P2 in accordance with a shielded portion of the region 20 (see FIG. 22B).

The arithmetic device 210 is configured to determine a first region 11B in accordance with the data P2 and to generate the image data V for a region whose luminance is lower than that of the other region. The arithmetic device 210 determines the first region 11B partly overlapping with the shielded portion.

The data processor 200C described in this embodiment includes the display portion 230, the sensor portion 250 for supplying the data P2 on the object entering the region 20 overlapping with the display portion 230, and the arithmetic device 210 which determines the first region 11B in accordance with the data P2 and generates the image data V for a region whose luminance is reduced in the first region 11B. With such a structure, for example, when an operator enters the region overlapping with the display portion, an image with reduced luminance can be displayed in the display portion overlapping with the operator. Thus, the novel data processor can be highly convenient or reliable.

For example, the region 20 overlapping with the display portion 230 corresponds to a region within a range where the data processor 200C can be operated using a pointer or the like, which is within a range of from 0 m to 1.5 m, preferably to 1 m from the display portion 230 (see FIG. 22B).

The data processor 200C includes the input portion 240.

The following describes individual components included in the data processor 200C of one embodiment of the present invention. Note that these components cannot be clearly distinguished and one unit also serves as another component or include part of another component in some cases.

For example, the display portion 230 with which the input portion 240 overlaps serves as both the input portion 240 and the display portion 230.

<<Structure Example>>

The data processor 200C includes the arithmetic device 210, the input/output device 220, the display portion 230, the input portion 240, or the sensor portion 250.

Note that different points between the data processor 200C and the data processor 200B shown in FIGS. 21A and 21B and Embodiment 8 are that the data processor 200C includes the sensor portion 250 for supplying the data P2 on an object entering the region 20 overlapping with the display portion 230, and that the data processor 200C includes the arithmetic device 210 which determines the first region 11B in accordance with the data P2 and generates the image data V with reduced luminance in the first region 11B. Different structures will be described in detail below, and the above description is referred to for the other similar structures.

<<Sensor Portion 250>>

The sensor portion 250 monitors the region 20 overlapping with the display portion 230 and determines the positional data. For example, the sensor portion 250 monitors the region 20 facing one surface of the display portion 230 as shown in FIG. 22B. Note that the data P2 is representative positional data of a shielded portion of the monitored region 20.

Specifically, a human sensor, a camera, or the like can be used as the sensor portion 250. For example, a single or a plurality of human sensors or cameras can be used.

In the case of using the human sensor, the sensor portion 250 determines the data P2 in accordance with a signal which is detected by the human sensor. For example, the center of gravity of the detected shadow can be used as the data P2.

In the case of using the camera, the sensor portion 250 determines the data P2 in accordance with an image taken by the camera. For example, the center of gravity of the detected head shadow can be used as the data P2.

Note that the data P2 can be determined using the arithmetic device 210. In the case of determining the data P2 using the arithmetic device, the sensor portion 250 supplies a detected signal or a captured image to the arithmetic device 210.

<<Arithmetic Device 210>>

The arithmetic device 210 is configured to determine a first region 11B in accordance with the data P2 and to generate the image data V for a region whose luminance is reduced in the first region 11B. The arithmetic device 210 determines the first region 11B partly overlapping with the shielded portion.

For example, the arithmetic device 210 determines the first region 11B so that the first region 11B overlaps with part of the region 20 an operator of the data processor 200C enters when seen from a viewer of the display portion 230. Thus, the first region 11B lies in the shadow of the operator of the display portion 230, leading to a reduction of a feeling of strangeness the viewer of the display portion 230 has when the image with reduced luminance is displayed in the first region 11B.

For example, the first region 11B is positioned along the shadow of the operator of the data processor 200C as shown in FIG. 22B. For example, a three-dimensional shape model is generated from an image captured by a plurality of cameras from different angles and is reflected on the display portion 230 to determine the region of the shadow.

Note that this embodiment can be combined with any of the other embodiments in this specification as appropriate.

Embodiment 10

In this embodiment, the structure of the data processor of one embodiment of the present invention will be described with reference to FIGS. 23A to 23C.

FIGS. 23A to 23C illustrate the structure of the data processor 200D, which is one embodiment of the present invention. FIG. 23A is a block diagram illustrating the structure of the data processor 200D, which is one embodiment of the present invention.

FIG. 23B is a schematic view illustrating the data processor 200D being in operation.

<Structure Example of Data Processor>

The data processor 200D, which is described in this embodiment, includes the arithmetic device 210 which receives the tracking data P3 and supplies the image data V and the input/output device 220 which supplies the tracking data P3 and receives the image data V.

The input/output device 220 includes the display portion 230 which displays image data and the sensor portion 250D which supplies tracking data.

The sensor portion 250D determines the tracking data P3 containing a distance DS from the display portion 230 and a direction DR with respect to the display portion 230.

The arithmetic device 210 determines that the first region 11C should have a circular shape in accordance with the tracking data P3 and generates the image data V whose luminance is lower than that of the other region in the first region 11C.

The data processor 200D described in this embodiment includes the display portion 230, the sensor portion 250D for supplying the tracking data P3 containing the distance DS and the direction DR, and the arithmetic device 210 which determines the first region 11C in accordance with the tracking data P3 and generates the image data V for a region whose luminance is reduced in the first region 11C. With such a structure, for example, when an operator enters the region overlapping with the display portion, an image with reduced luminance can be displayed in the display portion overlapping with the operator. Thus, the novel data processor can be highly convenient or reliable.

For example, in the case where the data processor 200D is used for education, a digital signage, or a smart television system, the luminance of a displayed image is high so that the image can be seen from a separated place but it might be too high for an operator near the display portion 230.

The luminance of an image displayed in a portion which the operator of the data processor 200D watches is lower than that in the other portion, thereby reducing glare and providing the operator with a comfortable operation.

For example, an image with reduced luminance can be displayed by tracking an operator's line of sight and determining a portion which the operator watches.

The data processor 200D includes the input portion 240.

Individual components of the data processor 200D are described below. Note that these components cannot be clearly distinguished and one unit also serves as another component or include part of another component in some cases.

For example, the display portion 230 with which the input portion 240 overlaps serves as both the input portion 240 and the display portion 230.

<<Structure Example>>

The data processor 200D includes the arithmetic device 210, the input/output device 220, the display portion 230, the input portion 240, or the sensor portion 250D.

Note that different points between the data processor 200D and the data processor 200B shown in FIGS. 21A and 21B and Embodiment 8 are that the data processor 200C includes the sensor portion 250 for supplying the tracking data P3 containing the distance DS and the direction DR with respect to the display portion 230, and that the data processor 200D includes the arithmetic device 210 which determines the first region 11C in accordance with the tracking data P3 and generates the image data V with reduced luminance in the first region 11C. Different structures will be described in detail below, and the above description is referred to for the other similar structures.

<<Sensor Portion 250D>>

The sensor portion 250D determines the tracking data P3 containing the distance DS from the display portion 230 and the direction DR with respect to the display portion 230.

For example, a head tracking device an operator of the data processor 200D puts on for tracking the line of sight can be used for the sensor portion 250D (see FIG. 23B). Thus, the tracking data P3 containing the distance DS between the display portion 230 and the sensor portion 250D and the direction DR of the display portion 230 from the sensor portion 250D can be determined.

Specifically, a gyroscope, a camera mounted on glasses, or the like can be used for the sensor portion 250D.

The input portion 240 is configured to sense the positional data P1 of the pointer 19 which approaches a region overlapping with the display portion 230.

The arithmetic device 210 is configured to determine the second region 11D in accordance with the positional data P1 and to generate the image data V for a region whose luminance is lower than that of the other region in the first region 11C and the second region 11D.

The data processor 200D in this embodiment includes the input portion 240 which supplies the positional data P1 of the pointer 19, the arithmetic device 210 which determines the second region 11D in accordance with the positional data P1 and generates the image data V whose luminance is lower than that of the other region in the first region 11C and the second region 11D, and the display portion 230 which displays the image data V. Thus, an image at reduced luminance can be displayed in the region where the pointer approaches. Thus, the novel data processor can be highly convenient or reliable.

Note that this embodiment can be combined with any of the other embodiments in this specification as appropriate.

In this specification and the like, for example, when it is explicitly described that X and Y are connected, the case where X and Y are electrically connected, the case where X and Y are functionally connected, and the case where X and Y are directly connected are included therein. Accordingly, another element may be interposed between elements having a connection relation shown in drawings and texts, without limiting to a predetermined connection relation, for example, the connection relation shown in the drawings and the texts.

Here, X and Y each denote an object (e.g., a device, an element, a circuit, a wiring, an electrode, a terminal, a conductive film, or a layer).

For example, in the case where X and Y are directly connected, an element that enables electrical connection between X and Y (e.g., a switch, a transistor, a capacitor, an inductor, a resistor, a diode, a display element, a light-emitting element, or a load) is not connected between X and Y, and X and Y are connected without the element that enables electrical connection between X and Y (e.g., a switch, a transistor, a capacitor, an inductor, a resistor, a diode, a display element, a light-emitting element, or a load) provided therebetween.

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. A switch is controlled to be on or off. That is, a switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power source circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. Note that for example, in the case where a signal output from X is transmitted to Y even when another circuit is interposed between X and Y, X and Y are functionally connected. Note that the case where X and Y are functionally connected includes the case where X and Y are directly connected and the case where X and Y are electrically connected.

Note that when it is explicitly described that X and Y are electrically connected, the case where X and Y are electrically connected (i.e., the case where X and Y are connected with another element or another circuit provided therebetween), the case where X and Y are functionally connected (i.e., the case where X and Y are functionally connected with another circuit provided therebetween), and the case where X and Y are directly connected (i.e., the case where X and Y are connected without another element or another circuit provided therebetween) are included therein. That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit structure is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path". Another example of the expression is "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

This application is based on Japanese Patent Application serial no. 2015-094488 filed with Japan Patent Office on May 4, 2015, the entire contents of which are hereby incorporated by reference.

What is claimed is:

1. A touch panel comprising:
   a substrate;
   a transistor comprising:
      a gate electrode;
      an oxide semiconductor film; and
      a gate insulating film between the gate electrode and the oxide semiconductor film;
   a display element comprising a region overlapping with the substrate; and
   a sensor element between the display element and the substrate,
   wherein the substrate has a light-transmitting property,
   wherein the display element is configured to display an image on a substrate side,
   wherein the sensor element is configured to sense an object which approaches or touches the substrate side,
   wherein the sensor element comprises a first conductive film, a second conductive film between the first conductive film and the substrate, and an insulating film between the first conductive film and the second conductive film,
   wherein the second conductive film comprises an oxide semiconductor, and
   wherein the oxide semiconductor film of the transistor and the second conductive film are formed from the same layer.

2. The touch panel according to claim 1,
   wherein the display element comprises a third conductive film and a layer containing a liquid crystal, and
   wherein the third conductive film is provided so that an alignment of the liquid crystal is controlled by an electric field between the first conductive film and the third conductive film.

3. The touch panel according to claim 2,
   wherein the third conductive film is electrically connected to one of a source electrode and a drain electrode of the transistor.

4. The touch panel according to claim 3,
   wherein the insulating film comprises a region between the layer containing the liquid crystal and the oxide semiconductor film of the transistor.

5. The touch panel according to claim 4, wherein the oxide semiconductor film of the transistor comprises indium, gallium, zinc, and oxygen.

6. The touch panel according to claim 3, further comprising:
   a scan line, the scan line being electrically connected to the gate electrode of the transistor,
   a signal line, the signal line being electrically connected to the source electrode or the drain electrode of the transistor,
   a plurality of transistors electrically connected to the scan line, and
   a plurality of transistors electrically connected to the signal line,
   wherein the first conductive film comprises an opening overlapping with at least one of the scan line and the signal line, and
   wherein the second conductive film comprises an opening overlapping with at least one of the scan line and the signal line.

7. The touch panel according to claim 1, wherein the first conductive film comprises indium, gallium, zinc, and oxygen.

8. The touch panel according to claim 1, wherein the second conductive film comprises indium, gallium, zinc, and oxygen.

9. A data processor comprising:
   an arithmetic device; and
   the touch panel described in claim 1,
   wherein the arithmetic device is configured to receive a positional data and to supply an image data and a control data,
   wherein the touch panel is configured to supply the positional data and receive the image data and the control data,
   wherein the touch panel comprises a display portion configured to display the image data and an input portion configured to supply the positional data,
   wherein the input portion is configured to sense a position of a pointer and supply the positional data determined in accordance with the position,
   wherein the arithmetic device is configured to determine a moving speed of the pointer in accordance with the positional data, and
   wherein the arithmetic device is configured to determine a contrast or a brightness of the image data in accordance with the moving speed of the pointer.

10. A touch panel comprising:
    a substrate;
    a transistor comprising:
       a gate electrode;
       an oxide semiconductor film; and
       a gate insulating film between the gate electrode and the oxide semiconductor film; and
    a plurality of pixels,
    wherein at least one of the plurality of pixels comprises a display element and a sensor element between the display element and the substrate,
    wherein the display element comprises a region overlapping with the substrate,
    wherein the substrate has a light-transmitting property,
    wherein the display element is configured to display an image on a substrate side,
    wherein the sensor element is configured to sense an object which approaches or touches the substrate side,
    wherein the sensor element comprises a first conductive film, a second conductive film between the first conductive film and the substrate, and an insulating film between the first conductive film and the second conductive film,
    wherein the second conductive film comprises an oxide semiconductor, and
    wherein the oxide semiconductor film of the transistor and the second conductive film are formed from the same layer.

11. The touch panel according to claim 10,
wherein the display element comprises a third conductive film and a layer containing a liquid crystal, and
wherein the third conductive film is provided so that an alignment of the liquid crystal is controlled by an electric field between the first conductive film and the third conductive film.

12. The touch panel according to claim 11,
wherein the third conductive film is electrically connected to one of a source electrode and a drain electrode of the transistor.

13. The touch panel according to claim 12,
wherein the insulating film comprises a region between the layer containing the liquid crystal and the oxide semiconductor film of the transistor.

14. The touch panel according to claim 13, wherein the oxide semiconductor film of the transistor comprises indium, gallium, zinc, and oxygen.

15. The touch panel according to claim 12, further comprising:
a scan line, the scan line being electrically connected to the gate electrode of the transistor,
a signal line, the signal line being electrically connected to the source electrode or the drain electrode of the transistor,
a plurality of transistors electrically connected to the scan line, and
a plurality of transistors electrically connected to the signal line,
wherein the first conductive film comprises an opening overlapping with at least one of the scan line and the signal line, and
wherein the second conductive film comprises an opening overlapping with at least one of the scan line and the signal line.

16. The touch panel according to claim 10, wherein the first conductive film comprises indium, gallium, zinc, and oxygen.

17. The touch panel according to claim 10, wherein the second conductive film comprises indium, gallium, zinc, and oxygen.

18. A data processor comprising:
an arithmetic device; and
the touch panel described in claim 10,
wherein the arithmetic device is configured to receive a positional data and to supply an image data and a control data,
wherein the touch panel is configured to supply the positional data and receive the image data and the control data,
wherein the touch panel comprises a display portion configured to display the image data and an input portion configured to supply the positional data,
wherein the input portion is configured to sense a position of a pointer and supply the positional data determined in accordance with the position,
wherein the arithmetic device is configured to determine a moving speed of the pointer in accordance with the positional data, and
wherein the arithmetic device is configured to determine a contrast or a brightness of the image data in accordance with the moving speed of the pointer.

* * * * *